United States Patent
MacBride et al.

(10) Patent No.: US 12,305,396 B1
(45) Date of Patent: May 20, 2025

(54) RECLAIMED ROOFING GRANULES AND RELATED METHODS

(71) Applicant: Specialty Granules Investments LLC, Parsippany, NJ (US)

(72) Inventors: Jonathon MacBride, Greencastle, PA (US); David Kragten, Williamsport, MD (US); Daniel Rardon, Greencastle, PA (US); Justin Dunlap, Waynesboro, PA (US); Jared Horner, Hagerstown, MD (US); Derek Small, Mercersburg, PA (US)

(73) Assignee: Specialty Granules Investments LLC, Parsippany, NJ (US)

(*) Notice: Subject to any disclaimer, the term of this patent is extended or adjusted under 35 U.S.C. 154(b) by 0 days.

(21) Appl. No.: 18/384,594

(22) Filed: Oct. 27, 2023

Related U.S. Application Data

(60) Provisional application No. 63/519,111, filed on Aug. 11, 2023, provisional application No. 63/498,930, filed on Apr. 28, 2023, provisional application No. 63/482,622, filed on Feb. 1, 2023, provisional application No. 63/419,935, filed on Oct. 27, 2022.

(51) Int. Cl.
*E04D 7/00* (2006.01)
*C08L 95/00* (2006.01)
*E04D 11/02* (2006.01)

(52) U.S. Cl.
CPC ............. *E04D 11/02* (2013.01); *C08L 95/00* (2013.01)

(58) Field of Classification Search
CPC .............. E04D 2001/005; E04D 7/005; C04B 2111/00586; C08L 95/00
See application file for complete search history.

(56) References Cited

U.S. PATENT DOCUMENTS

| | | | |
|---|---|---|---|
| 3,026,568 A | 3/1962 | Moar | |
| 3,894,877 A * | 7/1975 | Nelson ................. | E04D 13/002 106/18.36 |
| 4,222,851 A | 9/1980 | Good et al. | |
| 4,352,837 A | 10/1982 | Kopenhaver | |
| 4,706,893 A | 11/1987 | Brock | |
| 5,209,802 A | 5/1993 | Hannah et al. | |
| 5,385,426 A | 1/1995 | Omann | |
| 5,718,787 A | 2/1998 | Gallagher et al. | |
| 5,811,607 A | 9/1998 | Richardt et al. | |

(Continued)

FOREIGN PATENT DOCUMENTS

| | | |
|---|---|---|
| WO | 2018/091769 A1 | 5/2018 |
| WO | 2018/094315 A2 | 5/2018 |

(Continued)

*Primary Examiner* — Brian E Glessner
*Assistant Examiner* — Daniel J Kenny
(74) *Attorney, Agent, or Firm* — GREENBERG TRAURIG, LLP

(57) ABSTRACT

Reclaimed roofing granules, roofing materials comprising reclaimed roofing granules, and methods for forming roofing granules are provided. A roofing granule comprises a roofing shingle waste core having a surface. The roofing shingle waste core comprises a base particle. The roofing shingle waste core comprises an asphalt residue. The asphalt residue covers at least a portion of the roofing shingle waste core. The roofing granule comprises a colored coating. The colored coating covers at least a portion of the asphalt residue.

19 Claims, 4 Drawing Sheets

(56) References Cited

U.S. PATENT DOCUMENTS

| | | |
|---|---|---|
| 5,848,755 A | 12/1998 | Zickell et al. |
| 6,120,838 A | 9/2000 | Zickell |
| 6,743,313 B2 | 6/2004 | Mischo |
| 6,984,670 B2 | 1/2006 | Meyers, III et al. |
| 7,052,635 B2 | 5/2006 | Mischo |
| 7,297,301 B1 | 11/2007 | Deschamps et al. |
| 7,891,590 B2 | 2/2011 | Rasmussen |
| 7,913,940 B2 | 3/2011 | Harmon |
| 8,083,166 B2 | 12/2011 | Gould et al. |
| 8,162,242 B2 | 4/2012 | Hofmann et al. |
| 8,177,152 B2 | 5/2012 | Harmon |
| 8,186,610 B2 | 5/2012 | Gould et al. |
| 8,210,458 B2 | 7/2012 | Strasser et al. |
| 8,388,873 B2 | 3/2013 | Hofmann et al. |
| 8,496,196 B2 | 7/2013 | Zickell et al. |
| 8,637,116 B2 | 1/2014 | Shiao et al. |
| 8,672,248 B2 | 3/2014 | Zickell et al. |
| 8,783,590 B2 | 7/2014 | Zickell et al. |
| 8,789,773 B2 | 7/2014 | Teeter, Jr. et al. |
| 8,919,681 B1 | 12/2014 | Horton et al. |
| 9,156,035 B1 | 10/2015 | Horton et al. |
| 9,200,451 B2 * | 12/2015 | Hong .................. E04D 1/00 |
| 9,227,196 B2 | 1/2016 | Hassan et al. |
| 9,259,860 B2 | 2/2016 | Kalkanoglu et al. |
| 9,273,228 B1 | 3/2016 | Hyer et al. |
| 9,295,992 B2 | 3/2016 | Zickell |
| 9,382,423 B2 | 7/2016 | Bolton et al. |
| 9,440,239 B1 | 9/2016 | Horton et al. |
| 9,457,354 B2 | 10/2016 | Svec et al. |
| 9,550,311 B1 | 1/2017 | Neel |
| 9,834,895 B2 | 12/2017 | Neel |
| 9,855,677 B2 | 1/2018 | Brock et al. |
| 9,951,223 B2 | 4/2018 | Gillespie et al. |
| 9,951,224 B2 | 4/2018 | Russell |
| 10,196,783 B2 | 2/2019 | Dempsey et al. |
| 10,323,149 B2 | 6/2019 | Russell |
| 10,683,620 B1 | 6/2020 | Kelley et al. |
| 10,704,262 B2 * | 7/2020 | Canova .................. B32B 27/00 |
| 10,858,790 B1 | 12/2020 | Kelley et al. |
| 11,059,976 B2 | 7/2021 | Franzen et al. |
| 11,136,760 B2 | 10/2021 | Kragten et al. |
| 11,499,276 B2 | 11/2022 | Kelley et al. |
| 11,565,970 B1 * | 1/2023 | Shiao .................. C04B 20/1074 |
| 2002/0066813 A1 | 6/2002 | Mischo |
| 2008/0026183 A1 * | 1/2008 | Vanpoulle .............. A01N 25/34 |
| | | 428/143 |
| 2008/0184661 A1 | 8/2008 | Lombard |
| 2008/0314803 A1 | 12/2008 | Burke |
| 2010/0064937 A1 | 3/2010 | Harmon et al. |
| 2010/0307380 A1 | 12/2010 | Fader |
| 2011/0041731 A1 | 2/2011 | Lombard |
| 2012/0282471 A1 | 11/2012 | Aguiar et al. |
| 2013/0199410 A1 | 8/2013 | Maldonado et al. |
| 2013/0220175 A1 | 8/2013 | Zickell |
| 2013/0307172 A1 | 11/2013 | Seder et al. |
| 2013/0313344 A1 | 11/2013 | Nykulin et al. |
| 2014/0014000 A1 | 1/2014 | Franzen et al. |
| 2014/0269143 A1 | 9/2014 | Gencer |
| 2014/0299018 A1 | 10/2014 | Elseifi et al. |
| 2014/0331897 A1 | 11/2014 | Elseifi |
| 2014/0373749 A1 | 12/2014 | Zickell et al. |
| 2015/0252534 A1 | 9/2015 | Dempsey et al. |
| 2016/0362338 A1 | 12/2016 | Reinke et al. |
| 2016/0362339 A1 | 12/2016 | Franzen et al. |
| 2018/0141866 A1 | 5/2018 | Kotefski et al. |
| 2018/0186963 A1 | 7/2018 | Kotefski et al. |
| 2018/0208771 A1 | 7/2018 | Gillespie et al. |
| 2018/0243798 A1 | 8/2018 | Abraham et al. |
| 2018/0334620 A1 | 11/2018 | Kotefski et al. |
| 2019/0039105 A1 | 2/2019 | Burns, Sr. et al. |
| 2019/0300427 A1 | 10/2019 | Horton |
| 2019/0375940 A1 | 12/2019 | Franzen et al. |
| 2022/0371955 A1 | 11/2022 | Wilson |

FOREIGN PATENT DOCUMENTS

| | | |
|---|---|---|
| WO | 2018/125952 A2 | 7/2018 |
| WO | 2019/134729 A1 | 7/2019 |
| WO | 2019/161295 A1 | 8/2019 |
| WO | 2020/041347 A1 | 2/2020 |

* cited by examiner

RECLAIMED ROOFING GRANULES AND RELATED METHODS

CROSS-REFERENCE TO RELATED APPLICATIONS

This application claims priority to and benefit of U.S. Provisional Patent Application No. 63/419,935, filed Oct. 27, 2022 and entitled "RECLAIMED ROOFING GRANULES AND METHODS FOR FORMING ROOFING GRANULES," U.S. Provisional Patent Application No. 63/482,622, filed Feb. 1, 2023 and entitled "RECLAIMED ROOFING GRANULES AND METHODS FOR FORMING ROOFING GRANULES," U.S. Provisional Patent Application No. 63/498,930, filed Apr. 28, 2023 and entitled "RECLAIMED ROOFING GRANULES AND METHODS FOR FORMING ROOFING GRANULES," and U.S. Provisional Patent Application No. 63/519,111, filed Aug. 11, 2023 and entitled "RECLAIMED ROOFING GRANULES AND METHODS FOR FORMING ROOFING GRANULES," the entirety of which is herein incorporated by reference.

FIELD

This disclosure generally relates to reclaimed roofing granules and related methods.

BACKGROUND

Approximately 11 million tons of asphalt shingle waste (ASW) are generated in the U.S. each year. Asphalt shingle waste can take time to decompose in a landfill.

SUMMARY

Some embodiments relate to a roofing granule. In some embodiments, the roofing granule comprises a roofing shingle waste core. In some embodiments, the roofing shingle waste core comprises a base particle. In some embodiments, the roofing shingle waste core comprises at least 0.5% by weight of an asphalt residue based on a total weight of the roofing shingle waste core. In some embodiments, the roofing granule comprises a colored coating. In some embodiments, the asphalt residue is located between the base particle and the colored coating. In some embodiments, the colored coating covers at least a portion of the asphalt residue.

In some embodiments, the asphalt residue covers 1% to 99% of the base particle.

In some embodiments, the colored coating covers 1% to 99% of the asphalt residue.

In some embodiments, the colored coating covers 1% to 99% of the roofing shingle waste core.

In some embodiments, the asphalt residue directly contacts the base particle.

In some embodiments, the colored coating directly contacts the asphalt residue.

In some embodiments, the colored coating directly contacts the roofing shingle waste core.

In some embodiments, the roofing shingle waste core comprises 0.5% to 50% by weight of the asphalt residue based on the total weight of the roofing shingle waste core.

In some embodiments, the roofing shingle waste core comprises 0.5% to 30% by weight of the asphalt residue based on the total weight of the roofing shingle waste core.

In some embodiments, the roofing granule comprises 0.1% to 50% by weight of the asphalt residue based on a total weight of the roofing granule.

Some embodiments relate to a method. In some embodiments, the method comprises obtaining a roofing shingle waste core. In some embodiments, the roofing shingle waste core comprises a base particle. In some embodiments, the roofing shingle waste core comprises at least 0.5% by weight of an asphalt residue based on a total weight of the roofing shingle waste core. In some embodiments, the method comprises obtaining a colored coating composition. In some embodiments, the method comprises applying the colored coating composition to the roofing shingle waste core. In some embodiments, the method comprises curing the colored coating composition, so as to form a colored coating on a roofing granule. In some embodiments, the asphalt residue is located between the base particle and the colored coating. In some embodiments, the colored coating covers at least a portion of the asphalt residue.

In some embodiments, the asphalt residue covers 1% to 99% of the base particle.

In some embodiments, the colored coating covers 1% to 99% of the asphalt residue.

In some embodiments, the colored coating covers 1% to 99% of the roofing shingle waste core.

In some embodiments, the asphalt residue directly contacts the base particle.

In some embodiments, the colored coating directly contacts the asphalt residue.

In some embodiments, the colored coating directly contacts the roofing shingle waste core.

In some embodiments, the roofing shingle waste core comprises 0.5% to 50% by weight of the asphalt residue based on the total weight of the roofing shingle waste core.

In some embodiments, the roofing shingle waste core comprises 0.5% to 30% by weight of the asphalt residue based on the total weight of the roofing shingle waste core.

Some embodiments relate to a roofing granule. In some embodiments, the roofing granule comprises a roofing shingle waste core. In some embodiments, the roofing shingle waste core, when tested according to the Organism Growth Testing Method, does not exhibit a green growth at an interface between the roofing shingle waste core and a testing solution after a duration of one month. In some embodiments, the roofing granule comprises a colored coating. In some embodiments, the colored coating covers at least a portion of the roofing shingle waste core.

BRIEF DESCRIPTION OF THE DRAWINGS

Reference is made to the drawings that form a part of this disclosure, and which illustrate embodiments in which the materials and methods described herein can be practiced.

DETAILED DESCRIPTION

Figure 1:
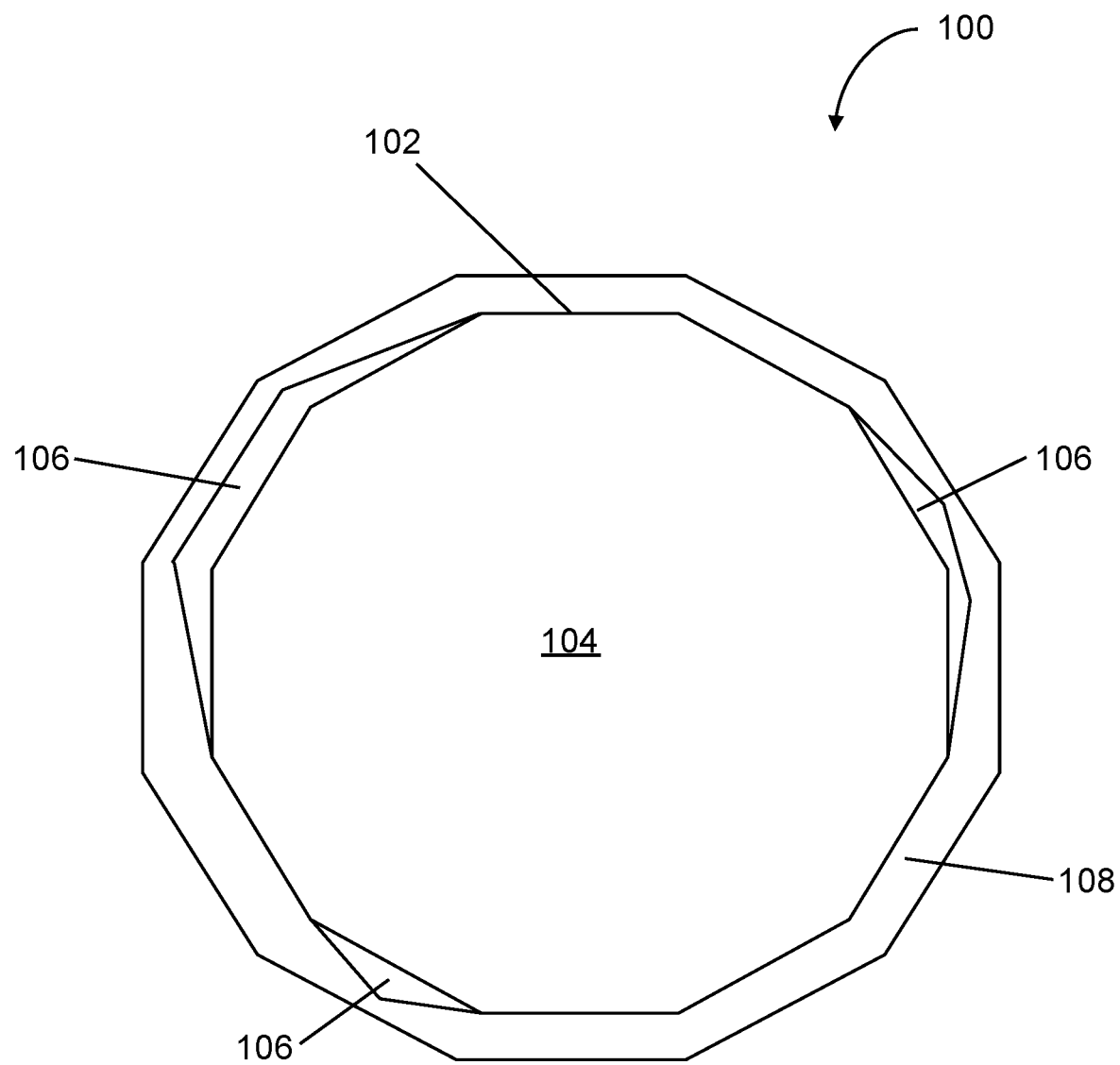
FIG. 1 is a schematic diagram of a cross-section of a roofing granule, according to some embodiments.

Some embodiments relate to reclaimed roofing granules, roofing materials comprising the reclaimed roofing granules, and methods for forming roofing granules.

In some embodiments, the roofing granules are reclaimed from an asphalt shingle waste. For example, in some embodiments, the asphalt shingle waste is subjected to methods for processing asphalt shingle waste. Non-limiting examples of methods for processing asphalt shingle waste include, but are not limited to, those described in U.S. Pat. Nos. 10,683,620; 10,697,133; 10,858,790; each of which are incorporated by reference in their entireties. In some embodiments, roofing shingle waste cores are recovered from the methods for processing asphalt shingle waste. In some embodiments, the roofing shingle waste cores are recovered along with asphalt residues, non-asphalt residues, miscolored coatings, impurities, contaminants, or combinations thereof. In some embodiments, colored coatings can be immediately applied to the roofing shingle waste cores so as to obtain colored roofing granules useful for roofing applications. In some embodiments, the roofing shingle waste cores are subjected to one or more processes prior to applying the colored coating.

As used herein, the term "roofing shingle waste core" refers to any form of particulate matter reclaimed, recovered, or otherwise obtained from asphalt shingle waste. Non-limiting examples of particulate matter include, without limitation, at least one of a core, a base particle, a plurality of base particles, an agglomerate of base particles, or any combination thereof. In some embodiments, the roofing shingle waste core comprises a reclaimed granule. In some embodiments, the roofing shingle waste core comprises a reclaimed granule, and a colored coating (e.g., a waste colored coating, such as a residue or other substance prior to a new color coating application) on at least a portion of the reclaimed granule.

As used herein, the term "asphalt shingle waste" refers to any form of discarded asphalt shingle. In some embodiments, an asphalt shingle waste comprises at least one of asphalt, limestone, granules, impurities, or any combination thereof. "Asphalt shingle waste" includes, but is not limited to, post-manufacturing waste and post-consumer waste.

As used herein, the term "post-consumer waste" refers to any waste produced by an end consumer of a material stream. A non-limiting example of "post-consumer waste" is a discarded roofing shingle from a residential or commercial roof. Another non-limiting example of "post-consumer waste" is contractor waste including, but not limited to, surplus new material, damaged material, and scrap from cut shingles during installation. Yet another non-limiting example of "post-consumer waste" is at least one of distributor waste, retail waste, or any combination thereof, including, but not limited to, damaged shingle products, aged inventory of shingles, and customer returns.

As used herein, the term "post-manufacturing waste" refers to waste produced prior to reaching the end consumer of a material stream. A non-limiting example of "post-manufacturing waste" is any shingle waste generated during the production, handling, transportation, or other method of generation prior to installation on a roof of a consumer. Post-manufacturing waste may include production waste such as, but not limited to, partial shingles and coated fiberglass mat with or without granules.

In some embodiments, the roofing granule has an average particle size of 0.001 mm to 7 mm. In some embodiments, the roofing granule has an average particle size of 0.1 mm to 7 mm. In some embodiments, the roofing granule has an average particle size of 0.1 mm to 6.9 mm. In some embodiments, the roofing granule has an average particle size of 0.1 mm to 6.8 mm. In some embodiments, the roofing granule has an average particle size of 0.1 mm to 6.7 mm. In some embodiments, the roofing granule has an average particle size of 0.1 mm to 6.6 mm. In some embodiments, the roofing granule has an average particle size of 0.1 mm to 6.5 mm. In some embodiments, the roofing granule has an average particle size of 0.1 mm to 6.4 mm. In some embodiments, the roofing granule has an average particle size of 0.1 mm to 6.3 mm. In some embodiments, the roofing granule has an average particle size of 0.1 mm to 6.2 mm. In some embodiments, the roofing granule has an average particle size of 0.1 mm to 6.1 mm.

In some embodiments, the roofing granule has an average particle size of 0.1 mm to 6 mm. In some embodiments, the roofing granule has an average particle size of 0.1 mm to 5.9 mm. In some embodiments, the roofing granule has an average particle size of 0.1 mm to 5.8 mm. In some embodiments, the roofing granule has an average particle size of 0.1 mm to 5.7 mm. In some embodiments, the roofing granule has an average particle size of 0.1 mm to 5.6 mm. In some embodiments, the roofing granule has an average particle size of 0.1 mm to 5.5 mm. In some embodiments, the roofing granule has an average particle size of 0.1 mm to 5.4 mm. In some embodiments, the roofing granule has an average particle size of 0.1 mm to 5.3 mm. In some embodiments, the roofing granule has an average particle size of 0.1 mm to 5.2 mm. In some embodiments, the roofing granule has an average particle size of 0.1 mm to 5.1 mm.

In some embodiments, the roofing granule has an average particle size of 0.1 mm to 4.9 mm. In some embodiments, the roofing granule has an average particle size of 0.1 mm to 4.8 mm. In some embodiments, the roofing granule has an average particle size of 0.1 mm to 4.7 mm. In some embodiments, the roofing granule has an average particle size of 0.1 mm to 4.6 mm. In some embodiments, the roofing granule has an average particle size of 0.1 mm to 4.5 mm. In some embodiments, the roofing granule has an average particle size of 0.1 mm to 4.4 mm. In some embodiments, the roofing granule has an average particle size of 0.1 mm to 4.3 mm. In some embodiments, the roofing granule has an average particle size of 0.1 mm to 4.2 mm. In some embodiments, the roofing granule has an average particle size of 0.1 mm to 4.1 mm.

In some embodiments, the roofing granule has an average particle size of 0.1 mm to 4 mm. In some embodiments, the roofing granule has an average particle size of 0.1 mm to 3.9 mm. In some embodiments, the roofing granule has an average particle size of 0.1 mm to 3.8 mm. In some embodiments, the roofing granule has an average particle size of 0.1 mm to 3.7 mm. In some embodiments, the roofing granule has an average particle size of 0.1 mm to 3.6 mm. In some embodiments, the roofing granule has an average particle size of 0.1 mm to 3.5 mm. In some embodiments, the roofing granule has an average particle size of 0.1 mm to 3.4 mm. In some embodiments, the roofing granule has an average particle size of 0.1 mm to 3.3 mm. In some embodiments, the roofing granule has an average particle size of 0.1 mm to 3.2 mm. In some embodiments, the roofing granule has an average particle size of 0.1 mm to 3.1 mm.

In some embodiments, the roofing granule has an average particle size of 0.1 mm to 3 mm. In some embodiments, the roofing granule has an average particle size of 0.1 mm to 2.9 mm. In some embodiments, the roofing granule has an average particle size of 0.1 mm to 2.8 mm. In some embodiments, the roofing granule has an average particle size of 0.1 mm to 2.7 mm. In some embodiments, the roofing granule has an average particle size of 0.1 mm to 2.6 mm. In some embodiments, the roofing granule has an average particle size of 0.1 mm to 2.5 mm. In some embodiments, the roofing granule has an average particle size of 0.1 mm to 2.4 mm. In some embodiments, the roofing granule has an average particle size of 0.1 mm to 2.3 mm. In some embodiments, the roofing granule has an average particle size of 0.1 mm to 2.2 mm. In some embodiments, the roofing granule has an average particle size of 0.1 mm to 2.1 mm.

In some embodiments, the roofing granule has an average particle size of 0.1 mm to 2 mm. In some embodiments, the roofing granule has an average particle size of 0.1 mm to 1.9 mm. In some embodiments, the roofing granule has an average particle size of 0.1 mm to 1.8 mm. In some embodiments, the roofing granule has an average particle size of 0.1 mm to 1.7 mm. In some embodiments, the roofing granule has an average particle size of 0.1 mm to 1.6 mm. In some embodiments, the roofing granule has an average particle size of 0.1 mm to 1.5 mm. In some embodiments, the roofing granule has an average particle size of 0.1 mm to 1.4 mm. In some embodiments, the roofing granule has an average particle size of 0.1 mm to 1.3 mm. In some embodiments, the roofing granule has an average particle size of 0.1 mm to 1.2 mm. In some embodiments, the roofing granule has an average particle size of 0.1 mm to 1.1 mm.

In some embodiments, the roofing granule has an average particle size of 0.1 mm to 1 mm. In some embodiments, the roofing granule has an average particle size of 0.1 mm to 0.9 mm. In some embodiments, the roofing granule has an average particle size of 0.1 mm to 0.8 mm. In some embodiments, the roofing granule has an average particle size of 0.1 mm to 0.7 mm. In some embodiments, the roofing granule has an average particle size of 0.1 mm to 0.6 mm. In some embodiments, the roofing granule has an average particle size of 0.1 mm to 0.5 mm. In some embodiments, the roofing granule has an average particle size of 0.1 mm to 0.4 mm. In some embodiments, the roofing granule has an average particle size of 0.1 mm to 0.3 mm. In some embodiments, the roofing granule has an average particle size of 0.1 mm to 0.2 mm.

In some embodiments, the roofing granule has an average particle size of 0.2 mm to 7 mm. In some embodiments, the roofing granule has an average particle size of 0.3 mm to 7 mm. In some embodiments, the roofing granule has an average particle size of 0.4 mm to 7 mm. In some embodiments, the roofing granule has an average particle size of 0.5 mm to 7 mm. In some embodiments, the roofing granule has an average particle size of 0.6 mm to 7 mm. In some embodiments, the roofing granule has an average particle size of 0.7 mm to 7 mm. In some embodiments, the roofing granule has an average particle size of 0.8 mm to 7 mm. In some embodiments, the roofing granule has an average particle size of 0.9 mm to 7 mm.

In some embodiments, the roofing granule has an average particle size of 1 mm to 7 mm. In some embodiments, the roofing granule has an average particle size of 1.1 mm to 7 mm. In some embodiments, the roofing granule has an average particle size of 1.2 mm to 7 mm. In some embodiments, the roofing granule has an average particle size of 1.3 mm to 7 mm. In some embodiments, the roofing granule has an average particle size of 1.4 mm to 7 mm. In some embodiments, the roofing granule has an average particle size of 1.5 mm to 7 mm. In some embodiments, the roofing granule has an average particle size of 1.6 mm to 7 mm. In some embodiments, the roofing granule has an average particle size of 1.7 mm to 7 mm. In some embodiments, the roofing granule has an average particle size of 1.8 mm to 7 mm. In some embodiments, the roofing granule has an average particle size of 1.9 mm to 7 mm.

In some embodiments, the roofing granule has an average particle size of 2 mm to 7 mm. In some embodiments, the roofing granule has an average particle size of 2.1 mm to 7 mm. In some embodiments, the roofing granule has an average particle size of 2.2 mm to 7 mm. In some embodiments, the roofing granule has an average particle size of 2.3 mm to 7 mm. In some embodiments, the roofing granule has an average particle size of 2.4 mm to 7 mm. In some embodiments, the roofing granule has an average particle size of 2.5 mm to 7 mm. In some embodiments, the roofing granule has an average particle size of 2.6 mm to 7 mm. In some embodiments, the roofing granule has an average particle size of 2.7 mm to 7 mm. In some embodiments, the roofing granule has an average particle size of 2.8 mm to 7 mm. In some embodiments, the roofing granule has an average particle size of 2.9 mm to 7 mm.

In some embodiments, the roofing granule has an average particle size of 3 mm to 7 mm. In some embodiments, the roofing granule has an average particle size of 3.1 mm to 7 mm. In some embodiments, the roofing granule has an average particle size of 3.2 mm to 7 mm. In some embodiments, the roofing granule has an average particle size of 3.3 mm to 7 mm. In some embodiments, the roofing granule has an average particle size of 3.4 mm to 7 mm. In some embodiments, the roofing granule has an average particle size of 3.5 mm to 7 mm. In some embodiments, the roofing granule has an average particle size of 3.6 mm to 7 mm. In some embodiments, the roofing granule has an average particle size of 3.7 mm to 7 mm. In some embodiments, the roofing granule has an average particle size of 3.8 mm to 7 mm. In some embodiments, the roofing granule has an average particle size of 3.9 mm to 7 mm.

In some embodiments, the roofing granule has an average particle size of 4 mm to 7 mm. In some embodiments, the roofing granule has an average particle size of 4.1 mm to 7 mm. In some embodiments, the roofing granule has an average particle size of 4.2 mm to 7 mm. In some embodiments, the roofing granule has an average particle size of 4.3 mm to 7 mm. In some embodiments, the roofing granule has an average particle size of 4.4 mm to 7 mm. In some embodiments, the roofing granule has an average particle size of 4.5 mm to 7 mm. In some embodiments, the roofing granule has an average particle size of 4.6 mm to 7 mm. In some embodiments, the roofing granule has an average particle size of 4.7 mm to 7 mm. In some embodiments, the roofing granule has an average particle size of 4.8 mm to 7 mm. In some embodiments, the roofing granule has an average particle size of 4.9 mm to 7 mm.

In some embodiments, the roofing granule has an average particle size of 5 mm to 7 mm. In some embodiments, the roofing granule has an average particle size of 5.1 mm to 7 mm. In some embodiments, the roofing granule has an average particle size of 5.2 mm to 7 mm. In some embodiments, the roofing granule has an average particle size of 5.3 mm to 7 mm. In some embodiments, the roofing granule has an average particle size of 5.4 mm to 7 mm. In some embodiments, the roofing granule has an average particle size of 5.5 mm to 7 mm. In some embodiments, the roofing granule has an average particle size of 5.6 mm to 7 mm. In some embodiments, the roofing granule has an average particle size of 5.7 mm to 7 mm. In some embodiments, the roofing granule has an average particle size of 5.8 mm to 7 mm. In some embodiments, the roofing granule has an average particle size of 5.9 mm to 7 mm.

In some embodiments, the roofing granule has an average particle size of 6 mm to 7 mm. In some embodiments, the roofing granule has an average particle size of 6.1 mm to 7 mm. In some embodiments, the roofing granule has an average particle size of 6.2 mm to 7 mm. In some embodiments, the roofing granule has an average particle size of 6.3 mm to 7 mm. In some embodiments, the roofing granule has an average particle size of 6.4 mm to 7 mm. In some embodiments, the roofing granule has an average particle size of 6.5 mm to 7 mm. In some embodiments, the roofing granule has an average particle size of 6.6 mm to 7 mm. In some embodiments, the roofing granule has an average particle size of 6.7 mm to 7 mm. In some embodiments, the roofing granule has an average particle size of 6.8 mm to 7 mm. In some embodiments, the roofing granule has an average particle size of 6.9 mm to 7 mm.

In some embodiments, the roofing granule comprises a roofing shingle waste core.

In some embodiments, the roofing shingle waste core has a surface. In some embodiments, the surface is an outer surface. As used herein, the term "outer surface" refers to an outermost surface of an object.

In some embodiments, the roofing shingle waste core has an average particle size of 0.1 mm to 7 mm. In some embodiments, the roofing shingle waste core has an average particle size of 0.1 mm to 6.9 mm. In some embodiments, the roofing shingle waste core has an average particle size of 0.1 mm to 6.8 mm. In some embodiments, the roofing shingle waste core has an average particle size of 0.1 mm to 6.7 mm. In some embodiments, the roofing shingle waste core has an average particle size of 0.1 mm to 6.6 mm. In some embodiments, the roofing shingle waste core has an average particle size of 0.1 mm to 6.5 mm. In some embodiments, the roofing shingle waste core has an average particle size of 0.1 mm to 6.4 mm. In some embodiments, the roofing shingle waste core has an average particle size of 0.1 mm to 6.3 mm. In some embodiments, the roofing shingle waste core has an average particle size of 0.1 mm to 6.2 mm. In some embodiments, the roofing shingle waste core has an average particle size of 0.1 mm to 6.1 mm.

In some embodiments, the roofing shingle waste core has an average particle size of 0.1 mm to 6 mm. In some embodiments, the roofing shingle waste core has an average particle size of 0.1 mm to 5.9 mm. In some embodiments, the roofing shingle waste core has an average particle size of 0.1 mm to 5.8 mm. In some embodiments, the roofing shingle waste core has an average particle size of 0.1 mm to 5.7 mm. In some embodiments, the roofing shingle waste core has an average particle size of 0.1 mm to 5.6 mm. In some embodiments, the roofing shingle waste core has an average particle size of 0.1 mm to 5.5 mm. In some embodiments, the roofing shingle waste core has an average particle size of 0.1 mm to 5.4 mm. In some embodiments, the roofing shingle waste core has an average particle size of 0.1 mm to 5.3 mm. In some embodiments, the roofing shingle waste core has an average particle size of 0.1 mm to 5.2 mm. In some embodiments, the roofing shingle waste core has an average particle size of 0.1 mm to 5.1 mm.

In some embodiments, the roofing shingle waste core has an average particle size of 0.1 mm to 5 mm. In some embodiments, the roofing shingle waste core has an average particle size of 0.1 mm to 4.9 mm. In some embodiments, the roofing shingle waste core has an average particle size of 0.1 mm to 4.8 mm. In some embodiments, the roofing shingle waste core has an average particle size of 0.1 mm to 4.7 mm. In some embodiments, the roofing shingle waste core has an average particle size of 0.1 mm to 4.6 mm. In some embodiments, the roofing shingle waste core has an average particle size of 0.1 mm to 4.5 mm. In some embodiments, the roofing shingle waste core has an average particle size of 0.1 mm to 4.4 mm. In some embodiments, the roofing shingle waste core has an average particle size of 0.1 mm to 4.3 mm. In some embodiments, the roofing shingle waste core has an average particle size of 0.1 mm to 4.2 mm. In some embodiments, the roofing shingle waste core has an average particle size of 0.1 mm to 4.1 mm.

In some embodiments, the roofing shingle waste core has an average particle size of 0.1 mm to 4 mm. In some embodiments, the roofing shingle waste core has an average particle size of 0.1 mm to 3.9 mm. In some embodiments, the roofing shingle waste core has an average particle size of 0.1 mm to 3.8 mm. In some embodiments, the roofing shingle waste core has an average particle size of 0.1 mm to 3.7 mm. In some embodiments, the roofing shingle waste core has an average particle size of 0.1 mm to 3.6 mm. In some embodiments, the roofing shingle waste core has an average particle size of 0.1 mm to 3.5 mm. In some embodiments, the roofing shingle waste core has an average particle size of 0.1 mm to 3.4 mm. In some embodiments, the roofing shingle waste core has an average particle size of 0.1 mm to 3.3 mm. In some embodiments, the roofing shingle waste core has an average particle size of 0.1 mm to 3.2 mm. In some embodiments, the roofing shingle waste core has an average particle size of 0.1 mm to 3.1 mm.

In some embodiments, the roofing shingle waste core has an average particle size of 0.1 mm to 3 mm. In some embodiments, the roofing shingle waste core has an average particle size of 0.1 mm to 2.9 mm. In some embodiments, the roofing shingle waste core has an average particle size of 0.1 mm to 2.8 mm. In some embodiments, the roofing shingle waste core has an average particle size of 0.1 mm to 2.7 mm. In some embodiments, the roofing shingle waste core has an average particle size of 0.1 mm to 2.6 mm. In some embodiments, the roofing shingle waste core has an average particle size of 0.1 mm to 2.5 mm. In some embodiments, the roofing shingle waste core has an average particle size of 0.1 mm to 2.4 mm. In some embodiments, the roofing shingle waste core has an average particle size of 0.1 mm to 2.3 mm. In some embodiments, the roofing shingle waste core has an average particle size of 0.1 mm to 2.2 mm. In some embodiments, the roofing shingle waste core has an average particle size of 0.1 mm to 2.1 mm.

In some embodiments, the roofing shingle waste core has an average particle size of 0.1 mm to 2 mm. In some embodiments, the roofing shingle waste core has an average particle size of 0.1 mm to 1.9 mm. In some embodiments, the roofing shingle waste core has an average particle size of 0.1 mm to 1.8 mm. In some embodiments, the roofing shingle waste core has an average particle size of 0.1 mm to 1.7 mm. In some embodiments, the roofing shingle waste core has an average particle size of 0.1 mm to 1.6 mm. In some embodiments, the roofing shingle waste core has an average particle size of 0.1 mm to 1.5 mm. In some embodiments, the roofing shingle waste core has an average particle size of 0.1 mm to 1.4 mm. In some embodiments, the roofing shingle waste core has an average particle size of 0.1 mm to 1.3 mm. In some embodiments, the roofing shingle waste core has an average particle size of 0.1 mm to 1.2 mm. In some embodiments, the roofing shingle waste core has an average particle size of 0.1 mm to 1.1 mm.

In some embodiments, the roofing shingle waste core has an average particle size of 0.1 mm to 1 mm. In some embodiments, the roofing shingle waste core has an average particle size of 0.1 mm to 0.9 mm. In some embodiments, the roofing shingle waste core has an average particle size of 0.1 mm to 0.8 mm. In some embodiments, the roofing shingle waste core has an average particle size of 0.1 mm to 0.7 mm. In some embodiments, the roofing shingle waste core has an average particle size of 0.1 mm to 0.6 mm. In some embodiments, the roofing shingle waste core has an average particle size of 0.1 mm to 0.5 mm. In some embodiments, the roofing shingle waste core has an average particle size of 0.1 mm to 0.4 mm. In some embodiments, the roofing shingle waste core has an average particle size of 0.1 mm to 0.3 mm. In some embodiments, the roofing shingle waste core has an average particle size of 0.1 mm to 0.2 mm. In some embodiments, the roofing shingle waste core has an average particle size of 0.2 mm to 3 mm.

In some embodiments, the roofing shingle waste core has an average particle size of 0.2 mm to 7 mm. In some embodiments, the roofing shingle waste core has an average particle size of 0.3 mm to 7 mm. In some embodiments, the roofing shingle waste core has an average particle size of 0.4 mm to 7 mm. In some embodiments, the roofing shingle waste core has an average particle size of 0.5 mm to 7 mm. In some embodiments, the roofing shingle waste core has an average particle size of 0.6 mm to 7 mm. In some embodiments, the roofing shingle waste core has an average particle size of 0.7 mm to 7 mm. In some embodiments, the roofing shingle waste core has an average particle size of 0.8 mm to 7 mm. In some embodiments, the roofing shingle waste core has an average particle size of 0.9 mm to 7 mm.

In some embodiments, the roofing shingle waste core has an average particle size of 1 mm to 7 mm. In some embodiments, the roofing shingle waste core has an average particle size of 1.1 mm to 7 mm. In some embodiments, the roofing shingle waste core has an average particle size of 1.2 mm to 7 mm. In some embodiments, the roofing shingle waste core has an average particle size of 1.3 mm to 7 mm. In some embodiments, the roofing shingle waste core has an average particle size of 1.4 mm to 7 mm. In some embodiments, the roofing shingle waste core has an average particle size of 1.5 mm to 7 mm. In some embodiments, the roofing shingle waste core has an average particle size of 1.6 mm to 7 mm. In some embodiments, the roofing shingle waste core has an average particle size of 1.7 mm to 7 mm. In some embodiments, the roofing shingle waste core has an average particle size of 1.8 mm to 7 mm. In some embodiments, the roofing shingle waste core has an average particle size of 1.9 mm to 7 mm.

In some embodiments, the roofing shingle waste core has an average particle size of 2 mm to 7 mm. In some embodiments, the roofing shingle waste core has an average particle size of 2.1 mm to 7 mm. In some embodiments, the roofing shingle waste core has an average particle size of 2.2 mm to 7 mm. In some embodiments, the roofing shingle waste core has an average particle size of 2.3 mm to 7 mm. In some embodiments, the roofing shingle waste core has an average particle size of 2.4 mm to 7 mm. In some embodiments, the roofing shingle waste core has an average particle size of 2.5 mm to 7 mm. In some embodiments, the roofing shingle waste core has an average particle size of 2.6 mm to 7 mm. In some embodiments, the roofing shingle waste core has an average particle size of 2.7 mm to 7 mm. In some embodiments, the roofing shingle waste core has an average particle size of 2.8 mm to 7 mm. In some embodiments, the roofing shingle waste core has an average particle size of 2.9 mm to 7 mm.

In some embodiments, the roofing shingle waste core has an average particle size of 3 mm to 7 mm. In some embodiments, the roofing shingle waste core has an average particle size of 3.1 mm to 7 mm. In some embodiments, the roofing shingle waste core has an average particle size of 3.2 mm to 7 mm. In some embodiments, the roofing shingle waste core has an average particle size of 3.3 mm to 7 mm. In some embodiments, the roofing shingle waste core has an average particle size of 3.4 mm to 7 mm. In some embodiments, the roofing shingle waste core has an average particle size of 3.5 mm to 7 mm. In some embodiments, the roofing shingle waste core has an average particle size of 3.6 mm to 7 mm. In some embodiments, the roofing shingle waste core has an average particle size of 3.7 mm to 7 mm. In some embodiments, the roofing shingle waste core has an average particle size of 3.8 mm to 7 mm. In some embodiments, the roofing shingle waste core has an average particle size of 3.9 mm to 7 mm.

In some embodiments, the roofing shingle waste core has an average particle size of 4 mm to 7 mm. In some embodiments, the roofing shingle waste core has an average particle size of 4.1 mm to 7 mm. In some embodiments, the roofing shingle waste core has an average particle size of 4.2 mm to 7 mm. In some embodiments, the roofing shingle waste core has an average particle size of 4.3 mm to 7 mm. In some embodiments, the roofing shingle waste core has an average particle size of 4.4 mm to 7 mm. In some embodiments, the roofing shingle waste core has an average particle size of 4.5 mm to 7 mm. In some embodiments, the roofing shingle waste core has an average particle size of 4.6 mm to 7 mm. In some embodiments, the roofing shingle waste core has an average particle size of 4.7 mm to 7 mm. In some embodiments, the roofing shingle waste core has an average particle size of 4.8 mm to 7 mm. In some embodiments, the roofing shingle waste core has an average particle size of 4.9 mm to 7 mm.

In some embodiments, the roofing shingle waste core has an average particle size of 5 mm to 7 mm. In some embodiments, the roofing shingle waste core has an average particle size of 5.1 mm to 7 mm. In some embodiments, the roofing shingle waste core has an average particle size of 5.2 mm to 7 mm. In some embodiments, the roofing shingle waste core has an average particle size of 5.3 mm to 7 mm. In some embodiments, the roofing shingle waste core has an average particle size of 5.4 mm to 7 mm. In some embodiments, the roofing shingle waste core has an average particle size of 5.5 mm to 7 mm. In some embodiments, the roofing shingle waste core has an average particle size of 5.6 mm to 7 mm. In some embodiments, the roofing shingle waste core has an average particle size of 5.7 mm to 7 mm. In some embodiments, the roofing shingle waste core has an average particle size of 5.8 mm to 7 mm. In some embodiments, the roofing shingle waste core has an average particle size of 5.9 mm to 7 mm.

In some embodiments, the roofing shingle waste core has an average particle size of 6 mm to 7 mm. In some embodiments, the roofing shingle waste core has an average particle size of 6.1 mm to 7 mm. In some embodiments, the roofing shingle waste core has an average particle size of 6.2 mm to 7 mm. In some embodiments, the roofing shingle waste core has an average particle size of 6.3 mm to 7 mm. In some embodiments, the roofing shingle waste core has an average particle size of 6.4 mm to 7 mm. In some embodiments, the roofing shingle waste core has an average particle size of 6.5 mm to 7 mm. In some embodiments, the roofing shingle waste core has an average particle size of 6.6 mm to 7 mm. In some embodiments, the roofing shingle waste core has an average particle size of 6.7 mm to 7 mm. In some embodiments, the roofing shingle waste core has an average particle size of 6.8 mm to 7 mm. In some embodiments, the roofing shingle waste core has an average particle size of 6.9 mm to 7 mm.

In some embodiments, the roofing shingle waste core has an average pore size of 100 nm to 2500 nm. In some embodiments, the roofing shingle waste core has an average pore size of 200 nm to 2500 nm. In some embodiments, the roofing shingle waste core has an average pore size of 300 nm to 2500 nm. In some embodiments, the roofing shingle waste core has an average pore size of 400 nm to 2500 nm. In some embodiments, the roofing shingle waste core has an average pore size of 500 nm to 2500 nm. In some embodiments, the roofing shingle waste core has an average pore size of 600 nm to 2500 nm. In some embodiments, the roofing shingle waste core has an average pore size of 700 nm to 2500 nm. In some embodiments, the roofing shingle waste core has an average pore size of 800 nm to 2500 nm. In some embodiments, the roofing shingle waste core has an average pore size of 900 nm to 2500 nm. In some embodiments, the roofing shingle waste core has an average pore size of 1000 nm to 2500 nm.

In some embodiments, the roofing shingle waste core has an average pore size of 1100 nm to 2500 nm. In some embodiments, the roofing shingle waste core has an average pore size of 1200 nm to 2500 nm. In some embodiments, the roofing shingle waste core has an average pore size of 1300 nm to 2500 nm. In some embodiments, the roofing shingle waste core has an average pore size of 1400 nm to 2500 nm. In some embodiments, the roofing shingle waste core has an average pore size of 1500 nm to 2500 nm. In some embodiments, the roofing shingle waste core has an average pore size of 1600 nm to 2500 nm. In some embodiments, the roofing shingle waste core has an average pore size of 1700 nm to 2500 nm. In some embodiments, the roofing shingle waste core has an average pore size of 1800 nm to 2500 nm. In some embodiments, the roofing shingle waste core has an average pore size of 1900 nm to 2500 nm. In some embodiments, the roofing shingle waste core has an average pore size of 2000 nm to 2500 nm.

In some embodiments, the roofing shingle waste core has an average pore size of 2100 nm to 2500 nm. In some embodiments, the roofing shingle waste core has an average pore size of 2200 nm to 2500 nm. In some embodiments, the roofing shingle waste core has an average pore size of 2300 nm to 2500 nm. In some embodiments, the roofing shingle waste core has an average pore size of 2400 nm to 2500 nm.

In some embodiments, the roofing shingle waste core has an average pore size of 100 nm to 2400 nm. In some embodiments, the roofing shingle waste core has an average pore size of 100 nm to 2300 nm. In some embodiments, the roofing shingle waste core has an average pore size of 100 nm to 2200 nm. In some embodiments, the roofing shingle waste core has an average pore size of 100 nm to 2100 nm. In some embodiments, the roofing shingle waste core has an average pore size of 100 nm to 2000 nm. In some embodiments, the roofing shingle waste core has an average pore size of 100 nm to 1900 nm. In some embodiments, the roofing shingle waste core has an average pore size of 100 nm to 1800 nm. In some embodiments, the roofing shingle waste core has an average pore size of 100 nm to 1700 nm. In some embodiments, the roofing shingle waste core has an average pore size of 100 nm to 1600 nm. In some embodiments, the roofing shingle waste core has an average pore size of 100 nm to 1500 nm. In some embodiments, the roofing shingle waste core has an average pore size of 100 nm to 1400 nm. In some embodiments, the roofing shingle waste core has an average pore size of 100 nm to 1300 nm. In some embodiments, the roofing shingle waste core has an average pore size of 100 nm to 1200 nm. In some embodiments, the roofing shingle waste core has an average pore size of 100 nm to 1100 nm. In some embodiments, the roofing shingle waste core has an average pore size of 100 nm to 1000 nm.

In some embodiments, the roofing shingle waste core has an average pore size of 100 nm to 900 nm. In some embodiments, the roofing shingle waste core has an average pore size of 100 nm to 800 nm. In some embodiments, the roofing shingle waste core has an average pore size of 100 nm to 700 nm. In some embodiments, the roofing shingle waste core has an average pore size of 100 nm to 600 nm. In some embodiments, the roofing shingle waste core has an average pore size of 100 nm to 500 nm. In some embodiments, the roofing shingle waste core has an average pore size of 100 nm to 400 nm. In some embodiments, the roofing shingle waste core has an average pore size of 100 nm to 300 nm. In some embodiments, the roofing shingle waste core has an average pore size of 100 nm to 200 nm.

In some embodiments, the roofing shingle waste core has an average pore volume of 10% to 50% based on a total volume of the roofing shingle waste core. In some embodiments, the roofing shingle waste core has an average pore volume of 15% to 50% based on the total volume of the roofing shingle waste core. In some embodiments, the roofing shingle waste core has an average pore volume of 20% to 50% based on the total volume of the roofing shingle waste core. In some embodiments, the roofing shingle waste core has an average pore volume of 25% to 50% based on the total volume of the roofing shingle waste core. In some embodiments, the roofing shingle waste core has an average pore volume of 30% to 50% based on the total volume of the roofing shingle waste core. In some embodiments, the roofing shingle waste core has an average pore volume of 35% to 50% based on the total volume of the roofing shingle waste core. In some embodiments, the roofing shingle waste core has an average pore volume of 40% to 50% based on the total volume of the roofing shingle waste core. In some embodiments, the roofing shingle waste core has an average pore volume of 45% to 50% based on the total volume of the roofing shingle waste core.

In some embodiments, the roofing shingle waste core has an average pore volume of 10% to 45% based on the total volume of the roofing shingle waste core. In some embodiments, the roofing shingle waste core has an average pore volume of 10% to 40% based on the total volume of the roofing shingle waste core. In some embodiments, the roofing shingle waste core has an average pore volume of 10% to 35% based on the total volume of the roofing shingle waste core. In some embodiments, the roofing shingle waste core has an average pore volume of 10% to 30% based on the total volume of the roofing shingle waste core. In some embodiments, the roofing shingle waste core has an average pore volume of 10% to 25% based on the total volume of the roofing shingle waste core. In some embodiments, the roofing shingle waste core has an average pore volume of 10% to 20% based on the total volume of the roofing shingle waste core. In some embodiments, the roofing shingle waste core has an average pore volume of 10% to 15% based on the total volume of the roofing shingle waste core.

In some embodiments, the roofing shingle waste core has an average pore volume of no more than 10% based on the total volume of the roofing shingle waste core. In some embodiments, the roofing shingle waste core has an average pore volume of no more than 9% based on the total volume of the roofing shingle waste core. In some embodiments, the roofing shingle waste core has an average pore volume of no more than 8% based on the total volume of the roofing shingle waste core. In some embodiments, the roofing shingle waste core has an average pore volume of no more than 7% based on the total volume of the roofing shingle waste core. In some embodiments, the roofing shingle waste core has an average pore volume of no more than 6% based on the total volume of the roofing shingle waste core. In some embodiments, the roofing shingle waste core has an average pore volume of no more than 5% based on the total volume of the roofing shingle waste core. In some embodiments, the roofing shingle waste core has an average pore volume of no more than 4% based on the total volume of the roofing shingle waste core. In some embodiments, the roofing shingle waste core has an average pore volume of no more than 3% based on the total volume of the roofing shingle waste core. In some embodiments, the roofing shingle waste core has an average pore volume of no more than 2% based on the total volume of the roofing shingle waste core. In some embodiments, the roofing shingle waste core has an average pore volume of no more than 1% based on the total volume of the roofing shingle waste core.

In some embodiments, the roofing shingle waste core is nonporous.

In some embodiments, the roofing shingle waste core comprises a base particle.

In some embodiments, the base particle has a surface. In some embodiments, the surface is an outer surface.

In some embodiments, the base particle comprises at least one of a mineral material, an inert material, a synthetic material, a naturally-occurring material, a rock material, an inorganic material, or any combination thereof. In some embodiments, the base particle comprises at least one of a stone dust, a crushed slate, a slate particle, a shale particle, a granule chip, a mica particle, a metal flake, a zeolite particle, a silica particle, a clay particle, or any combination thereof. In some embodiments, the base particle comprises at least one of a stone dust, a slate, a shale, a metal, a mica, a silica, a clay, a calcium hydroxide, an aluminosilicate, an alkali silicate, an alkali aluminosilicate clay, a sodium bicarbonate, a sodium carbonate, a sodium silicate, a feldspar, a nepheline syenite, a cristobalite, a kaolin, a bauxite, a ball clay, a montmorillonite, a talc, a slag, a granite, a silica sand, a sand, a greenstone, a metal oxide, a metal salt, an andesite, a porphyry, a marble, a syenite, a zeolite, a rhyolite, a diabase, a greystone, a quartz, a trap rock, a basalt, a marine shell, a crushed brick, a concrete, a porcelain, a fire clay, or any combination thereof.

In some embodiments, the base particle has an average particle size of 0.001 mm to 7 mm. In some embodiments, the base particle has an average particle size of 0.1 mm to 7 mm. In some embodiments, the base particle has an average particle size of 0.1 mm to 6.9 mm. In some embodiments, the base particle has an average particle size of 0.1 mm to 6.8 mm. In some embodiments, the base particle has an average particle size of 0.1 mm to 6.7 mm. In some embodiments, the base particle has an average particle size of 0.1 mm to 6.6 mm. In some embodiments, the base particle has an average particle size of 0.1 mm to 6.5 mm. In some embodiments, the base particle has an average particle size of 0.1 mm to 6.4 mm. In some embodiments, the base particle has an average particle size of 0.1 mm to 6.3 mm. In some embodiments, the base particle has an average particle size of 0.1 mm to 6.2 mm. In some embodiments, the base particle has an average particle size of 0.1 mm to 6.1 mm.

In some embodiments, the base particle has an average particle size of 0.1 mm to 6 mm. In some embodiments, the base particle has an average particle size of 0.1 mm to 5.9 mm. In some embodiments, the base particle has an average particle size of 0.1 mm to 5.8 mm. In some embodiments, the base particle has an average particle size of 0.1 mm to 5.7 mm. In some embodiments, the base particle has an average particle size of 0.1 mm to 5.6 mm. In some embodiments, the base particle has an average particle size of 0.1 mm to 5.5 mm. In some embodiments, the base particle has an average particle size of 0.1 mm to 5.4 mm. In some embodiments, the base particle has an average particle size of 0.1 mm to 5.3 mm. In some embodiments, the base particle has an average particle size of 0.1 mm to 5.2 mm. In some embodiments, the base particle has an average particle size of 0.1 mm to 5.1 mm.

In some embodiments, the base particle has an average particle size of 0.1 mm to 5 mm. In some embodiments, the base particle has an average particle size of 0.1 mm to 4.9 mm. In some embodiments, the base particle has an average particle size of 0.1 mm to 4.8 mm. In some embodiments, the base particle has an average particle size of 0.1 mm to 4.7 mm. In some embodiments, the base particle has an average particle size of 0.1 mm to 4.6 mm. In some embodiments, the base particle has an average particle size of 0.1 mm to 4.5 mm. In some embodiments, the base particle has an average particle size of 0.1 mm to 4.4 mm. In some embodiments, the base particle has an average particle size of 0.1 mm to 4.3 mm. In some embodiments, the base particle has an average particle size of 0.1 mm to 4.2 mm. In some embodiments, the base particle has an average particle size of 0.1 mm to 4.1 mm.

In some embodiments, the base particle has an average particle size of 0.1 mm to 4 mm. In some embodiments, the base particle has an average particle size of 0.1 mm to 3.9 mm. In some embodiments, the base particle has an average particle size of 0.1 mm to 3.8 mm. In some embodiments, the base particle has an average particle size of 0.1 mm to 3.7 mm. In some embodiments, the base particle has an average particle size of 0.1 mm to 3.6 mm. In some embodiments, the base particle has an average particle size of 0.1 mm to 3.5 mm. In some embodiments, the base particle has an average particle size of 0.1 mm to 3.4 mm. In some embodiments, the base particle has an average particle size of 0.1 mm to 3.3 mm. In some embodiments, the base particle has an average particle size of 0.1 mm to 3.2 mm. In some embodiments, the base particle has an average particle size of 0.1 mm to 3.1 mm.

In some embodiments, the base particle has an average particle size of 0.1 mm to 3 mm. In some embodiments, the base particle has an average particle size of 0.1 mm to 2.9 mm. In some embodiments, the base particle has an average particle size of 0.1 mm to 2.8 mm. In some embodiments, the base particle has an average particle size of 0.1 mm to 2.7 mm. In some embodiments, the base particle has an average particle size of 0.1 mm to 2.6 mm. In some embodiments, the base particle has an average particle size of 0.1 mm to 2.5 mm. In some embodiments, the base particle has an average particle size of 0.1 mm to 2.4 mm. In some embodiments, the base particle has an average particle size of 0.1 mm to 2.3 mm. In some embodiments, the base particle has an average particle size of 0.1 mm to 2.2 mm. In some embodiments, the base particle has an average particle size of 0.1 mm to 2.1 mm.

In some embodiments, the base particle has an average particle size of 0.1 mm to 2 mm. In some embodiments, the base particle has an average particle size of 0.1 mm to 1.9 mm. In some embodiments, the base particle has an average particle size of 0.1 mm to 1.8 mm. In some embodiments, the base particle has an average particle size of 0.1 mm to 1.7 mm. In some embodiments, the base particle has an average particle size of 0.1 mm to 1.6 mm. In some embodiments, the base particle has an average particle size of 0.1 mm to 1.5 mm. In some embodiments, the base particle has an average particle size of 0.1 mm to 1.4 mm. In some embodiments, the base particle has an average particle size of 0.1 mm to 1.3 mm. In some embodiments, the base particle has an average particle size of 0.1 mm to 1.2 mm. In some embodiments, the base particle has an average particle size of 0.1 mm to 1.1 mm.

In some embodiments, the base particle has an average particle size of 0.1 mm to 1 mm. In some embodiments, the base particle has an average particle size of 0.1 mm to 0.9 mm. In some embodiments, the base particle has an average particle size of 0.1 mm to 0.8 mm. In some embodiments, the base particle has an average particle size of 0.1 mm to 0.7 mm. In some embodiments, the base particle has an average particle size of 0.1 mm to 0.6 mm. In some embodiments, the base particle has an average particle size of 0.1 mm to 0.5 mm. In some embodiments, the base particle has an average particle size of 0.1 mm to 0.4 mm. In some embodiments, the base particle has an average particle size of 0.1 mm to 0.3 mm. In some embodiments, the base particle has an average particle size of 0.1 mm to 0.2 mm.

In some embodiments, the base particle has an average particle size of 0.2 mm to 7 mm. In some embodiments, the base particle has an average particle size of 0.3 mm to 7 mm. In some embodiments, the base particle has an average particle size of 0.4 mm to 7 mm. In some embodiments, the base particle has an average particle size of 0.5 mm to 7 mm. In some embodiments, the base particle has an average particle size of 0.6 mm to 7 mm. In some embodiments, the base particle has an average particle size of 0.7 mm to 7 mm. In some embodiments, the base particle has an average particle size of 0.8 mm to 7 mm. In some embodiments, the base particle has an average particle size of 0.9 mm to 7 mm.

In some embodiments, the base particle has an average particle size of 1 mm to 7 mm. In some embodiments, the base particle has an average particle size of 1.1 mm to 7 mm. In some embodiments, the base particle has an average particle size of 1.2 mm to 7 mm. In some embodiments, the base particle has an average particle size of 1.3 mm to 7 mm. In some embodiments, the base particle has an average particle size of 1.4 mm to 7 mm. In some embodiments, the base particle has an average particle size of 1.5 mm to 7 mm. In some embodiments, the base particle has an average particle size of 1.6 mm to 7 mm. In some embodiments, the base particle has an average particle size of 1.7 mm to 7 mm. In some embodiments, the base particle has an average particle size of 1.8 mm to 7 mm. In some embodiments, the base particle has an average particle size of 1.9 mm to 7 mm.

In some embodiments, the base particle has an average particle size of 2 mm to 7 mm. In some embodiments, the base particle has an average particle size of 2.1 mm to 7 mm. In some embodiments, the base particle has an average particle size of 2.2 mm to 7 mm. In some embodiments, the base particle has an average particle size of 2.3 mm to 7 mm. In some embodiments, the base particle has an average particle size of 2.4 mm to 7 mm. In some embodiments, the base particle has an average particle size of 2.5 mm to 7 mm. In some embodiments, the base particle has an average particle size of 2.6 mm to 7 mm. In some embodiments, the base particle has an average particle size of 2.7 mm to 7 mm. In some embodiments, the base particle has an average particle size of 2.8 mm to 7 mm. In some embodiments, the base particle has an average particle size of 2.9 mm to 7 mm.

In some embodiments, the base particle has an average particle size of 3 mm to 7 mm. In some embodiments, the base particle has an average particle size of 3.1 mm to 7 mm. In some embodiments, the base particle has an average particle size of 3.2 mm to 7 mm. In some embodiments, the base particle has an average particle size of 3.3 mm to 7 mm. In some embodiments, the base particle has an average particle size of 3.4 mm to 7 mm. In some embodiments, the base particle has an average particle size of 3.5 mm to 7 mm. In some embodiments, the base particle has an average particle size of 3.6 mm to 7 mm. In some embodiments, the base particle has an average particle size of 3.7 mm to 7 mm. In some embodiments, the base particle has an average particle size of 3.8 mm to 7 mm. In some embodiments, the base particle has an average particle size of 3.9 mm to 7 mm.

In some embodiments, the base particle has an average particle size of 4 mm to 7 mm. In some embodiments, the base particle has an average particle size of 4.1 mm to 7 mm. In some embodiments, the base particle has an average particle size of 4.2 mm to 7 mm. In some embodiments, the base particle has an average particle size of 4.3 mm to 7 mm. In some embodiments, the base particle has an average particle size of 4.4 mm to 7 mm. In some embodiments, the base particle has an average particle size of 4.5 mm to 7 mm. In some embodiments, the base particle has an average particle size of 4.6 mm to 7 mm. In some embodiments, the base particle has an average particle size of 4.7 mm to 7 mm. In some embodiments, the base particle has an average particle size of 4.8 mm to 7 mm. In some embodiments, the base particle has an average particle size of 4.9 mm to 7 mm.

In some embodiments, the base particle has an average particle size of 5 mm to 7 mm. In some embodiments, the base particle has an average particle size of 5.1 mm to 7 mm. In some embodiments, the base particle has an average particle size of 5.2 mm to 7 mm. In some embodiments, the base particle has an average particle size of 5.3 mm to 7 mm. In some embodiments, the base particle has an average particle size of 5.4 mm to 7 mm. In some embodiments, the base particle has an average particle size of 5.5 mm to 7 mm. In some embodiments, the base particle has an average particle size of 5.6 mm to 7 mm. In some embodiments, the base particle has an average particle size of 5.7 mm to 7 mm. In some embodiments, the base particle has an average particle size of 5.8 mm to 7 mm. In some embodiments, the base particle has an average particle size of 5.9 mm to 7 mm.

In some embodiments, the base particle has an average particle size of 6 mm to 7 mm. In some embodiments, the base particle has an average particle size of 6.1 mm to 7 mm. In some embodiments, the base particle has an average particle size of 6.2 mm to 7 mm. In some embodiments, the base particle has an average particle size of 6.3 mm to 7 mm. In some embodiments, the base particle has an average particle size of 6.4 mm to 7 mm. In some embodiments, the base particle has an average particle size of 6.5 mm to 7 mm. In some embodiments, the base particle has an average particle size of 6.6 mm to 7 mm. In some embodiments, the base particle has an average particle size of 6.7 mm to 7 mm. In some embodiments, the base particle has an average particle size of 6.8 mm to 7 mm. In some embodiments, the base particle has an average particle size of 6.9 mm to 7 mm.

In some embodiments, the base particle has an average particle size of less than 0.1 mm. In some embodiments, the base particle has an average particle size of less than 0.09 mm. In some embodiments, the base particle has an average particle size of less than 0.08 mm. In some embodiments, the base particle has an average particle size of less than 0.07 mm. In some embodiments, the base particle has an average particle size of less than 0.06 mm. In some embodiments, the base particle has an average particle size of less than 0.05 mm. In some embodiments, the base particle has an average particle size of less than 0.04 mm. In some embodiments, the base particle has an average particle size of less than 0.03 mm. In some embodiments, the base particle has an average particle size of less than 0.02 mm. In some embodiments, the base particle has an average particle size of less than 0.01 mm. In some embodiments, the base particle has an average particle size of less than 0.1 mm. In some embodiments, the base particle has an average particle size of less than 0.09 mm. In some embodiments, the base particle has an average particle size of less than 0.08 mm. In some embodiments, the base particle has an average particle size of less than 0.07 mm. In some embodiments, the base particle has an average particle size of less than 0.06 mm. In some embodiments, the base particle has an average particle size of less than 0.05 mm. In some embodiments, the base particle has an average particle size of less than 0.04 mm. In some embodiments, the base particle has an average particle size of less than 0.03 mm. In some embodiments, the base particle has an average particle size of less than 0.02 mm. In some embodiments, the base particle has an average particle size of less than 0.01 mm. In some embodiments, the base particle has an average particle size of less than 0.009 mm. In some embodiments, the base particle has an average particle size of less than 0.008 mm. In some embodiments, the base particle has an average particle size of less than 0.007 mm. In some embodiments, the base particle has an average particle size of less than 0.006 mm. In some embodiments, the base particle has an average particle size of less than 0.005 mm. In some embodiments, the base particle has an average particle size of less than 0.004 mm. In some embodiments, the base particle has an average particle size of less than 0.003 mm. In some embodiments, the base particle has an average particle size of less than 0.002 mm.

In some embodiments, the base particle has an average particle size of less than 0.001 mm to 0.1 mm. In some embodiments, the base particle has an average particle size of 0.001 mm to 0.09 mm. In some embodiments, the base particle has an average particle size of 0.001 mm to 0.08 mm. In some embodiments, the base particle has an average particle size of 0.001 mm to 0.07 mm. In some embodiments, the base particle has an average particle size of 0.001 mm to 0.06 mm. In some embodiments, the base particle has an average particle size of 0.001 mm to 0.05 mm. In some embodiments, the base particle has an average particle size of 0.001 mm to 0.04 mm. In some embodiments, the base particle has an average particle size of 0.001 mm to 0.03 mm. In some embodiments, the base particle has an average particle size of 0.001 mm to 0.02 mm. In some embodiments, the base particle has an average particle size of 0.001 mm to 0.01 mm. In some embodiments, the base particle has an average particle size of 0.001 mm to 0.009 mm. In some embodiments, the base particle has an average particle size of 0.001 mm to 0.008 mm. In some embodiments, the base particle has an average particle size of 0.001 mm to 0.007 mm. In some embodiments, the base particle has an average particle size of 0.001 mm to 0.006 mm. In some embodiments, the base particle has an average particle size of 0.001 mm to 0.005 mm. In some embodiments, the base particle has an average particle size of 0.001 mm to 0.004 mm. In some embodiments, the base particle has an average particle size of 0.001 mm to 0.003 mm. In some embodiments, the base particle has an average particle size of 0.001 mm to 0.002 mm.

In some embodiments, the base particle has an average particle size of 0.002 mm to 0.1 mm. In some embodiments, the base particle has an average particle size of 0.003 mm to 0.1 mm. In some embodiments, the base particle has an average particle size of 0.004 mm to 0.1 mm. In some embodiments, the base particle has an average particle size of 0.005 mm to 0.1 mm. In some embodiments, the base particle has an average particle size of 0.006 mm to 0.1 mm. In some embodiments, the base particle has an average particle size of 0.007 mm to 0.1 mm. In some embodiments, the base particle has an average particle size of 0.008 mm to 0.1 mm. In some embodiments, the base particle has an average particle size of 0.009 mm to 0.1 mm. In some embodiments, the base particle has an average particle size of 0.01 mm to 0.1 mm. In some embodiments, the base particle has an average particle size of 0.02 mm to 0.1 mm. In some embodiments, the base particle has an average particle size of 0.03 mm to 0.1 mm. In some embodiments, the base particle has an average particle size of 0.04 mm to 0.1 mm. In some embodiments, the base particle has an average particle size of 0.05 mm to 0.1 mm. In some embodiments, the base particle has an average particle size of 0.06 mm to 0.1 mm. In some embodiments, the base particle has an average particle size of 0.07 mm to 0.1 mm. In some embodiments, the base particle has an average particle size of 0.08 mm to 0.1 mm. In some embodiments, the base particle has an average particle size of 0.09 mm to 0.1 mm.

In some embodiments, the base particle has an average pore size of 50 nm to 2500 nm. In some embodiments, the base particle has an average pore size of 100 nm to 2500 nm. In some embodiments, the base particle has an average pore size of 200 nm to 2500 nm. In some embodiments, the base particle has an average pore size of 300 nm to 2500 nm. In some embodiments, the base particle has an average pore size of 400 nm to 2500 nm. In some embodiments, the base particle has an average pore size of 500 nm to 2500 nm. In some embodiments, the base particle has an average pore size of 600 nm to 2500 nm. In some embodiments, the base particle has an average pore size of 700 nm to 2500 nm. In some embodiments, the base particle has an average pore size of 800 nm to 2500 nm. In some embodiments, the base particle has an average pore size of 900 nm to 2500 nm. In some embodiments, the base particle has an average pore size of 1000 nm to 2500 nm.

In some embodiments, the base particle has an average pore size of 1100 nm to 2500 nm. In some embodiments, the base particle has an average pore size of 1200 nm to 2500 nm. In some embodiments, the base particle has an average pore size of 1300 nm to 2500 nm. In some embodiments, the base particle has an average pore size of 1400 nm to 2500 nm. In some embodiments, the base particle has an average pore size of 1500 nm to 2500 nm. In some embodiments, the base particle has an average pore size of 1600 nm to 2500 nm. In some embodiments, the base particle has an average pore size of 1700 nm to 2500 nm. In some embodiments, the base particle has an average pore size of 1800 nm to 2500 nm. In some embodiments, the base particle has an average pore size of 1900 nm to 2500 nm. In some embodiments, the base particle has an average pore size of 2000 nm to 2500 nm.

In some embodiments, the base particle has an average pore size of 2100 nm to 2500 nm. In some embodiments, the base particle has an average pore size of 2200 nm to 2500 nm. In some embodiments, the base particle has an average pore size of 2300 nm to 2500 nm. In some embodiments, the base particle has an average pore size of 2400 nm to 2500 nm.

In some embodiments, the base particle has an average pore size of 100 nm to 2400 nm. In some embodiments, the base particle has an average pore size of 100 nm to 2300 nm. In some embodiments, the base particle has an average pore size of 100 nm to 2200 nm. In some embodiments, the base particle has an average pore size of 100 nm to 2100 nm. In some embodiments, the base particle has an average pore size of 100 nm to 2000 nm. In some embodiments, the base particle has an average pore size of 100 nm to 1900 nm. In some embodiments, the base particle has an average pore size of 100 nm to 1800 nm. In some embodiments, the base particle has an average pore size of 100 nm to 1700 nm. In some embodiments, the base particle has an average pore size of 100 nm to 1600 nm. In some embodiments, the base particle has an average pore size of 100 nm to 1500 nm. In some embodiments, the base particle has an average pore size of 100 nm to 1400 nm. In some embodiments, the base particle has an average pore size of 100 nm to 1300 nm. In some embodiments, the base particle has an average pore size of 100 nm to 1200 nm. In some embodiments, the base particle has an average pore size of 100 nm to 1100 nm. In some embodiments, the base particle has an average pore size of 100 nm to 1000 nm.

In some embodiments, the base particle has an average pore size of 100 nm to 900 nm. In some embodiments, the base particle has an average pore size of 100 nm to 800 nm. In some embodiments, the base particle has an average pore size of 100 nm to 700 nm. In some embodiments, the base particle has an average pore size of 100 nm to 600 nm. In some embodiments, the base particle has an average pore size of 100 nm to 500 nm. In some embodiments, the base particle has an average pore size of 100 nm to 400 nm. In some embodiments, the base particle has an average pore size of 100 nm to 300 nm. In some embodiments, the base particle has an average pore size of 100 nm to 200 nm.

In some embodiments, the base particle has an average pore size of 50 nm to 2400 nm. In some embodiments, the base particle has an average pore size of 50 nm to 2300 nm. In some embodiments, the base particle has an average pore size of 50 nm to 2200 nm. In some embodiments, the base particle has an average pore size of 50 nm to 2100 nm. In some embodiments, the base particle has an average pore size of 50 nm to 2000 nm. In some embodiments, the base particle has an average pore size of 50 nm to 1900 nm. In some embodiments, the base particle has an average pore size of 50 nm to 1800 nm. In some embodiments, the base particle has an average pore size of 50 nm to 1700 nm. In some embodiments, the base particle has an average pore size of 50 nm to 1600 nm. In some embodiments, the base particle has an average pore size of 50 nm to 1500 nm. In some embodiments, the base particle has an average pore size of 50 nm to 1400 nm. In some embodiments, the base particle has an average pore size of 50 nm to 1300 nm. In some embodiments, the base particle has an average pore size of 50 nm to 1200 nm. In some embodiments, the base particle has an average pore size of 50 nm to 1100 nm. In some embodiments, the base particle has an average pore size of 50 nm to 1000 nm.

In some embodiments, the base particle has an average pore size of 50 nm to 900 nm. In some embodiments, the base particle has an average pore size of 50 nm to 800 nm. In some embodiments, the base particle has an average pore size of 50 nm to 700 nm. In some embodiments, the base particle has an average pore size of 50 nm to 600 nm. In some embodiments, the base particle has an average pore size of 50 nm to 500 nm. In some embodiments, the base particle has an average pore size of 50 nm to 400 nm. In some embodiments, the base particle has an average pore size of 50 nm to 300 nm. In some embodiments, the base particle has an average pore size of 50 nm to 200 nm.

In some embodiments, the base particle has an average pore volume of 10% to 50% based on a total volume of the base particle. In some embodiments, the base particle has an average pore volume of 15% to 50% based on the total volume of the base particle. In some embodiments, the base particle has an average pore volume of 20% to 50% based on the total volume of the base particle. In some embodiments, the base particle has an average pore volume of 25% to 50% based on the total volume of the base particle. In some embodiments, the base particle has an average pore volume of 30% to 50% based on the total volume of the base particle. In some embodiments, the base particle has an average pore volume of 35% to 50% based on the total volume of the base particle. In some embodiments, the base particle has an average pore volume of 40% to 50% based on the total volume of the base particle. In some embodiments, the base particle has an average pore volume of 45% to 50% based on the total volume of the base particle.

In some embodiments, the base particle has an average pore volume of 10% to 45% based on the total volume of the base particle. In some embodiments, the base particle has an average pore volume of 10% to 40% based on the total volume of the base particle. In some embodiments, the base particle has an average pore volume of 10% to 35% based on the total volume of the base particle. In some embodiments, the base particle has an average pore volume of 10% to 30% based on the total volume of the base particle. In some embodiments, the base particle has an average pore volume of 10% to 25% based on the total volume of the base particle. In some embodiments, the base particle has an average pore volume of 10% to 20% based on the total volume of the base particle. In some embodiments, the base particle has an average pore volume of 10% to 15% based on the total volume of the base particle.

In some embodiments, the roofing shingle waste core comprises a binder.

In some embodiments, the binder agglomerates a plurality of base particles, so as to obtain an agglomerate of base particles. In some embodiments, the binder is mixed with at least one base particle. In some embodiments, the binder is mixed with the plurality of base particles. In some embodiments, the roofing shingle waste core comprises a mixture of a binder and a plurality of base particles, wherein the binder agglomerates the plurality of base particles so as to obtain an agglomerate of base particles. In some embodiments, the agglomerate of base particles has a surface. In some embodiments, the surface is an outer surface.

In some embodiments, the binder comprises a substance that was not removed from the roofing shingle waste core reclaimed from the asphalt shingle waste or the base particle(s) reclaimed from the asphalt shingle waste. In some embodiments, for example, binder comprises a non-asphalt substance that remains on or within the base particle(s) or agglomerated base particles after the roofing shingle waste core is reclaimed from a recycled asphalt shingle waste process.

In some embodiments, the binder comprises at least one of a metal silicate binder, a cementitious binder, an organic binder, a polymeric binder (e.g., an acrylic polymer, an acrylic copolymer, or any combination thereof), an inorganic binder, or any combination thereof. In some embodiments, the binder comprises at least one of sodium silicate, gypsum, or any combination thereof. In some embodiments, the roofing shingle waste core does not comprise the binder.

In some embodiments, the roofing shingle waste core comprises an asphalt residue.

In some embodiments, the asphalt residue has a surface. In some embodiments, the surface is an outer surface.

In some embodiments, the asphalt residue directly contacts the roofing shingle waste core. In some embodiments, the asphalt residue directly contacts the surface of the roofing shingle waste core. In some embodiments, the asphalt residue directly contacts at least one base particle. In some embodiments, the asphalt residue directly contacts the surface of at least one base particle. In some embodiments, the asphalt residue directly contacts the agglomerated base particles. In some embodiments, the asphalt residue directly contacts the surface of agglomerated base particles. In some embodiments, the asphalt residue directly contacts the binder that agglomerates the base particles so as to form the agglomerated base particles. In some embodiments, the roofing granule does not comprise the asphalt residue.

In some embodiments, the asphalt residue comprises an asphalt or an asphalt substance that was not removed from the roofing shingle waste core reclaimed from the asphalt shingle waste or that was not removed from the base particle(s) reclaimed from the asphalt shingle waste. In some embodiments, for example, the asphalt residue comprises asphalt or asphalt substance that remains on or within the base particle(s) or agglomerated base particles after the roofing shingle waste core is reclaimed, recovered, or otherwise obtained from a recycled asphalt shingle waste process.

In some embodiments, the asphalt or asphalt substance of the asphalt residue comprises at least one of virgin asphalt, oxidized asphalt, unoxidized asphalt, polymer-modified asphalt, waste asphalt, or any combination thereof. In some embodiments, the waste asphalt comprises any form of asphalt that is obtained from asphalt shingle waste. In some embodiments, the virgin asphalt comprises any form of asphalt that is not obtained from asphalt shingle waste. In some embodiments, oxidized asphalt is asphalt that has been subjected to an oxidation procedure (e.g., air blowing at 450° F. to 500° F.).

In some embodiments, the polymer-modified asphalt comprises at least one of poly(styrene-butadiene-styrene) (SBS), a poly(styrene-ethylene/butylene-styrene) (SEBS), an atactic polypropylene (APP), an isotactic polypropylene (IPP), or any combination thereof.

In some embodiments, the asphalt residue comprises at least one filler. In some embodiments, the at least one filler comprises, consists of, or consists essentially of at least one of an organic filler, an inorganic filler, or any combination thereof. In some embodiments, the at least one filler comprises, consists of, or consists essentially of at least one of limestone, glass, calcium carbonate, barium sulfate, calcium sulfate, talc, perlite, silica, fumed silica, precipitated silica, quartz, aluminum trihydrate, magnesium hydroxide, ammonium polyphosphate, colemanite, titanium dioxide, calcium sulfate, fly ash, graphene nanoparticles, carbon black, recycled rubber tires, recycled thermoplastic resins, basalt, roofing granules, graphite, clay, or any combination thereof.

In some embodiments, the asphalt residue comprises one or more impurities, one or more contaminants, one or more additives, or combinations thereof. In some embodiments, the asphalt residue comprises one or more contaminants, impurities, or additives resulting from exposure to an environment, such as an ambient environment. In some embodiments, the asphalt residue comprises one or more contaminants, impurities, or additives resulting from the recycling asphalt shingle waste process. In some embodiments, the asphalt residue comprises one or more contaminants, impurities, or additives resulting from manufacturing processes.

As used herein, the term "covers" and similar terms refer to a surface coverage of a material, over all or a portion of a surface. In some embodiments, the material directly contacts the surface. In some embodiments, the material indirectly contacts the surface. For example, in some embodiments, a second material is disposed between the surface and the material covering the surface. In some embodiments, the surface coverage of a material is expressed as a percentage based on a total surface area of an article.

In some embodiments, the asphalt residue covers at least a portion of the surface of the roofing shingle waste core. In some embodiments, the asphalt residue covers at least 1% of the surface area of the roofing shingle waste core. In some embodiments, the asphalt residue covers at least 5% of the surface area of the roofing shingle waste core. In some embodiments, the asphalt residue covers at least 10% of the surface area of the roofing shingle waste core. In some embodiments, the asphalt residue covers at least 15% of the surface area of the roofing shingle waste core. In some embodiments, the asphalt residue covers at least 20% of the surface area of the roofing shingle waste core. In some embodiments, the asphalt residue covers at least 25% of the surface area of the roofing shingle waste core. In some embodiments, the asphalt residue covers at least 30% of the surface area of the roofing shingle waste core. In some embodiments, the asphalt residue covers at least 35% of the surface area of the roofing shingle waste core. In some embodiments, the asphalt residue covers at least 40% of the surface area of the roofing shingle waste core. In some embodiments, the asphalt residue covers at least 45% of the surface area of the roofing shingle waste core. In some embodiments, the asphalt residue covers at least 50% of the surface area of the roofing shingle waste core. In some embodiments, the asphalt residue covers at least 55% of the surface area of the roofing shingle waste core. In some embodiments, the asphalt residue covers at least 60% of the surface area of the roofing shingle waste core. In some embodiments, the asphalt residue covers at least 65% of the surface area of the roofing shingle waste core. In some embodiments, the asphalt residue covers at least 70% of the surface area of the roofing shingle waste core. In some embodiments, the asphalt residue covers at least 75% of the surface area of the roofing shingle waste core. In some embodiments, the asphalt residue covers at least 80% of the surface area of the roofing shingle waste core. In some embodiments, the asphalt residue covers at least 85% of the surface area of the roofing shingle waste core. In some embodiments, the asphalt residue covers at least 90% of the surface area of the roofing shingle waste core. In some embodiments, the asphalt residue covers at least 95% of the surface area of the roofing shingle waste core.

In some embodiments, the asphalt residue covers at least a portion of the surface of the base particle. In some embodiments, the asphalt residue covers at least 1% of the surface area of the base particle. In some embodiments, the asphalt residue covers at least 5% of the surface area of the base particle. In some embodiments, the asphalt residue covers at least 10% of the surface area of the base particle. In some embodiments, the asphalt residue covers at least 15% of the surface area of the base particle. In some embodiments, the asphalt residue covers at least 20% of the surface area of the base particle. In some embodiments, the asphalt residue covers at least 25% of the surface area of the base particle. In some embodiments, the asphalt residue covers at least 30% of the surface area of the base particle. In some embodiments, the asphalt residue covers at least 35% of the surface area of the base particle. In some embodiments, the asphalt residue covers at least 40% of the surface area of the base particle. In some embodiments, the asphalt residue covers at least 45% of the surface area of the base particle. In some embodiments, the asphalt residue covers at least 50% of the surface area of the base particle. In some embodiments, the asphalt residue covers at least 55% of the surface area of the base particle. In some embodiments, the asphalt residue covers at least 60% of the surface area of the base particle. In some embodiments, the asphalt residue covers at least 65% of the surface area of the base particle. In some embodiments, the asphalt residue covers at least 70% of the surface area of the base particle. In some embodiments, the asphalt residue covers at least 75% of the surface area of the base particle. In some embodiments, the asphalt residue covers at least 80% of the surface area of the base particle. In some embodiments, the asphalt residue covers at least 85% of the surface area of the base particle. In some embodiments, the asphalt residue covers at least 90% of the surface area of the base particle. In some embodiments, the asphalt residue covers at least 95% of the surface area of the base particle.

In some embodiments, the asphalt residue covers 1% to 99% of the surface area of the roofing shingle waste core. In some embodiments, the asphalt residue covers 1% to 95% of the surface area of the roofing shingle waste core. In some embodiments, the asphalt residue covers 1% to 90% of the surface area of the roofing shingle waste core. In some embodiments, the asphalt residue covers 1% to 85% of the surface area of the roofing shingle waste core. In some embodiments, the asphalt residue covers 1% to 80% of the surface area of the roofing shingle waste core. In some embodiments, the asphalt residue covers 1% to 75% of the surface area of the roofing shingle waste core. In some embodiments, the asphalt residue covers 1% to 70% of the surface area of the roofing shingle waste core. In some embodiments, the asphalt residue covers 1% to 65% of the surface area of the roofing shingle waste core. In some embodiments, the asphalt residue covers 1% to 60% of the surface area of the roofing shingle waste core. In some embodiments, the asphalt residue covers 1% to 55% of the surface area of the roofing shingle waste core. In some embodiments, the asphalt residue covers 1% to 50% of the surface area of the roofing shingle waste core. In some embodiments, the asphalt residue covers 1% to 45% of the surface area of the roofing shingle waste core. In some embodiments, the asphalt residue covers 1% to 40% of the surface area of the roofing shingle waste core. In some embodiments, the asphalt residue covers 1% to 35% of the surface area of the roofing shingle waste core. In some embodiments, the asphalt residue covers 1% to 30% of the surface area of the roofing shingle waste core. In some embodiments, the asphalt residue covers 1% to 25% of the surface area of the roofing shingle waste core. In some embodiments, the asphalt residue covers 1% to 20% of the surface area of the roofing shingle waste core. In some embodiments, the asphalt residue covers 1% to 15% of the surface area of the roofing shingle waste core. In some embodiments, the asphalt residue covers 1% to 10% of the surface area of the roofing shingle waste core. In some embodiments, the asphalt residue covers 1% to 5% of the surface area of the roofing shingle waste core.

In some embodiments, the asphalt residue covers 5% to 99% of the surface area of the roofing shingle waste core. In some embodiments, the asphalt residue covers 10% to 99% of the surface area of the roofing shingle waste core. In some embodiments, the asphalt residue covers 15% to 99% of the surface area of the roofing shingle waste core. In some embodiments, the asphalt residue covers 20% to 99% of the surface area of the roofing shingle waste core. In some embodiments, the asphalt residue covers 25% to 99% of the surface area of the roofing shingle waste core. In some embodiments, the asphalt residue covers 30% to 99% of the surface area of the roofing shingle waste core. In some embodiments, the asphalt residue covers 35% to 99% of the surface area of the roofing shingle waste core. In some embodiments, the asphalt residue covers 40% to 99% of the surface area of the roofing shingle waste core. In some embodiments, the asphalt residue covers 45% to 99% of the surface area of the roofing shingle waste core. In some embodiments, the asphalt residue covers 50% to 99% of the surface area of the roofing shingle waste core. In some embodiments, the asphalt residue covers 55% to 99% of the surface area of the roofing shingle waste core. In some embodiments, the asphalt residue covers 60% to 99% of the surface area of the roofing shingle waste core. In some embodiments, the asphalt residue covers 65% to 99% of the surface area of the roofing shingle waste core. In some embodiments, the asphalt residue covers 70% to 99% of the surface area of the roofing shingle waste core. In some embodiments, the asphalt residue covers 75% to 99% of the surface area of the roofing shingle waste core. In some embodiments, the asphalt residue covers 80% to 99% of the surface area of the roofing shingle waste core. In some embodiments, the asphalt residue covers 85% to 99% of the surface area of the roofing shingle waste core. In some embodiments, the asphalt residue covers 90% to 99% of the surface area of the roofing shingle waste core. In some embodiments, the asphalt residue covers 95% to 99% of the surface area of the roofing shingle waste core.

In some embodiments, the asphalt residue covers 1% to 99% of the base particle. In some embodiments, the asphalt residue covers 1% to 95% of the base particle. In some embodiments, the asphalt residue covers 1% to 90% of the base particle. In some embodiments, the asphalt residue covers 1% to 85% of the base particle. In some embodiments, the asphalt residue covers 1% to 80% of the base particle. In some embodiments, the asphalt residue covers 1% to 75% of the base particle. In some embodiments, the asphalt residue covers 1% to 70% of the base particle. In some embodiments, the asphalt residue covers 1% to 65% of the base particle. In some embodiments, the asphalt residue covers 1% to 60% of the base particle. In some embodiments, the asphalt residue covers 1% to 55% of the base particle. In some embodiments, the asphalt residue covers 1% to 50% of the base particle. In some embodiments, the asphalt residue covers 1% to 45% of the base particle. In some embodiments, the asphalt residue covers 1% to 40% of the base particle. In some embodiments, the asphalt residue covers 1% to 35% of the base particle. In some embodiments, the asphalt residue covers 1% to 30% of the base particle. In some embodiments, the asphalt residue covers 1% to 25% of the base particle. In some embodiments, the asphalt residue covers 1% to 20% of the base particle. In some embodiments, the asphalt residue covers 1% to 15% of the base particle. In some embodiments, the asphalt residue covers 1% to 10% of the base particle. In some embodiments, the asphalt residue covers 1% to 5% of the base particle.

In some embodiments, the asphalt residue covers 5% to 99% of the base particle. In some embodiments, the asphalt residue covers 10% to 99% of the base particle. In some embodiments, the asphalt residue covers 15% to 99% of the base particle. In some embodiments, the asphalt residue covers 20% to 99% of the base particle. In some embodiments, the asphalt residue covers 25% to 99% of the base particle. In some embodiments, the asphalt residue covers 30% to 99% of the base particle. In some embodiments, the asphalt residue covers 35% to 99% of the base particle. In some embodiments, the asphalt residue covers 40% to 99% of the base particle. In some embodiments, the asphalt residue covers 45% to 99% of the base particle. In some embodiments, the asphalt residue covers 50% to 99% of the base particle. In some embodiments, the asphalt residue covers 55% to 99% of the base particle. In some embodiments, the asphalt residue covers 60% to 99% of the base particle. In some embodiments, the asphalt residue covers 65% to 99% of the base particle. In some embodiments, the asphalt residue covers 70% to 99% of the base particle. In some embodiments, the asphalt residue covers 75% to 99% of the base particle. In some embodiments, the asphalt residue covers 80% to 99% of the base particle. In some embodiments, the asphalt residue covers 85% to 99% of the base particle. In some embodiments, the asphalt residue covers 90% to 99% of the base particle. In some embodiments, the asphalt residue covers 95% to 99% of the base particle.

In some embodiments, the asphalt residue encapsulates the roofing shingle waste core. In some embodiments, the term encapsulates refers to covering an object (e.g., the roofing shingle waste core) in its entirety.

In some embodiments, at least a portion of the asphalt residue has a thickness of 1 µm to 500 µm. In some embodiments, at least a portion of the asphalt residue has a thickness of 1 µm to 480 µm. In some embodiments, at least a portion of the asphalt residue has a thickness of 1 µm to 460 µm. In some embodiments, at least a portion of the asphalt residue has a thickness of 1 µm to 440 µm. In some embodiments, at least a portion of the asphalt residue has a thickness of 1 µm to 420 µm. In some embodiments, at least a portion of the asphalt residue has a thickness of 1 µm to 400 µm. In some embodiments, at least a portion of the asphalt residue has a thickness of 1 µm to 380 µm. In some embodiments, at least a portion of the asphalt residue has a thickness of 1 µm to 360 µm. In some embodiments, at least a portion of the asphalt residue has a thickness of 1 µm to 340 µm. In some embodiments, at least a portion of the asphalt residue has a thickness of 1 µm to 320 µm. In some embodiments, at least a portion of the asphalt residue has a thickness of 1 µm to 300 µm. In some embodiments, at least a portion of the asphalt residue has a thickness of 1 µm to 280 µm. In some embodiments, at least a portion of the asphalt residue has a thickness of 1 µm to 260 µm. In some embodiments, at least a portion of the asphalt residue has a thickness of 1 µm to 240 µm. In some embodiments, at least a portion of the asphalt residue has a thickness of 1 µm to 220 µm. In some embodiments, at least a portion of the asphalt residue has a thickness of 1 µm to 200 µm. In some embodiments, at least a portion of the asphalt residue has a thickness of 1 µm to 180 µm. In some embodiments, at least a portion of the asphalt residue has a thickness of 1 µm to 160 µm. In some embodiments, at least a portion of the asphalt residue has a thickness of 1 µm to 140 µm. In some embodiments, at least a portion of the asphalt residue has a thickness of 1 µm to 120 µm. In some embodiments, at least a portion of the asphalt residue has a thickness of 1 µm to 100 µm. In some embodiments, at least a portion of the asphalt residue has a thickness of 1 µm to 80 µm. In some embodiments, at least a portion of the asphalt residue has a thickness of 1 µm to 60 µm. In some embodiments, at least a portion of the asphalt residue has a thickness of 1 µm to 40 µm. In some embodiments, at least a portion of the asphalt residue has a thickness of 1 µm to 20 µm.

In some embodiments, at least a portion of the asphalt residue has a thickness of 20 µm to 500 µm. In some embodiments, at least a portion of the asphalt residue has a thickness of 40 µm to 500 µm. In some embodiments, at least a portion of the asphalt residue has a thickness of 60 µm to 500 µm. In some embodiments, at least a portion of the asphalt residue has a thickness of 80 µm to 500 µm. In some embodiments, at least a portion of the asphalt residue has a thickness of 100 µm to 500 µm. In some embodiments, at least a portion of the asphalt residue has a thickness of 120 µm to 500 µm. In some embodiments, at least a portion of the asphalt residue has a thickness of 140 µm to 500 µm. In some embodiments, at least a portion of the asphalt residue has a thickness of 160 µm to 500 µm. In some embodiments, at least a portion of the asphalt residue has a thickness of 180 µm to 500 µm. In some embodiments, at least a portion of the asphalt residue has a thickness of 200 µm to 500 µm. In some embodiments, at least a portion of the asphalt residue has a thickness of 220 µm to 500 µm. In some embodiments, at least a portion of the asphalt residue has a thickness of 240 µm to 500 µm. In some embodiments, at least a portion of the asphalt residue has a thickness of 260 µm to 500 µm. In some embodiments, at least a portion of the asphalt residue has a thickness of 280 µm to 500 µm. In some embodiments, at least a portion of the asphalt residue has a thickness of 300 µm to 500 µm. In some embodiments, at least a portion of the asphalt residue has a thickness of 320 µm to 500 µm. In some embodiments, at least a portion of the asphalt residue has a thickness of 340 µm to 500 µm. In some embodiments, at least a portion of the asphalt residue has a thickness of 360 µm to 500 µm. In some embodiments, at least a portion of the asphalt residue has a thickness of 380 µm to 500 µm. In some embodiments, at least a portion of the asphalt residue has a thickness of 400 µm to 500 µm. In some embodiments, at least a portion of the asphalt residue has a thickness of 420 µm to 500 µm. In some embodiments, at least a portion of the asphalt residue has a thickness of 440 µm to 500 µm. In some embodiments, at least a portion of the asphalt residue has a thickness of 460 µm to 500 µm. In some embodiments, at least a portion of the asphalt residue has a thickness of 480 µm to 500 µm.

In some embodiments, at least a portion of the asphalt residue has a thickness of 5 µm to 200 µm. In some embodiments, at least a portion of the asphalt residue has a thickness of 50 µm to 200 µm. In some embodiments, at least a portion of the asphalt residue has a thickness of 75 µm to 200 µm. In some embodiments, at least a portion of the asphalt residue has a thickness of 25 µm to 250 µm.

In some embodiments, the roofing shingle waste core comprises a non-asphalt residue.

In some embodiments, the non-asphalt residue has a surface. In some embodiments, the surface is an outer surface.

In some embodiments, the non-asphalt residue directly contacts the roofing shingle waste core. In some embodiments, the non-asphalt residue directly contacts the surface of the roofing shingle waste core. In some embodiments, the non-asphalt residue directly contacts at least one base particle. In some embodiments, the non-asphalt residue directly contacts the surface of at least one base particle. In some embodiments, the non-asphalt residue directly contacts the agglomerated base particles. In some embodiments, the non-asphalt residue directly contacts the surface of agglomerated base particles. In some embodiments, the non-asphalt residue directly contacts the binder that agglomerates the base particles so as to form the agglomerated base particles. In some embodiments, the roofing granule does not comprise the non-asphalt residue.

In some embodiments, the non-asphalt residue comprises a non-asphalt substance that was not removed from the roofing shingle waste core reclaimed from the asphalt shingle waste or that was not removed from the base particle(s) reclaimed from the asphalt shingle waste. In some embodiments, for example, the non-asphalt residue comprises a non-asphalt substance that remains on or within the base particle(s) or agglomerated base particles after the roofing shingle waste core is reclaimed, recovered, or otherwise obtained from a recycled asphalt shingle waste process. In some embodiments, the non-asphalt substance of the non-asphalt residue comprises at least one of organic residue(s), coating(s), colored coating(s), inorganic coating(s), organic surface treatment(s), inorganic surface treatment(s), impurities (e.g., from asphalt shingle waste), contaminant(s), any other residue present on the core prior to processing in a recycled asphalt shingle waste process (e.g., coatings, paints, etc.), or any combination thereof. In some embodiments, the asphalt residue comprises the non-asphalt residue.

In some embodiments, the non-asphalt residue covers at least a portion of the surface of the roofing shingle waste core. In some embodiments, the non-asphalt residue covers at least 1% of the surface area of the roofing shingle waste core. In some embodiments, the non-asphalt residue covers at least 5% of the surface area of the roofing shingle waste core. In some embodiments, the non-asphalt residue covers at least 10% of the surface area of the roofing shingle waste core. In some embodiments, the non-asphalt residue covers at least 15% of the surface area of the roofing shingle waste core. In some embodiments, the non-asphalt residue covers at least 20% of the surface area of the roofing shingle waste core. In some embodiments, the non-asphalt residue covers at least 25% of the surface area of the roofing shingle waste core. In some embodiments, the non-asphalt residue covers at least 30% of the surface area of the roofing shingle waste core. In some embodiments, the non-asphalt residue covers at least 35% of the surface area of the roofing shingle waste core. In some embodiments, the non-asphalt residue covers at least 40% of the surface area of the roofing shingle waste core. In some embodiments, the non-asphalt residue covers at least 45% of the surface area of the roofing shingle waste core. In some embodiments, the non-asphalt residue covers at least 50% of the surface area of the roofing shingle waste core. In some embodiments, the non-asphalt residue covers at least 55% of the surface area of the roofing shingle waste core. In some embodiments, the non-asphalt residue covers at least 60% of the surface area of the roofing shingle waste core. In some embodiments, the non-asphalt residue covers at least 65% of the surface area of the roofing shingle waste core. In some embodiments, the non-asphalt residue covers at least 70% of the surface area of the roofing shingle waste core. In some embodiments, the non-asphalt residue covers at least 75% of the surface area of the roofing shingle waste core. In some embodiments, the non-asphalt residue covers at least 80% of the surface area of the roofing shingle waste core. In some embodiments, the non-asphalt residue covers at least 85% of the surface area of the roofing shingle waste core. In some embodiments, the non-asphalt residue covers at least 90% of the surface area of the roofing shingle waste core. In some embodiments, the non-asphalt residue covers at least 95% of the surface area of the roofing shingle waste core.

In some embodiments, the non-asphalt residue covers 1% to 99% of the surface area of the roofing shingle waste core. In some embodiments, the non-asphalt residue covers 1% to 95% of the surface area of the roofing shingle waste core. In some embodiments, the non-asphalt residue covers 1% to 90% of the surface area of the roofing shingle waste core. In some embodiments, the non-asphalt residue covers 1% to 85% of the surface area of the roofing shingle waste core. In some embodiments, the non-asphalt residue covers 1% to 80% of the surface area of the roofing shingle waste core. In some embodiments, the non-asphalt residue covers 1% to 75% of the surface area of the roofing shingle waste core. In some embodiments, the non-asphalt residue covers 1% to 70% of the surface area of the roofing shingle waste core. In some embodiments, the non-asphalt residue covers 1% to 65% of the surface area of the roofing shingle waste core. In some embodiments, the non-asphalt residue covers 1% to 60% of the surface area of the roofing shingle waste core. In some embodiments, the non-asphalt residue covers 1% to 55% of the surface area of the roofing shingle waste core. In some embodiments, the non-asphalt residue covers 1% to 50% of the surface area of the roofing shingle waste core. In some embodiments, the non-asphalt residue covers 1% to 45% of the surface area of the roofing shingle waste core. In some embodiments, the non-asphalt residue covers 1% to 40% of the surface area of the roofing shingle waste core. In some embodiments, the non-asphalt residue covers 1% to 35% of the surface area of the roofing shingle waste core. In some embodiments, the non-asphalt residue covers 1% to 30% of the surface area of the roofing shingle waste core. In some embodiments, the non-asphalt residue covers 1% to 25% of the surface area of the roofing shingle waste core. In some embodiments, the non-asphalt residue covers 1% to 20% of the surface area of the roofing shingle waste core. In some embodiments, the non-asphalt residue covers 1% to 15% of the surface area of the roofing shingle waste core. In some embodiments, the non-asphalt residue covers 1% to 10% of the surface area of the roofing shingle waste core. In some embodiments, the non-asphalt residue covers 1% to 5% of the surface area of the roofing shingle waste core.

In some embodiments, the non-asphalt residue covers 5% to 99% of the surface area of the roofing shingle waste core. In some embodiments, the non-asphalt residue covers 10% to 99% of the surface area of the roofing shingle waste core. In some embodiments, the non-asphalt residue covers 15% to 99% of the surface area of the roofing shingle waste core. In some embodiments, the non-asphalt residue covers 20% to 99% of the surface area of the roofing shingle waste core. In some embodiments, the non-asphalt residue covers 25% to 99% of the surface area of the roofing shingle waste core. In some embodiments, the non-asphalt residue covers 30% to 99% of the surface area of the roofing shingle waste core. In some embodiments, the non-asphalt residue covers 35% to 99% of the surface area of the roofing shingle waste core. In some embodiments, the non-asphalt residue covers 40% to 99% of the surface area of the roofing shingle waste core. In some embodiments, the non-asphalt residue covers 45% to 99% of the surface area of the roofing shingle waste core. In some embodiments, the non-asphalt residue covers 50% to 99% of the surface area of the roofing shingle waste core. In some embodiments, the non-asphalt residue covers 55% to 99% of the surface area of the roofing shingle waste core. In some embodiments, the non-asphalt residue covers 60% to 99% of the surface area of the roofing shingle waste core. In some embodiments, the non-asphalt residue covers 65% to 99% of the surface area of the roofing shingle waste core. In some embodiments, the non-asphalt residue covers 70% to 99% of the surface area of the roofing shingle waste core. In some embodiments, the non-asphalt residue covers 75% to 99% of the surface area of the roofing shingle waste core. In some embodiments, the non-asphalt residue covers 80% to 99% of the surface area of the roofing shingle waste core. In some embodiments, the non-asphalt residue covers 85% to 99% of the surface area of the roofing shingle waste core. In some embodiments, the non-asphalt residue covers 90% to 99% of the surface area of the roofing shingle waste core. In some embodiments, the non-asphalt residue covers 95% to 99% of the surface area of the roofing shingle waste core.

In some embodiments, at least a portion of the non-asphalt residue has a thickness of 1 µm to 500 µm. In some embodiments, at least a portion of the non-asphalt residue has a thickness of 1 µm to 480 µm. In some embodiments, at least a portion of the non-asphalt residue has a thickness of 1 µm to 460 µm. In some embodiments, at least a portion of the non-asphalt residue has a thickness of 1 µm to 440 µm. In some embodiments, at least a portion of the non-asphalt residue has a thickness of 1 µm to 420 µm. In some embodiments, at least a portion of the non-asphalt residue has a thickness of 1 µm to 400 µm. In some embodiments, at least a portion of the non-asphalt residue has a thickness of 1 µm to 380 µm. In some embodiments, at least a portion of the non-asphalt residue has a thickness of 1 µm to 360 µm. In some embodiments, at least a portion of the non-asphalt residue has a thickness of 1 µm to 340 µm. In some embodiments, at least a portion of the non-asphalt residue has a thickness of 1 µm to 320 µm. In some embodiments, at least a portion of the non-asphalt residue has a thickness of 1 µm to 300 µm. In some embodiments, at least a portion of the non-asphalt residue has a thickness of 1 µm to 280 µm. In some embodiments, at least a portion of the non-asphalt residue has a thickness of 1 µm to 260 µm. In some embodiments, at least a portion of the non-asphalt residue has a thickness of 1 µm to 240 µm. In some embodiments, at least a portion of the non-asphalt residue has a thickness of 1 µm to 220 µm. In some embodiments, at least a portion of the non-asphalt residue has a thickness of 1 µm to 200 µm. In some embodiments, at least a portion of the non-asphalt residue has a thickness of 1 µm to 180 µm. In some embodiments, at least a portion of the non-asphalt residue has a thickness of 1 µm to 160 µm. In some embodiments, at least a portion of the non-asphalt residue has a thickness of 1 µm to 140 µm. In some embodiments, at least a portion of the non-asphalt residue has a thickness of 1 µm to 120 µm. In some embodiments, at least a portion of the non-asphalt residue has a thickness of 1 µm to 100 µm. In some embodiments, at least a portion of the non-asphalt residue has a thickness of 1 µm to 80 µm. In some embodiments, at least a portion of the non-asphalt residue has a thickness of 1 µm to 60 µm. In some embodiments, at least a portion of the non-asphalt residue has a thickness of 1 µm to 40 µm. In some embodiments, at least a portion of the non-asphalt residue has a thickness of 1 µm to 20 µm.

In some embodiments, at least a portion of the non-asphalt residue has a thickness of 20 µm to 500 µm. In some embodiments, at least a portion of the non-asphalt residue has a thickness of 40 µm to 500 µm. In some embodiments, at least a portion of the non-asphalt residue has a thickness of 60 µm to 500 µm. In some embodiments, at least a portion of the non-asphalt residue has a thickness of 80 µm to 500 µm. In some embodiments, at least a portion of the non-asphalt residue has a thickness of 100 µm to 500 µm. In some embodiments, at least a portion of the non-asphalt residue has a thickness of 120 µm to 500 µm. In some embodiments, at least a portion of the non-asphalt residue has a thickness of 140 µm to 500 µm. In some embodiments, at least a portion of the non-asphalt residue has a thickness of 160 µm to 500 µm. In some embodiments, at least a portion of the non-asphalt residue has a thickness of 180 µm to 500 µm. In some embodiments, at least a portion of the non-asphalt residue has a thickness of 200 µm to 500 µm. In some embodiments, at least a portion of the non-asphalt residue has a thickness of 320 µm to 500 µm. In some embodiments, at least a portion of the non-asphalt residue has a thickness of 340 µm to 500 µm. In some embodiments, at least a portion of the non-asphalt residue has a thickness of 360 µm to 500 µm. In some embodiments, at least a portion of the non-asphalt residue has a thickness of 380 µm to 500 µm. In some embodiments, at least a portion of the non-asphalt residue has a thickness of 400 µm to 500 µm. In some embodiments, at least a portion of the non-asphalt residue has a thickness of 420 µm to 500 µm. In some embodiments, at least a portion of the non-asphalt residue has a thickness of 440 µm to 500 µm. In some embodiments, at least a portion of the non-asphalt residue has a thickness of 460 µm to 500 µm. In some embodiments, at least a portion of the non-asphalt residue has a thickness of 480 µm to 500 µm.

In some embodiments, at least a portion of the non-asphalt residue has a thickness of 5 µm to 200 µm. In some embodiments, at least a portion of the non-asphalt residue has a thickness of 50 µm to 200 µm. In some embodiments, at least a portion of the non-asphalt residue has a thickness of 75 µm to 200 µm. In some embodiments, at least a portion of the non-asphalt residue has a thickness of 25 µm to 250 µm.

In some embodiments, the roofing shingle waste core comprises at least 70% by weight of the base particle based on the total weight of the roofing shingle waste core. In some embodiments, the roofing shingle waste core comprises at least 72% by weight of the base particle based on the total weight of the roofing shingle waste core. In some embodiments, the roofing shingle waste core comprises at least 74% by weight of the base particle based on the total weight of the roofing shingle waste core. In some embodiments, the roofing shingle waste core comprises at least 75% by weight of the base particle based on the total weight of the roofing shingle waste core. In some embodiments, the roofing shingle waste core comprises at least 76% by weight of the base particle based on the total weight of the roofing shingle waste core. In some embodiments, the roofing shingle waste core comprises at least 78% by weight of the base particle based on the total weight of the roofing shingle waste core. In some embodiments, the roofing shingle waste core comprises at least 80% by weight of the base particle based on the total weight of the roofing shingle waste core. In some embodiments, the roofing shingle waste core comprises at least 82% by weight of the base particle based on the total weight of the roofing shingle waste core. In some embodiments, the roofing shingle waste core comprises at least 84% by weight of the base particle based on the total weight of the roofing shingle waste core. In some embodiments, the roofing shingle waste core comprises at least 85% by weight of the base particle based on the total weight of the roofing shingle waste core. In some embodiments, the roofing shingle waste core comprises at least 86% by weight of the base particle based on the total weight of the roofing shingle waste core. In some embodiments, the roofing shingle waste core comprises at least 88% by weight of the base particle based on the total weight of the roofing shingle waste core. In some embodiments, the roofing shingle waste core comprises at least 90% by weight of the base particle based on the total weight of the roofing shingle waste core. In some embodiments, the roofing shingle waste core comprises at least 92% by weight of the base particle based on the total weight of the roofing shingle waste core. In some embodiments, the roofing shingle waste core comprises at least 94% by weight of the base particle based on the total weight of the roofing shingle waste core.

In some embodiments, the roofing shingle waste core comprises 70% to 95% by weight of the base particle based on the total weight of the roofing shingle waste core. In some embodiments, the roofing shingle waste core comprises 70% to 90% by weight of the base particle based on the total weight of the roofing shingle waste core. In some embodiments, the roofing shingle waste core comprises 70% to 85% by weight of the base particle based on the total weight of the roofing shingle waste core. In some embodiments, the roofing shingle waste core comprises 70% to 80% by weight of the base particle based on the total weight of the roofing shingle waste core. In some embodiments, the roofing shingle waste core comprises 70% to 75% by weight of the base particle based on the total weight of the roofing shingle waste core. In some embodiments, the roofing shingle waste core comprises 75% to 95% by weight of the base particle based on the total weight of the roofing shingle waste core. In some embodiments, the roofing shingle waste core comprises 80% to 95% by weight of the base particle based on the total weight of the roofing shingle waste core. In some embodiments, the roofing shingle waste core comprises 85% to 95% by weight of the base particle based on the total weight of the roofing shingle waste core. In some embodiments, the roofing shingle waste core comprises 90% to 95% by weight of the base particle based on the total weight of the roofing shingle waste core.

In some embodiments, the roofing shingle waste core comprises at least 1%, at least 2%, at least 3%, at least 5%, or at least 10% by weight of the binder based on the total weight of the roofing shingle waste core. In some embodiments, the roofing shingle waste core comprises 1% to 10% by weight of the binder based on the total weight of the roofing shingle waste core. In some embodiments, the roofing shingle waste core comprises 1% to 9% by weight of the binder based on the total weight of the roofing shingle waste core. In some embodiments, the roofing shingle waste core comprises 1% to 8% by weight of the binder based on the total weight of the roofing shingle waste core. In some embodiments, the roofing shingle waste core comprises 1% to 7% by weight of the binder based on the total weight of the roofing shingle waste core. In some embodiments, the roofing shingle waste core comprises 1% to 6% by weight of the binder based on the total weight of the roofing shingle waste core. In some embodiments, the roofing shingle waste core comprises 1% to 5% by weight of the binder based on the total weight of the roofing shingle waste core. In some embodiments, the roofing shingle waste core comprises 1% to 4% by weight of the binder based on the total weight of the roofing shingle waste core. In some embodiments, the roofing shingle waste core comprises 1% to 3% by weight of the binder based on the total weight of the roofing shingle waste core. In some embodiments, the roofing shingle waste core comprises 1% to 2% by weight of the binder based on the total weight of the roofing shingle waste core.

In some embodiments, the roofing shingle waste core comprises 2% to 10% by weight of the binder based on the total weight of the roofing shingle waste core. In some embodiments, the roofing shingle waste core comprises 3% to 10% by weight of the binder based on the total weight of the roofing shingle waste core. In some embodiments, the roofing shingle waste core comprises 4% to 10% by weight of the binder based on the total weight of the roofing shingle waste core. In some embodiments, the roofing shingle waste core comprises 5% to 10% by weight of the binder based on the total weight of the roofing shingle waste core. In some embodiments, the roofing shingle waste core comprises 6% to 10% by weight of the binder based on the total weight of the roofing shingle waste core. In some embodiments, the roofing shingle waste core comprises 7% to 10% by weight of the binder based on the total weight of the roofing shingle waste core. In some embodiments, the roofing shingle waste core comprises 8% to 10% by weight of the binder based on the total weight of the roofing shingle waste core. In some embodiments, the roofing shingle waste core comprises 9% to 10% by weight of the binder based on the total weight of the roofing shingle waste core.

In some embodiments, the roofing shingle waste core comprises 2% to 8% by weight of the binder based on the total weight of the roofing shingle waste core. In some embodiments, the roofing shingle waste core comprises 2% to 6% by weight of the binder based on the total weight of the roofing shingle waste core. In some embodiments, the roofing shingle waste core comprises 3% to 6% by weight of the binder based on the total weight of the roofing shingle waste core. In some embodiments, the roofing shingle waste core comprises 2% to 4% by weight of the binder based on the total weight of the roofing shingle waste core.

In some embodiments, the roofing shingle waste core comprises at least 0.5% by weight of the asphalt residue based on the total weight of the roofing shingle waste core. In some embodiments, the roofing shingle waste core comprises at least 5% by weight of the asphalt residue based on the total weight of the roofing shingle waste core. In some embodiments, the roofing shingle waste core comprises at least 10% by weight of the asphalt residue based on the total weight of the roofing shingle waste core. In some embodiments, the roofing shingle waste core comprises at least 15% by weight of the asphalt residue based on the total weight of the roofing shingle waste core. In some embodiments, the roofing shingle waste core comprises at least 20% by weight of the asphalt residue based on the total weight of the roofing shingle waste core. In some embodiments, the roofing shingle waste core comprises at least 25% by weight of the asphalt residue based on the total weight of the roofing shingle waste core.

In some embodiments, the roofing shingle waste core comprises 0.5% to 50% by weight of the asphalt residue based on the total weight of the roofing shingle waste core. In some embodiments, the roofing shingle waste core comprises 0.5% to 45% by weight of the asphalt residue based on the total weight of the roofing shingle waste core. In some embodiments, the roofing shingle waste core comprises 0.5% to 40% by weight of the asphalt residue based on the total weight of the roofing shingle waste core. In some embodiments, the roofing shingle waste core comprises 0.5% to 35% by weight of the asphalt residue based on the total weight of the roofing shingle waste core. In some embodiments, the roofing shingle waste core comprises 0.5% to 30% by weight of the asphalt residue based on the total weight of the roofing shingle waste core. In some embodiments, the roofing shingle waste core comprises 0.5% to 25% by weight of the asphalt residue based on the total weight of the roofing shingle waste core. In some embodiments, the roofing shingle waste core comprises 0.5% to 20% by weight of the asphalt residue based on the total weight of the roofing shingle waste core. In some embodiments, the roofing shingle waste core comprises 0.5% to 15% by weight of the asphalt residue based on the total weight of the roofing shingle waste core. In some embodiments, the roofing shingle waste core comprises 0.5% to 10% by weight of the asphalt residue based on the total weight of the roofing shingle waste core. In some embodiments, the roofing shingle waste core comprises 0.5% to 5% by weight of the asphalt residue based on the total weight of the roofing shingle waste core. In some embodiments, the roofing shingle waste core comprises 0.5% to 1% by weight of the asphalt residue based on the total weight of the roofing shingle waste core.

In some embodiments, the roofing shingle waste core comprises 1% to 50% by weight of the asphalt residue based on the total weight of the roofing shingle waste core. In some embodiments, the roofing shingle waste core comprises 5% to 50% by weight of the asphalt residue based on the total weight of the roofing shingle waste core. In some embodiments, the roofing shingle waste core comprises 10% to 50% by weight of the asphalt residue based on the total weight of the roofing shingle waste core. In some embodiments, the roofing shingle waste core comprises 15% to 50% by weight of the asphalt residue based on the total weight of the roofing shingle waste core. In some embodiments, the roofing shingle waste core comprises 20% to 50% by weight of the asphalt residue based on the total weight of the roofing shingle waste core. In some embodiments, the roofing shingle waste core comprises 25% to 50% by weight of the asphalt residue based on the total weight of the roofing shingle waste core. In some embodiments, the roofing shingle waste core comprises 30% to 50% by weight of the asphalt residue based on the total weight of the roofing shingle waste core. In some embodiments, the roofing shingle waste core comprises 35% to 50% by weight of the asphalt residue based on the total weight of the roofing shingle waste core. In some embodiments, the roofing shingle waste core comprises 40% to 50% by weight of the asphalt residue based on the total weight of the roofing shingle waste core. In some embodiments, the roofing shingle waste core comprises 45% to 50% by weight of the asphalt residue based on the total weight of the roofing shingle waste core.

In some embodiments, the roofing shingle waste core comprises 5% to 30% by weight of the asphalt residue based on the total weight of the roofing shingle waste core. In some embodiments, the roofing shingle waste core comprises 5% to 28% by weight of the asphalt residue based on the total weight of the roofing shingle waste core. In some embodiments, the roofing shingle waste core comprises 5% to 26% by weight of the asphalt residue based on the total weight of the roofing shingle waste core. In some embodiments, the roofing shingle waste core comprises 5% to 25% by weight of the asphalt residue based on the total weight of the roofing shingle waste core. In some embodiments, the roofing shingle waste core comprises 5% to 24% by weight of the asphalt residue based on the total weight of the roofing shingle waste core. In some embodiments, the roofing shingle waste core comprises 5% to 22% by weight of the asphalt residue based on the total weight of the roofing shingle waste core. In some embodiments, the roofing shingle waste core comprises 5% to 20% by weight of the asphalt residue based on the total weight of the roofing shingle waste core. In some embodiments, the roofing shingle waste core comprises 5% to 18% by weight of the asphalt residue based on the total weight of the roofing shingle waste core. In some embodiments, the roofing shingle waste core comprises 5% to 16% by weight of the asphalt residue based on the total weight of the roofing shingle waste core. In some embodiments, the roofing shingle waste core comprises 5% to 15% by weight of the asphalt residue based on the total weight of the roofing shingle waste core. In some embodiments, the roofing shingle waste core comprises 5% to 14% by weight of the asphalt residue based on the total weight of the roofing shingle waste core. In some embodiments, the roofing shingle waste core comprises 5% to 12% by weight of the asphalt residue based on the total weight of the roofing shingle waste core. In some embodiments, the roofing shingle waste core comprises 5% to 10% by weight of the asphalt residue based on the total weight of the roofing shingle waste core. In some embodiments, the roofing shingle waste core comprises 5% to 8% by weight of the asphalt residue based on the total weight of the roofing shingle waste core.

In some embodiments, the roofing shingle waste core comprises 6% to 30% by weight of the asphalt residue based on the total weight of the roofing shingle waste core. In some embodiments, the roofing shingle waste core comprises 8% to 30% by weight of the asphalt residue based on the total weight of the roofing shingle waste core. In some embodiments, the roofing shingle waste core comprises 10% to 30% by weight of the asphalt residue based on the total weight of the roofing shingle waste core. In some embodiments, the roofing shingle waste core comprises 12% to 30% by weight of the asphalt residue based on the total weight of the roofing shingle waste core. In some embodiments, the roofing shingle waste core comprises 14% to 30% by weight of the asphalt residue based on the total weight of the roofing shingle waste core. In some embodiments, the roofing shingle waste core comprises 15% to 30% by weight of the asphalt residue based on the total weight of the roofing shingle waste core. In some embodiments, the roofing shingle waste core comprises 16% to 30% by weight of the asphalt residue based on the total weight of the roofing shingle waste core. In some embodiments, the roofing shingle waste core comprises 18% to 30% by weight of the asphalt residue based on the total weight of the roofing shingle waste core. In some embodiments, the roofing shingle waste core comprises 20% to 30% by weight of the asphalt residue based on the total weight of the roofing shingle waste core. In some embodiments, the roofing shingle waste core comprises 22% to 30% by weight of the asphalt residue based on the total weight of the roofing shingle waste core. In some embodiments, the roofing shingle waste core comprises 24% to 30% by weight of the asphalt residue based on the total weight of the roofing shingle waste core. In some embodiments, the roofing shingle waste core comprises 25% to 30% by weight of the asphalt residue based on the total weight of the roofing shingle waste core. In some embodiments, the roofing shingle waste core comprises 26% to 30% by weight of the asphalt residue based on the total weight of the roofing shingle waste core. In some embodiments, the roofing shingle waste core comprises 28% to 30% by weight of the asphalt residue based on the total weight of the roofing shingle waste core. In some embodiments, the roofing shingle waste core does not comprise the asphalt residue.

In some embodiments, the roofing shingle waste core comprises 10% to 90% by weight of the asphalt based on the total weight of the roofing shingle waste core. In some embodiments, the roofing shingle waste core comprises 10% to 80% by weight of the asphalt based on the total weight of the roofing shingle waste core. In some embodiments, the roofing shingle waste core comprises 10% to 70% by weight of the asphalt based on the total weight of the roofing shingle waste core. In some embodiments, the roofing shingle waste core comprises 10% to 60% by weight of the asphalt based on the total weight of the roofing shingle waste core. In some embodiments, the roofing shingle waste core comprises 10% to 50% by weight of the asphalt based on the total weight of the roofing shingle waste core. In some embodiments, the roofing shingle waste core comprises 10% to 40% by weight of the asphalt based on the total weight of the roofing shingle waste core. In some embodiments, the roofing shingle waste core comprises 10% to 30% by weight of the asphalt based on the total weight of the roofing shingle waste core. In some embodiments, the roofing shingle waste core comprises 10% to 20% by weight of the asphalt based on the total weight of the roofing shingle waste core.

In some embodiments, the roofing shingle waste core comprises 20% to 90% by weight of the asphalt based on the total weight of the roofing shingle waste core. In some embodiments, the roofing shingle waste core comprises 30% to 90% by weight of the asphalt based on the total weight of the roofing shingle waste core. In some embodiments, the roofing shingle waste core comprises 40% to 90% by weight of the asphalt based on the total weight of the roofing shingle waste core. In some embodiments, the roofing shingle waste core comprises 50% to 90% by weight of the asphalt based on the total weight of the roofing shingle waste core. In some embodiments, the roofing shingle waste core comprises 60% to 90% by weight of the asphalt based on the total weight of the roofing shingle waste core. In some embodiments, the roofing shingle waste core comprises 70% to 90% by weight of the asphalt based on the total weight of the roofing shingle waste core. In some embodiments, the roofing shingle waste core comprises 80% to 90% by weight of the asphalt based on the total weight of the roofing shingle waste core.

In some embodiments, the roofing shingle waste core comprises 10% to 90% by weight of the at least one filler based on the total weight of the roofing shingle waste core. In some embodiments, the roofing shingle waste core comprises 10% to 80% by weight of the at least one filler based on the total weight of the roofing shingle waste core. In some embodiments, the roofing shingle waste core comprises 10% to 70% by weight of the at least one filler based on the total weight of the roofing shingle waste core. In some embodiments, the roofing shingle waste core comprises 10% to 60% by weight of the at least one filler based on the total weight of the roofing shingle waste core. In some embodiments, the roofing shingle waste core comprises 10% to 50% by weight of the at least one filler based on the total weight of the roofing shingle waste core. In some embodiments, the roofing shingle waste core comprises 10% to 40% by weight of the at least one filler based on the total weight of the roofing shingle waste core. In some embodiments, the roofing shingle waste core comprises 10% to 30% by weight of the at least one filler based on the total weight of the roofing shingle waste core. In some embodiments, the roofing shingle waste core comprises 10% to 20% by weight of the at least one filler based on the total weight of the roofing shingle waste core.

In some embodiments, the roofing shingle waste core comprises 20% to 90% by weight of the at least one filler based on the total weight of the roofing shingle waste core. In some embodiments, the roofing shingle waste core comprises 30% to 90% by weight of the at least one filler based on the total weight of the roofing shingle waste core. In some embodiments, the roofing shingle waste core comprises 40% to 90% by weight of the at least one filler based on the total weight of the roofing shingle waste core. In some embodiments, the roofing shingle waste core comprises 50% to 90% by weight of the at least one filler based on the total weight of the roofing shingle waste core. In some embodiments, the roofing shingle waste core comprises 60% to 90% by weight of the at least one filler based on the total weight of the roofing shingle waste core. In some embodiments, the roofing shingle waste core comprises 70% to 90% by weight of the at least one filler based on the total weight of the roofing shingle waste core. In some embodiments, the roofing shingle waste core comprises 80% to 90% by weight of the at least one filler based on the total weight of the roofing shingle waste core.

In some embodiments, the roofing shingle waste core comprises 1% to 70% by weight of the non-asphalt residue based on the total weight of the roofing shingle waste core. In some embodiments, the roofing shingle waste core comprises 1% to 60% by weight of the non-asphalt residue based on the total weight of the roofing shingle waste core. In some embodiments, the roofing shingle waste core comprises 1% to 50% by weight of the non-asphalt residue based on the total weight of the roofing shingle waste core. In some embodiments, the roofing shingle waste core comprises 1% to 40% by weight of the non-asphalt residue based on the total weight of the roofing shingle waste core. In some embodiments, the roofing shingle waste core comprises 1% to 30% by weight of the non-asphalt residue based on the total weight of the roofing shingle waste core. In some embodiments, the roofing shingle waste core comprises 1% to 20% by weight of the non-asphalt residue based on the total weight of the roofing shingle waste core. In some embodiments, the roofing shingle waste core comprises 1% to 10% by weight of the non-asphalt residue based on the total weight of the roofing shingle waste core.

In some embodiments, the roofing shingle waste core comprises 10% to 70% by weight of the non-asphalt residue based on the total weight of the roofing shingle waste core. In some embodiments, the roofing shingle waste core comprises 20% to 70% by weight of the non-asphalt residue based on the total weight of the roofing shingle waste core. In some embodiments, the roofing shingle waste core comprises 30% to 70% by weight of the non-asphalt residue based on the total weight of the roofing shingle waste core. In some embodiments, the roofing shingle waste core comprises 40% to 70% by weight of the non-asphalt residue based on the total weight of the roofing shingle waste core. In some embodiments, the roofing shingle waste core comprises 50% to 70% by weight of the non-asphalt residue based on the total weight of the roofing shingle waste core. In some embodiments, the roofing shingle waste core comprises 60% to 70% by weight of the non-asphalt residue based on the total weight of the roofing shingle waste core. In some embodiments, the roofing shingle waste core does not comprise the non-asphalt residue.

In some embodiments, at least one of the roofing granule, the roofing shingle waste core, the base particle, the binder, the asphalt residue, the non-asphalt residue, or any combination thereof is reclaimed, repurposed, or otherwise obtained from asphalt shingle waste (or other waste). In some embodiments, the roofing shingle waste core comprises substances that were not removed during the recycling asphalt shingle waste process and thus remain on or within the roofing shingle waste core. In some embodiments, the roofing shingle waste core comprises impurities. In some embodiments, the impurities comprise at least one of limestone, fiberglass (e.g., fiberglass mat), sand, backing, mat substrate, fines, marker paint, sealant, one or more adhesives, tape, plastic debris, paper debris, soil, woods, nails, non-asphaltic materials, or any combination thereof.

In some embodiments, waste cores (e.g., other than roofing shingle waste cores) are reclaimed, repurposed, or otherwise obtained from waste which is not asphalt shingle waste. These other types of "waste" include, but are not limited to, post-consumer crushed glass, post-consumer ceramics, post-consumer building materials (e.g., concretes, bricks, stone, etc.), aggregate waste from mining operations, and production waste from manufacturing (e.g., glass manufacturing, ceramic manufacturing, concrete manufacturing, etc.).

In some embodiments, the roofing granule comprises a colored coating.

In some embodiments, the colored coating has a surface. In some embodiments, the surface is an outer surface.

In some embodiments, the colored coating directly contacts the roofing shingle waste core. In some embodiments, the colored coating directly contacts the surface of the roofing shingle waste core. In some embodiments, the colored coating directly contacts at least one base particle. In some embodiments, the colored coating directly contacts the surface of at least one base particle. In some embodiments, the colored coating directly contacts the agglomerated base particles. In some embodiments, the colored coating directly contacts the surface of agglomerated base particles. In some embodiments, the colored coating directly contacts the binder that agglomerates the base particles so as to form the agglomerated base particles. In some embodiments, the asphalt residue is located between the base particle and the colored coating. In some embodiments, the colored coating directly contacts the asphalt residue. In some embodiments, the colored coating directly contacts the surface of the asphalt residue. In some embodiments, the colored coating is adhered, bonded, or otherwise secured to at least one of the roofing shingle waste core, the base particle(s), the binder, the asphalt residue, the non-asphalt residue, or any combination thereof.

In some embodiments, the colored coating is any coating that is not derived from asphalt shingle waste. For example, in some embodiments, the colored coating is a coating that is applied after at least one of the roofing shingle waste core, the base particle, the plurality of base particles, the agglomerated base particles, or any combination thereof, is reclaimed, recovered, or otherwise obtained from asphalt shingle waste. In some embodiments, the colored coating is not a coating that is reclaimed, recovered, or otherwise obtained from asphalt shingle waste.

In some embodiments, the colored coating comprises a colorant. In some embodiments, the colored coating comprises at least one of a pigment, a dye, or any combination thereof. In some embodiments, the colored coating comprises at least one of a reflective pigment, a transition metal oxide, a cool pigment, a metallic pigment, a metallic particle, a mirrored pigment, a light scattering additive, an opacifier, a thin-film coated particle, a near infrared-reflecting pigment, light-interference platelet pigment, a silica pigment, a metal flake pigment, an inorganic pigment, or any combination thereof. Non-limiting examples of pigments and dyes include, without limitation, at least one of an infrared reflective pigment/dye, a phosphorescence pigment/dye, a fluorescence pigment/dye, or any combination thereof. In some embodiments, the colored coating comprises at least one of $TiO_2$, alumina, silica, iron oxide, tin oxide, $SiO_2$, aluminum oxide, mica, rutile, anatase, alloys, aluminum, iron, copper, brass, titanium, cobalt, stainless steel, chromium, nickel, or any combination thereof. In some embodiments, the colored coating comprises water.

Some examples of commercially available materials suitable for inclusion in the colored coating include, without limitation, at least one of Colonial Red, which is a reflective pigment that is available from Americhem Inc., Cuyahoga Falls, Ohio; Ti Pure™ Titanium Dioxide from Chemours, Wilmington, Delaware; pigments available from Wenzhou Pearlescent Pigments Co., Ltd., No. 9 Small East District, Wenzhou Economical and Technical Development Zone, Peoples Republic of China, such as Taizhu TZ5013 (mica, rutile titanium dioxide and iron oxide, golden color), TZ5012 (mica, rutile titanium dioxide and iron oxide, golden color), TZ4013 (mica and iron oxide, wine red color), TZ4012 (mica and iron oxide, red brown color), TZ4011 (mica and iron oxide, bronze color), TZ2015 (mica and rutile titanium dioxide, interference green color), TZ2014 (mica and rutile titanium dioxide, interference blue color), TZ2013 (mica and rutile titanium dioxide, interference violet color), TZ2012 (mica and rutile titanium dioxide, interference red color), TZ2011 (mica and rutile titanium dioxide, interference golden color), TZ1222 (mica and rutile titanium dioxide, silver white color), TZ1004 (mica and anatase titanium dioxide, silver white color), TZ4001/600 (mica and iron oxide, bronze appearance), TZ5003/600 (mica, titanium oxide and iron oxide, gold appearance), TZ1001/80 (mica and titanium dioxide, off-white appearance), TZ2001/600 (mica, titanium dioxide, tin oxide, off-white/gold appearance), TZ2004/600 (mica, titanium dioxide, tin oxide, off-white/blue appearance), TZ2005/600 (mica, titanium dioxide, tin oxide, off-white/green appearance), TZ4002/600 (mica and iron oxide, bronze appearance); pigments available from Merck KGaA, Darmstadt, Germany, such as Iriodin® pearlescent pigment based on mica covered with a thin layer of titanium dioxide and/or iron oxide; Xirallic™ high chroma crystal effect pigment based upon aluminum oxide platelets coated with metal oxides, including Xirallic T 60-10 WNT crystal silver, Xirallic T 60-20 WNT sunbeam gold, and Xirallic F 60-50 WNT fireside copper; ColorStream™ multi color effect pigments based on SiO2 platelets coated with metal oxides, including ColorStream F 20-00 WNT autumn mystery and ColorStream F 20-07 WNT viola fantasy; Chrom Brite™ CB4500, available from Bead Brite, 400 Oser Ave, Suite 600, Hauppauge, N.Y. 11788; pigments available from Color Division of Ferro Corporation, 4150 East 56th St., Cleveland, Ohio 44101, and produced using high temperature calcinations, including PC-9415 Yellow, PC-9416 Yellow, PC-9158 Autumn Gold, PC-9189 Bright Golden Yellow, V-9186 Iron-Free Chestnut Brown, V-780 Black, V0797 IR Black, V-9248 Blue, PC-9250 Bright Blue, PC-5686 Turquoise, V-13810 Red, V-12600 Camouflage Green, V12560 IR Green, V-778 IR Black, and V-799 Black.

In some embodiments, the colored coating comprises 20% to 99% by weight of the colorant based on a total weight of the colored coating. In some embodiments, the colored coating comprises 25% to 99% by weight of the colorant based on the total weight of the colored coating. In some embodiments, the colored coating comprises 30% to 99% by weight of the colorant based on the total weight of the colored coating. In some embodiments, the colored coating comprises 35% to 99% by weight of the colorant based on the total weight of the colored coating. In some embodiments, the colored coating comprises 40% to 99% by weight of the colorant based on the total weight of the colored coating. In some embodiments, the colored coating comprises 45% to 99% by weight of the colorant based on the total weight of the colored coating. In some embodiments, the colored coating comprises 50% to 99% by weight of the colorant based on the total weight of the colored coating. In some embodiments, the colored coating comprises 55% to 99% by weight of the colorant based on the total weight of the colored coating. In some embodiments, the colored coating comprises 60% to 99% by weight of the colorant based on the total weight of the colored coating. In some embodiments, the colored coating comprises 65% to 99% by weight of the colorant based on the total weight of the colored coating. In some embodiments, the colored coating comprises 70% to 99% by weight of the colorant based on the total weight of the colored coating. In some embodiments, the colored coating comprises 75% to 99% by weight of the colorant based on the total weight of the colored coating. In some embodiments, the colored coating comprises 80% to 99% by weight of the colorant based on the total weight of the colored coating. In some embodiments, the colored coating comprises 85% to 99% by weight of the colorant based on the total weight of the colored coating. In some embodiments, the colored coating comprises 90% to 99% by weight of the colorant based on the total weight of the colored coating.

In some embodiments, the colored coating comprises 20% to 95% by weight of the colorant based on the total weight of the colored coating. In some embodiments, the colored coating comprises 20% to 90% by weight of the colorant based on the total weight of the colored coating. In some embodiments, the colored coating comprises 20% to 85% by weight of the colorant based on the total weight of the colored coating. In some embodiments, the colored coating comprises 20% to 80% by weight of the colorant based on the total weight of the colored coating. In some embodiments, the colored coating comprises 20% to 75% by weight of the colorant based on the total weight of the colored coating. In some embodiments, the colored coating comprises 20% to 70% by weight of the colorant based on the total weight of the colored coating. In some embodiments, the colored coating comprises 20% to 65% by weight of the colorant based on the total weight of the colored coating. In some embodiments, the colored coating comprises 20% to 60% by weight of the colorant based on the total weight of the colored coating. In some embodiments, the colored coating comprises 20% to 55% by weight of the colorant based on the total weight of the colored coating. In some embodiments, the colored coating comprises 20% to 50% by weight of the colorant based on the total weight of the colored coating. In some embodiments, the colored coating comprises 20% to 45% by weight of the colorant based on the total weight of the colored coating. In some embodiments, the colored coating comprises 20% to 40% by weight of the colorant based on the total weight of the colored coating. In some embodiments, the colored coating comprises 20% to 35% by weight of the colorant based on the total weight of the colored coating. In some embodiments, the colored coating comprises 20% to 30% by weight of the colorant based on the total weight of the colored coating.

In some embodiments, the colored coating comprises at least one additive. In some embodiments, the at least one additive comprises at least one of silicate binders, metal silicates binders, phosphate binders, acrylic coatings, polyurethane coatings, sol-gel coatings, silica coatings, or any combination thereof. In some embodiments, the at least one additive comprises at least one of a silicate binder, a metal silicate binder, a phosphate binder, a polymeric coating, a clay (e.g., kaolin), an acrylic coating, a polyurethane coating, a sol-gel coating, a silica coating, or any combination thereof. In some embodiments, the at least one additive comprises at least one of a latent heat reactant, a dispersing agent, a curing agent, an accelerator, a viscosity modifier, a color pigment, or any combination thereof. In some embodiments, the colored coating comprises an aqueous solution comprising at least one of a silicate binder, an inorganic pigment, a dispersant, a clay, or any combination thereof. In some embodiments, the colored coating is curable by exposure to carbon dioxide gas and moisture, at a temperature of 200° F. or less.

In some embodiments, the at least one additive comprises at least one organic material, at least one inorganic material, at least one organic-inorganic material, or any combinations thereof. In some embodiments, the at least one additive comprises at least one of water, at least one metal silicate (e.g., at least one alkali metal silicate, at least one alkaline earth metal silicate, or any combination thereof), at least one metal phosphate, at least one polymer, or any combination thereof. In some embodiments, the at least one additive comprises a sodium silicate, a potassium silicate, an ammonium silicate, a lithium silicate, a magnesium silicate, a calcium silicate, an aluminum silicate, a titanium silicate, a siloxane, a polysiloxane, an organopolysiloxane, an organic silicate, a silicone resin, a titanate, a zirconate, an acrylic polymer, a polyester, an amino resin, an epoxy resin, a phenolic, a polyamide, a polyurethane, a urethane, a silicone resin, a vinyl resin, a polyol, a cycloaliphatic epoxide, a polysulfide, a phenoxy, an ultraviolet-curable acrylate, an ultraviolet-curable cycloaliphatic epoxides, a polymethacrylate, a poly methyl methacrylate, a copolymer of methyl methacrylate and an alkyl acrylate (e.g., at least one of ethyl acrylate, butyl acrylate, or any combination thereof), a copolymer of acrylate and methacrylate monomers with other monomers (e.g., styrene, etc.), or any combination thereof.

In some embodiments, the sol-gel coating may comprise, consist of, consist essentially of, or may be prepared from, at least one of a tetraethyl orthosilicate and a coupling agent. In some embodiments, the coupling agent comprises a silicic acid ester coupling agent. In some embodiments, the coupling agent comprises tetrabutyl orthosilicate, tetramethoxysilane, tetra-n-propoxysilane, oligomeric tetraethoxysilane (available under the SIVENTO trademark from Degussa AG, Frankfurt am Main, Germany), alkylalkoxysilanes (e.g., at least one of methyltrimethoxysilane, methyltriethoxysilane, propyltrimethoxysilane, propyltriethoxysilane, isobutyltrimethoxysilane, isobutyltriethoxysilane, octyltrimethoxysilane, octyltriethoxysilane, hexadecyltrimethoxysilane, phenyl trimethoxysilane, phenyltriethoxysilane, or any combination thereof), haloalkylalkoxysilanes, organofunctional silanes (e.g., at least one of 3-glycidyloxypropyltrimethoxysilane, 3-glycidyloxypropyltriethoxysilane, 3-methyacryloxypropyltrimethoxysilane, vinyltrimethoxysilane, vinyltriethoxysilane, 3-mercaptopropyltrimethoxysilane, 3-mercaptopropyltriethoxysilane, or any combination thereof), aminofunctional alkoxysilanes (e.g., at least one of 3-aminopropyltriethoxysilane, 3-aminopropyltrimethoxysilane, 2-aminoethyl-3-aminopropyltrimethoxysilane, triaminofunctional propyltrimethoxysilane, N-(n-butyl)-3-aminopropyltrimethoxysilane, 3-aminopropylmethydiethoxysilane, or any combination thereof), or any combination thereof. In some embodiments, the sol-gel coating may be prepared by at least one of the following: preparing a sol comprising at least one of a silane coupling agent and at least one alcohol (e.g., ethanol, isopropanol, methoxypropanol, or any combination thereof);

hydrolyzing by addition of a water acidified with hydrochloric acid or sulfuric acid; and curing to form a sol-gel coating.

Some examples of commercially available materials suitable for use as the at least one additive include, without limitation, the ACRYSHIELD® line of acrylic products from National Coatings Corporation (Camarillo, Calif.), QW77 urethane product available from Henkel Corporation (Dusseldorf, Germany), water-based polyurethanes available from Minwax Company (Upper Saddle River, N.J.), the SITREN® line of products (e.g., Sitren 270 and 595) available from Evonik Corporation (Essen, Germany), the SILRES® line of products (e.g., Silres BS1011A and B1 BS3003) available from Wacker Chemie AG (Munich, Germany), the TEGO® line of products (e.g., Tego XP 5000) available from Evonik Corporation (Essen, Germany), the DYNASYLAN® line of silanes and siloxanes (e.g., DYNASYLAN® SIVO 112, DYNASYLAN® F 8815 and DYNASYLAN® VPS SIVO 608) available from Evonik Industries AG (Essen, Germany), the KYNAR® line of products (e.g., Kynar RC-10 and 147) available from Arkema (Colombes, France), the RHOPLEX® line of products (e.g., Rhoplex EC 2540) available from The Dow Chemical Company (Midland, Mich.), the SYCOAT® line of products (e.g., Sycoat 235) available from STI Polymer, Inc. (Sanford, N.C.), the SILRES® line of silanes or siloxanes (e.g., the SILRES® BS line of products, for example SILRES® BS 3003, BS-68, BS-60, BS-33A) available from Wacker Chemie AG (Munich, Germany), the DYNASYLAN® line of silanes and siloxanes (e.g., DYNASYLAN® SIVO 112, DYNASYLAN® F 8815 and DYNASYLAN® VPS SIVO 608) available from Evonik Industries AG (Essen, Germany), and the SILQUEST® line of silanes and siloxanes (e.g., SILQUEST® A-1120, SILQUEST® A-1630A and SILQUEST® A-137) available from Momentive Performance Materials, Inc. (Waterford, N.Y.). Any one or more of the foregoing may be used as the at least one additive, either alone or in combination.

In some embodiments, the at least one additive comprises at least one of a latent heat reactant, a dispersing agent, a curing agent (e.g., a suitable crosslinker), an accelerator, a viscosity modifier, a color pigment, or any combination thereof. In some embodiments, the latent heat reactant comprises at least one of a Portland cement, or any combination thereof. In some embodiments, the dispersing agent comprises at least one of isopropyl alcohol, sodium dodecylbenzenesulfonate, sodium dodecylsulfonate, polyvinylpyrrolidone, sodium cholate, polystyrene, polyvinyl alcohol, or any combination thereof. In some embodiments, the viscosity modifier comprises at least one of hydroxyl ethyl cellulose (HEC), polyacrylamide (PAA), a rheology modifier, a cellulosic, an acrylic, an associated thickener, a clay, an organoclay, a hydrogenated caster oil, a polyamides, an overbased sulphonate, or any combination thereof. In some embodiments, the color pigment comprises at least one of a mixed metal oxide pigment, a pearlescent pigment, a metal-coated flake, a metal oxide coated plate-like pigment, a mica, a metallic flake, an infrared-reflective pigment, a metallic powder, or any combination thereof.

In some embodiments, the colored coating comprises a semi-ceramic alumino silicate paint. In some embodiments, the semi-ceramic alumino silicate paint is curable by at least one of a metal salt, an acid, or any combination thereof. In some embodiments, the semi-ceramic alumino silicate paint is curable by at least one of a Lewis acid, $AlCl_3$, $MgCl_2$, or any combination thereof. In some embodiments, the colored coating comprises a semi-ceramic phosphate base coating. In some embodiments, the colored coating comprises a coal tar paint. In some embodiments, the colored coating comprises an epoxy paint. In some embodiments, the colored coating comprises an acrylic paint. In some embodiments, the colored coating comprises an asphalt paint. In some embodiments, the asphalt paint comprises asphalt, which is a binder.

In some embodiments, the colored coating comprises 1% to 80% by weight of the at least one additive based on the total weight of the colored coating. In some embodiments, the colored coating comprises 1% to 75% by weight of the at least one additive based on the total weight of the colored coating. In some embodiments, the colored coating comprises 1% to 70% by weight of the at least one additive based on the total weight of the colored coating. In some embodiments, the colored coating comprises 1% to 65% by weight of the at least one additive based on the total weight of the colored coating. In some embodiments, the colored coating comprises 1% to 60% by weight of the at least one additive based on the total weight of the colored coating. In some embodiments, the colored coating comprises 1% to 55% by weight of the at least one additive based on the total weight of the colored coating. In some embodiments, the colored coating comprises 1% to 50% by weight of the at least one additive based on the total weight of the colored coating. In some embodiments, the colored coating comprises 1% to 45% by weight of the at least one additive based on the total weight of the colored coating. In some embodiments, the colored coating comprises 1% to 40% by weight of the at least one additive based on the total weight of the colored coating. In some embodiments, the colored coating comprises 1% to 35% by weight of the at least one additive based on the total weight of the colored coating. In some embodiments, the colored coating comprises 1% to 30% by weight of the at least one additive based on the total weight of the colored coating. In some embodiments, the colored coating comprises 1% to 25% by weight of the at least one additive based on the total weight of the colored coating. In some embodiments, the colored coating comprises 1% to 20% by weight of the at least one additive based on the total weight of the colored coating. In some embodiments, the colored coating comprises 1% to 15% by weight of the at least one additive based on the total weight of the colored coating. In some embodiments, the colored coating comprises 1% to 10% by weight of the at least one additive based on the total weight of the colored coating. In some embodiments, the colored coating comprises 1% to 5% by weight of the at least one additive based on the total weight of the colored coating.

In some embodiments, the colored coating comprises 5% to 80% by weight of the at least one additive based on the total weight of the colored coating. In some embodiments, the colored coating comprises 10% to 80% by weight of the at least one additive based on the total weight of the colored coating. In some embodiments, the colored coating comprises 15% to 80% by weight of the at least one additive based on the total weight of the colored coating. In some embodiments, the colored coating comprises 20% to 80% by weight of the at least one additive based on the total weight of the colored coating. In some embodiments, the colored coating comprises 25% to 80% by weight of the at least one additive based on the total weight of the colored coating. In some embodiments, the colored coating comprises 30% to 80% by weight of the at least one additive based on the total weight of the colored coating. In some embodiments, the colored coating comprises 35% to 80% by weight of the at least one additive based on the total weight of the colored coating. In some embodiments, the colored coating comprises 40% to 80% by weight of the at least one additive based on the total weight of the colored coating. In some embodiments, the colored coating comprises 45% to 80% by weight of the at least one additive based on the total weight of the colored coating. In some embodiments, the colored coating comprises 50% to 80% by weight of the at least one additive based on the total weight of the colored coating. In some embodiments, the colored coating comprises 55% to 80% by weight of the at least one additive based on the total weight of the colored coating. In some embodiments, the colored coating comprises 60% to 80% by weight of the at least one additive based on the total weight of the colored coating. In some embodiments, the colored coating comprises 65% to 80% by weight of the at least one additive based on the total weight of the colored coating. In some embodiments, the colored coating comprises 70% to 80% by weight of the at least one additive based on the total weight of the colored coating. In some embodiments, the colored coating comprises 75% to 80% by weight of the at least one additive based on the total weight of the colored coating.

In some embodiments, a colored coating composition refers to a colored coating, as disclosed herein, prior to being cured.

In some embodiments, the colored coating covers at least a portion of the surface of the roofing shingle waste core. In some embodiments, the colored coating covers at least 1% of the surface area of the roofing shingle waste core. In some embodiments, the colored coating covers at least 5% of the surface area of the roofing shingle waste core. In some embodiments, the colored coating covers at least 10% of the surface area of the roofing shingle waste core. In some embodiments, the colored coating covers at least 15% of the surface area of the roofing shingle waste core. In some embodiments, the colored coating covers at least 20% of the surface area of the roofing shingle waste core. In some embodiments, the colored coating covers at least 25% of the surface area of the roofing shingle waste core. In some embodiments, the colored coating covers at least 30% of the surface area of the roofing shingle waste core. In some embodiments, the colored coating covers at least 35% of the surface area of the roofing shingle waste core. In some embodiments, the colored coating covers at least 40% of the surface area of the roofing shingle waste core. In some embodiments, the colored coating covers at least 45% of the surface area of the roofing shingle waste core. In some embodiments, the colored coating covers at least 50% of the surface area of the roofing shingle waste core. In some embodiments, the colored coating covers at least 55% of the surface area of the roofing shingle waste core. In some embodiments, the colored coating covers at least 60% of the surface area of the roofing shingle waste core. In some embodiments, the colored coating covers at least 65% of the surface area of the roofing shingle waste core. In some embodiments, the colored coating covers at least 70% of the surface area of the roofing shingle waste core. In some embodiments, the colored coating covers at least 75% of the surface area of the roofing shingle waste core. In some embodiments, the colored coating covers at least 80% of the surface area of the roofing shingle waste core. In some embodiments, the colored coating covers at least 85% of the surface area of the roofing shingle waste core. In some embodiments, the colored coating covers at least 90% of the surface area of the roofing shingle waste core. In some embodiments, the colored coating covers at least 95% of the surface area of the roofing shingle waste core.

In some embodiments, the colored coating covers 1% to 99% of the surface area of the roofing shingle waste core. In some embodiments, the colored coating covers 1% to 95% of the surface area of the roofing shingle waste core. In some embodiments, the colored coating covers 1% to 90% of the surface area of the roofing shingle waste core. In some embodiments, the colored coating covers 1% to 85% of the surface area of the roofing shingle waste core. In some embodiments, the colored coating covers 1% to 80% of the surface area of the roofing shingle waste core. In some embodiments, the colored coating covers 1% to 75% of the surface area of the roofing shingle waste core. In some embodiments, the colored coating covers 1% to 70% of the surface area of the roofing shingle waste core. In some embodiments, the colored coating covers 1% to 65% of the surface area of the roofing shingle waste core. In some embodiments, the colored coating covers 1% to 60% of the surface area of the roofing shingle waste core. In some embodiments, the colored coating covers 1% to 55% of the surface area of the roofing shingle waste core. In some embodiments, the colored coating covers 1% to 50% of the surface area of the roofing shingle waste core. In some embodiments, the colored coating covers 1% to 45% of the surface area of the roofing shingle waste core. In some embodiments, the colored coating covers 1% to 40% of the surface area of the roofing shingle waste core. In some embodiments, the colored coating covers 1% to 35% of the surface area of the roofing shingle waste core. In some embodiments, the colored coating covers 1% to 30% of the surface area of the roofing shingle waste core. In some embodiments, the colored coating covers 1% to 25% of the surface area of the roofing shingle waste core. In some embodiments, the colored coating covers 1% to 20% of the surface area of the roofing shingle waste core. In some embodiments, the colored coating covers 1% to 15% of the surface area of the roofing shingle waste core. In some embodiments, the colored coating covers 1% to 10% of the surface area of the roofing shingle waste core. In some embodiments, the colored coating covers 1% to 5% of the surface area of the roofing shingle waste core.

In some embodiments, the colored coating covers 5% to 99% of the surface area of the roofing shingle waste core. In some embodiments, the colored coating covers 10% to 99% of the surface area of the roofing shingle waste core. In some embodiments, the colored coating covers 15% to 99% of the surface area of the roofing shingle waste core. In some embodiments, the colored coating covers 20% to 99% of the surface area of the roofing shingle waste core. In some embodiments, the colored coating covers 25% to 99% of the surface area of the roofing shingle waste core. In some embodiments, the colored coating covers 30% to 99% of the surface area of the roofing shingle waste core. In some embodiments, the colored coating covers 35% to 99% of the surface area of the roofing shingle waste core. In some embodiments, the colored coating covers 40% to 99% of the surface area of the roofing shingle waste core. In some embodiments, the colored coating covers 45% to 99% of the surface area of the roofing shingle waste core. In some embodiments, the colored coating covers 50% to 99% of the surface area of the roofing shingle waste core. In some embodiments, the colored coating covers 55% to 99% of the surface area of the roofing shingle waste core. In some embodiments, the colored coating covers 60% to 99% of the surface area of the roofing shingle waste core. In some embodiments, the colored coating covers 65% to 99% of the surface area of the roofing shingle waste core. In some embodiments, the colored coating covers 70% to 99% of the surface area of the roofing shingle waste core. In some embodiments, the colored coating covers 75% to 99% of the surface area of the roofing shingle waste core. In some embodiments, the colored coating covers 80% to 99% of the surface area of the roofing shingle waste core. In some embodiments, the colored coating covers 85% to 99% of the surface area of the roofing shingle waste core. In some embodiments, the colored coating covers 90% to 99% of the surface area of the roofing shingle waste core. In some embodiments, the colored coating covers 95% to 99% of the surface area of the roofing shingle waste core.

In some embodiments, the colored coating covers at least a portion of the surface of the asphalt residue. In some embodiments, the colored coating covers at least 1% of the surface area of the asphalt residue. In some embodiments, the colored coating covers at least 5% of the surface area of the asphalt residue. In some embodiments, the colored coating covers at least 10% of the surface area of the asphalt residue. In some embodiments, the colored coating covers at least 15% of the surface area of the asphalt residue. In some embodiments, the colored coating covers at least 20% of the surface area of the asphalt residue. In some embodiments, the colored coating covers at least 25% of the surface area of the asphalt residue. In some embodiments, the colored coating covers at least 30% of the surface area of the asphalt residue. In some embodiments, the colored coating covers at least 35% of the surface area of the asphalt residue. In some embodiments, the colored coating covers at least 40% of the surface area of the asphalt residue. In some embodiments, the colored coating covers at least 45% of the surface area of the asphalt residue. In some embodiments, the colored coating covers at least 50% of the surface area of the asphalt residue. In some embodiments, the colored coating covers at least 55% of the surface area of the asphalt residue. In some embodiments, the colored coating covers at least 60% of the surface area of the asphalt residue. In some embodiments, the colored coating covers at least 65% of the surface area of the asphalt residue. In some embodiments, the colored coating covers at least 70% of the surface area of the asphalt residue. In some embodiments, the colored coating covers at least 75% of the surface area of the asphalt residue. In some embodiments, the colored coating covers at least 80% of the surface area of the asphalt residue. In some embodiments, the colored coating covers at least 85% of the surface area of the asphalt residue. In some embodiments, the colored coating covers at least 90% of the surface area of the asphalt residue. In some embodiments, the colored coating covers at least 95% of the surface area of the asphalt residue.

In some embodiments, the colored coating covers 1% to 99% of the surface area of the asphalt residue. In some embodiments, the colored coating covers 1% to 95% of the surface area of the asphalt residue. In some embodiments, the colored coating covers 1% to 90% of the surface area of the asphalt residue. In some embodiments, the colored coating covers 1% to 85% of the surface area of the asphalt residue. In some embodiments, the colored coating covers 1% to 80% of the surface area of the asphalt residue. In some embodiments, the colored coating covers 1% to 75% of the surface area of the asphalt residue. In some embodiments, the colored coating covers 1% to 70% of the surface area of the asphalt residue. In some embodiments, the colored coating covers 1% to 65% of the surface area of the asphalt residue. In some embodiments, the colored coating covers 1% to 60% of the surface area of the asphalt residue. In some embodiments, the colored coating covers 1% to 55% of the surface area of the asphalt residue. In some embodiments, the colored coating covers 1% to 50% of the surface area of the asphalt residue. In some embodiments, the colored coating covers 1% to 45% of the surface area of the asphalt residue. In some embodiments, the colored coating covers 1% to 40% of the surface area of the asphalt residue. In some embodiments, the colored coating covers 1% to 35% of the surface area of the asphalt residue. In some embodiments, the colored coating covers 1% to 30% of the surface area of the asphalt residue. In some embodiments, the colored coating covers 1% to 25% of the surface area of the asphalt residue. In some embodiments, the colored coating covers 1% to 20% of the surface area of the asphalt residue. In some embodiments, the colored coating covers 1% to 15% of the surface area of the asphalt residue. In some embodiments, the colored coating covers 1% to 10% of the surface area of the asphalt residue. In some embodiments, the colored coating covers 1% to 5% of the surface area of the asphalt residue.

In some embodiments, the colored coating covers 5% to 99% of the surface area of the asphalt residue. In some embodiments, the colored coating covers 10% to 99% of the surface area of the asphalt residue. In some embodiments, the colored coating covers 15% to 99% of the surface area of the asphalt residue. In some embodiments, the colored coating covers 20% to 99% of the surface area of the asphalt residue. In some embodiments, the colored coating covers 25% to 99% of the surface area of the asphalt residue. In some embodiments, the colored coating covers 30% to 99% of the surface area of the asphalt residue. In some embodiments, the colored coating covers 35% to 99% of the surface area of the asphalt residue. In some embodiments, the colored coating covers 40% to 99% of the surface area of the asphalt residue. In some embodiments, the colored coating covers 45% to 99% of the surface area of the asphalt residue. In some embodiments, the colored coating covers 50% to 99% of the surface area of the asphalt residue. In some embodiments, the colored coating covers 55% to 99% of the surface area of the asphalt residue. In some embodiments, the colored coating covers 60% to 99% of the surface area of the asphalt residue. In some embodiments, the colored coating covers 65% to 99% of the surface area of the asphalt residue. In some embodiments, the colored coating covers 70% to 99% of the surface area of the asphalt residue. In some embodiments, the colored coating covers 75% to 99% of the surface area of the asphalt residue. In some embodiments, the colored coating covers 80% to 99% of the surface area of the asphalt residue. In some embodiments, the colored coating covers 85% to 99% of the surface area of the asphalt residue. In some embodiments, the colored coating covers 90% to 99% of the surface area of the asphalt residue. In some embodiments, the colored coating covers 95% to 99% of the surface area of the asphalt residue.

In some embodiments, the colored coating encapsulates the roofing shingle waste core. In some embodiments, the term encapsulates refers to covering an object (e.g., the roofing shingle waste core) in its entirety. In some embodiments, the colored coating encapsulates at least one of the base particle, the plurality of base particles, the binder, the agglomerated base particles, the asphalt residue, the non-asphalt residue, or any combination thereof.

In some embodiments, the colored coating has a thickness of 1 µm to 500 µm. In some embodiments, the colored coating has a thickness of 1 µm to 480 µm. In some embodiments, the colored coating has a thickness of 1 µm to 460 µm. In some embodiments, the colored coating has a thickness of 1 µm to 440 µm. In some embodiments, the colored coating has a thickness of 1 µm to 420 µm. In some embodiments, the colored coating has a thickness of 1 µm to 400 µm. In some embodiments, the colored coating has a thickness of 1 µm to 380 µm. In some embodiments, the colored coating has a thickness of 1 µm to 360 µm. In some embodiments, the colored coating has a thickness of 1 µm to 340 µm. In some embodiments, the colored coating has a thickness of 1 µm to 320 µm. In some embodiments, the colored coating has a thickness of 1 µm to 300 µm. In some embodiments, the colored coating has a thickness of 1 µm to 280 µm. In some embodiments, the colored coating has a thickness of 1 µm to 260 µm. In some embodiments, the colored coating has a thickness of 1 µm to 240 µm. In some embodiments, the colored coating has a thickness of 1 µm to 220 µm. In some embodiments, the colored coating has a thickness of 1 µm to 200 µm. In some embodiments, the colored coating has a thickness of 1 µm to 180 µm. In some embodiments, the colored coating has a thickness of 1 µm to 160 µm. In some embodiments, the colored coating has a thickness of 1 µm to 140 µm. In some embodiments, the colored coating has a thickness of 1 µm to 120 µm. In some embodiments, the colored coating has a thickness of 1 µm to 100 µm. In some embodiments, the colored coating has a thickness of 1 µm to 80 µm. In some embodiments, the colored coating has a thickness of 1 µm to 60 µm. In some embodiments, the colored coating has a thickness of 1 µm to 40 µm. In some embodiments, the colored coating has a thickness of 1 µm to 20 µm.

In some embodiments, the colored coating has a thickness of 20 µm to 500 µm. In some embodiments, the colored coating has a thickness of 40 µm to 500 µm. In some embodiments, the colored coating has a thickness of 60 µm to 500 µm. In some embodiments, the colored coating has a thickness of 80 µm to 500 µm. In some embodiments, the colored coating has a thickness of 100 µm to 500 µm. In some embodiments, the colored coating has a thickness of 120 µm to 500 µm. In some embodiments, the colored coating has a thickness of 140 µm to 500 µm. In some embodiments, the colored coating has a thickness of 160 µm to 500 µm. In some embodiments, the colored coating has a thickness of 180 µm to 500 µm. In some embodiments, the colored coating has a thickness of 200 µm to 500 µm. In some embodiments, the colored coating has a thickness of 320 µm to 500 µm. In some embodiments, the colored coating has a thickness of 340 µm to 500 µm. In some embodiments, the colored coating has a thickness of 360 µm to 500 µm. In some embodiments, the colored coating has a thickness of 380 µm to 500 µm. In some embodiments, the colored coating has a thickness of 400 µm to 500 µm. In some embodiments, the colored coating has a thickness of 420 µm to 500 µm. In some embodiments, the colored coating has a thickness of 440 µm to 500 µm. In some embodiments, the colored coating has a thickness of 460 µm to 500 µm. In some embodiments, the colored coating has a thickness of 480 µm to 500 µm.

In some embodiments, the colored coating has a thickness of 5 µm to 200 µm. In some embodiments, the colored coating has a thickness of 50 µm to 200 µm. In some embodiments, the colored coating has a thickness of 75 µm to 200 µm. In some embodiments, the colored coating has a thickness of 25 µm to 250 µm.

In some embodiments, the colored coating has a thickness of 100 mil or less. In some embodiments, the colored coating has a thickness of 75 mil or less. In some embodiments, the colored coating has a thickness of 50 mil or less. In some embodiments, the colored coating has a thickness of 45 mil or less. In some embodiments, the colored coating has a thickness of 40 mil or less. In some embodiments, the colored coating has a thickness of 35 mil or less. In some embodiments, the colored coating has a thickness of 30 mil or less. In some embodiments, the colored coating has a thickness of 25 mil or less. In some embodiments, the colored coating has a thickness of 24 mil or less. In some embodiments, the colored coating has a thickness of 22 mil or less. In some embodiments, the colored coating has a thickness of 20 mil or less. In some embodiments, the colored coating has a thickness of 18 mil or less. In some embodiments, the colored coating has a thickness of 16 mil or less. In some embodiments, the colored coating has a thickness of 15 mil or less. In some embodiments, the colored coating has a thickness of 14 mil or less. In some embodiments, the colored coating has a thickness of 12 mil or less. In some embodiments, the colored coating has a thickness of 10 mil or less. In some embodiments, the colored coating has a thickness of 8 mil or less. In some embodiments, the colored coating has a thickness of 6 mil or less. In some embodiments, the colored coating has a thickness of 5 mil or less.

In some embodiments, the colored coating has a thickness of 0.01 mil to 75 mil. In some embodiments, the colored coating has a thickness of 0.1 mil to 50 mil. In some embodiments, the colored coating has a thickness of 0.1 mil to 45 mil. In some embodiments, the colored coating has a thickness of 0.1 mil to 40 mil. In some embodiments, the colored coating has a thickness of 0.1 mil to 35 mil. In some embodiments, the colored coating has a thickness of 0.1 mil to 30 mil. In some embodiments, the colored coating has a thickness of 0.1 mil to 25 mil. In some embodiments, the colored coating has a thickness of 0.1 mil to 24 mil. In some embodiments, the colored coating has a thickness of 0.1 mil to 22 mil. In some embodiments, the colored coating has a thickness of 0.1 mil to 20 mil. In some embodiments, the colored coating has a thickness of 0.1 mil to 18 mil. In some embodiments, the colored coating has a thickness of 0.1 mil to 16 mil. In some embodiments, the colored coating has a thickness of 0.1 mil to 15 mil. In some embodiments, the colored coating has a thickness of 0.1 mil to 14 mil. In some embodiments, the colored coating has a thickness of 0.1 mil to 12 mil. In some embodiments, the colored coating has a thickness of 0.1 mil to 10 mil. In some embodiments, the colored coating has a thickness of 0.1 mil to 8 mil. In some embodiments, the colored coating has a thickness of 0.1 mil to 6 mil. In some embodiments, the colored coating has a thickness of 0.1 mil to 5 mil.

In some embodiments, the colored coating has a thickness of 1 mil to 50 mil. In some embodiments, the colored coating has a thickness of 5 mil to 50 mil. In some embodiments, the colored coating has a thickness of 6 mil to 50 mil. In some embodiments, the colored coating has a thickness of 8 mil to 50 mil. In some embodiments, the colored coating has a thickness of 10 mil to 50 mil. In some embodiments, the colored coating has a thickness of 12 mil to 50 mil. In some embodiments, the colored coating has a thickness of 14 mil to 50 mil. In some embodiments, the colored coating has a thickness of 15 mil to 50 mil. In some embodiments, the colored coating has a thickness of 16 mil to 50 mil. In some embodiments, the colored coating has a thickness of 18 mil to 50 mil. In some embodiments, the colored coating has a thickness of 20 mil to 50 mil. In some embodiments, the colored coating has a thickness of 22 mil to 50 mil. In some embodiments, the colored coating has a thickness of 24 mil to 50 mil. In some embodiments, the colored coating has a thickness of 25 mil to 50 mil. In some embodiments, the colored coating has a thickness of 30 mil to 50 mil. In some embodiments, the colored coating has a thickness of 35 mil to 50 mil. In some embodiments, the colored coating has a thickness of 40 mil to 50 mil. In some embodiments, the colored coating has a thickness of 45 mil to 50 mil.

In some embodiments, the colored coating has a thickness of 1 mil to 25 mil. In some embodiments, the colored coating has a thickness of 2 mil to 25 mil. In some embodiments, the colored coating has a thickness of 4 mil to 25 mil. In some embodiments, the colored coating has a thickness of 5 mil to 25 mil. In some embodiments, the colored coating has a thickness of 6 mil to 25 mil. In some embodiments, the colored coating has a thickness of 8 mil to 25 mil. In some embodiments, the colored coating has a thickness of 10 mil to 25 mil. In some embodiments, the colored coating has a thickness of 12 mil to 25 mil. In some embodiments, the colored coating has a thickness of 14 mil to 25 mil. In some embodiments, the colored coating has a thickness of 15 mil to 25 mil. In some embodiments, the colored coating has a thickness of 16 mil to 25 mil. In some embodiments, the colored coating has a thickness of 18 mil to 25 mil. In some embodiments, the colored coating has a thickness of 20 mil to 25 mil. In some embodiments, the colored coating has a thickness of 22 mil to 25 mil.

In some embodiments, the roofing granule comprises 1% to 99% by weight of the roofing shingle waste core based on the total weight of the roofing granule. In some embodiments, the roofing granule comprises 10% to 90% by weight of the roofing shingle waste core based on the total weight of the roofing granule. In some embodiments, the roofing granule comprises 10% to 80% by weight of the roofing shingle waste core based on the total weight of the roofing granule. In some embodiments, the roofing granule comprises 10% to 70% by weight of the roofing shingle waste core based on the total weight of the roofing granule. In some embodiments, the roofing granule comprises 10% to 60% by weight of the roofing shingle waste core based on the total weight of the roofing granule. In some embodiments, the roofing granule comprises 10% to 50% by weight of the roofing shingle waste core based on the total weight of the roofing granule. In some embodiments, the roofing granule comprises 10% to 40% by weight of the roofing shingle waste core based on the total weight of the roofing granule. In some embodiments, the roofing granule comprises 10% to 30% by weight of the roofing shingle waste core based on the total weight of the roofing granule. In some embodiments, the roofing granule comprises 10% to 20% by weight of the roofing shingle waste core based on the total weight of the roofing granule.

In some embodiments, the roofing granule comprises 20% to 90% by weight of the roofing shingle waste core based on the total weight of the roofing granule. In some embodiments, the roofing granule comprises 30% to 90% by weight of the roofing shingle waste core based on the total weight of the roofing granule. In some embodiments, the roofing granule comprises 40% to 90% by weight of the roofing shingle waste core based on the total weight of the roofing granule. In some embodiments, the roofing granule comprises 50% to 90% by weight of the roofing shingle waste core based on the total weight of the roofing granule. In some embodiments, the roofing granule comprises 60% to 90% by weight of the roofing shingle waste core based on the total weight of the roofing granule. In some embodiments, the roofing granule comprises 70% to 90% by weight of the roofing shingle waste core based on the total weight of the roofing granule. In some embodiments, the roofing granule comprises 80% to 90% by weight of the roofing shingle waste core based on the total weight of the roofing granule.

In some embodiments, the roofing granule comprises at least 70% by weight of the base particle based on the total weight of the roofing granule. In some embodiments, the roofing granule comprises at least 72% by weight of the base particle based on the total weight of the roofing granule. In some embodiments, the roofing granule comprises at least 74% by weight of the base particle based on the total weight of the roofing granule. In some embodiments, the roofing granule comprises at least 75% by weight of the base particle based on the total weight of the roofing granule. In some embodiments, the roofing granule comprises at least 76% by weight of the base particle based on the total weight of the roofing granule. In some embodiments, the roofing granule comprises at least 78% by weight of the base particle based on the total weight of the roofing granule. In some embodiments, the roofing granule comprises at least 80% by weight of the base particle based on the total weight of the roofing granule. In some embodiments, the roofing granule comprises at least 82% by weight of the base particle based on the total weight of the roofing granule. In some embodiments, the roofing granule comprises at least 84% by weight of the base particle based on the total weight of the roofing granule. In some embodiments, the roofing granule comprises at least 85% by weight of the base particle based on the total weight of the roofing granule. In some embodiments, the roofing granule comprises at least 86% by weight of the base particle based on the total weight of the roofing granule. In some embodiments, the roofing granule comprises at least 88% by weight of the base particle based on the total weight of the roofing granule. In some embodiments, the roofing granule comprises at least 90% by weight of the base particle based on the total weight of the roofing granule. In some embodiments, the roofing granule comprises at least 92% by weight of the base particle based on the total weight of the roofing granule. In some embodiments, the roofing granule comprises at least 94% by weight of the base particle based on the total weight of the roofing granule.

In some embodiments, the roofing granule comprises 25% to 95% by weight of the base particle based on the total weight of the roofing granule. In some embodiments, the roofing granule comprises 25% to 90% by weight of the base particle based on the total weight of the roofing granule. In some embodiments, the roofing granule comprises 25% to 85% by weight of the base particle based on the total weight of the roofing granule. In some embodiments, the roofing granule comprises 25% to 80% by weight of the base particle based on the total weight of the roofing granule. In some embodiments, the roofing granule comprises 25% to 75% by weight of the base particle based on the total weight of the roofing granule. In some embodiments, the roofing granule comprises 25% to 70% by weight of the base particle based on the total weight of the roofing granule. In some embodiments, the roofing granule comprises 25% to 65% by weight of the base particle based on the total weight of the roofing granule. In some embodiments, the roofing granule comprises 25% to 60% by weight of the base particle based on the total weight of the roofing granule. In some embodiments, the roofing granule comprises 25% to 55% by weight of the base particle based on the total weight of the roofing granule. In some embodiments, the roofing granule comprises 25% to 50% by weight of the base particle based on the total weight of the roofing granule. In some embodiments, the roofing granule comprises 25% to 45% by weight of the base particle based on the total weight of the roofing granule. In some embodiments, the roofing granule comprises 25% to 40% by weight of the base particle based on the total weight of the roofing granule. In some embodiments, the roofing granule comprises 25% to 35% by weight of the base particle based on the total weight of the roofing granule. In some embodiments, the roofing granule comprises 25% to 30% by weight of the base particle based on the total weight of the roofing granule.

In some embodiments, the roofing granule comprises 30% to 95% by weight of the base particle based on the total weight of the roofing granule. In some embodiments, the roofing granule comprises 35% to 95% by weight of the base particle based on the total weight of the roofing granule. In some embodiments, the roofing granule comprises 40% to 95% by weight of the base particle based on the total weight of the roofing granule. In some embodiments, the roofing granule comprises 45% to 95% by weight of the base particle based on the total weight of the roofing granule. In some embodiments, the roofing granule comprises 50% to 95% by weight of the base particle based on the total weight of the roofing granule. In some embodiments, the roofing granule comprises 55% to 95% by weight of the base particle based on the total weight of the roofing granule. In some embodiments, the roofing granule comprises 60% to 95% by weight of the base particle based on the total weight of the roofing granule. In some embodiments, the roofing granule comprises 65% to 95% by weight of the base particle based on the total weight of the roofing granule. In some embodiments, the roofing granule comprises 70% to 95% by weight of the base particle based on the total weight of the roofing granule. In some embodiments, the roofing granule comprises 75% to 95% by weight of the base particle based on the total weight of the roofing granule. In some embodiments, the roofing granule comprises 80% to 95% by weight of the base particle based on the total weight of the roofing granule. In some embodiments, the roofing granule comprises 85% to 95% by weight of the base particle based on the total weight of the roofing granule. In some embodiments, the roofing granule comprises 90% to 95% by weight of the base particle based on the total weight of the roofing granule.

In some embodiments, the roofing granule comprises 70% to 95% by weight of the base particle based on the total weight of the roofing granule. In some embodiments, the roofing granule comprises 70% to 90% by weight of the base particle based on the total weight of the roofing granule. In some embodiments, the roofing granule comprises 70% to 85% by weight of the base particle based on the total weight of the roofing granule. In some embodiments, the roofing granule comprises 70% to 80% by weight of the base particle based on the total weight of the roofing granule. In some embodiments, the roofing granule comprises 70% to 75% by weight of the base particle based on the total weight of the roofing granule. In some embodiments, the roofing granule comprises 75% to 95% by weight of the base particle based on the total weight of the roofing granule. In some embodiments, the roofing granule comprises 80% to 95% by weight of the base particle based on the total weight of the roofing granule. In some embodiments, the roofing granule comprises 85% to 95% by weight of the base particle based on the total weight of the roofing granule. In some embodiments, the roofing granule comprises 90% to 95% by weight of the base particle based on the total weight of the roofing granule.

In some embodiments, the roofing granule comprises at least 1%, at least 2%, at least 3%, at least 5%, or at least 10% by weight of the binder based on a total weight of the roofing granule. In some embodiments, the roofing granule comprises 1% to 10% by weight of the binder based on the total weight of the roofing granule. In some embodiments, the roofing granule comprises 1% to 9% by weight of the binder based on the total weight of the roofing granule. In some embodiments, the roofing granule comprises 1% to 8% by weight of the binder based on the total weight of the roofing granule. In some embodiments, the roofing granule comprises 1% to 7% by weight of the binder based on the total weight of the roofing granule. In some embodiments, the roofing granule comprises 1% to 6% by weight of the binder based on the total weight of the roofing granule. In some embodiments, the roofing granule comprises 1% to 5% by weight of the binder based on the total weight of the roofing granule. In some embodiments, the roofing granule comprises 1% to 4% by weight of the binder based on the total weight of the roofing granule. In some embodiments, the roofing granule comprises 1% to 3% by weight of the binder based on the total weight of the roofing granule. In some embodiments, the roofing granule comprises 1% to 2% by weight of the binder based on the total weight of the roofing granule.

In some embodiments, the roofing granule comprises 2% to 10% by weight of the binder based on the total weight of the roofing granule. In some embodiments, the roofing granule comprises 3% to 10% by weight of the binder based on the total weight of the roofing granule. In some embodiments, the roofing granule comprises 4% to 10% by weight of the binder based on the total weight of the roofing granule. In some embodiments, the roofing granule comprises 5% to 10% by weight of the binder based on the total weight of the roofing granule. In some embodiments, the roofing granule comprises 6% to 10% by weight of the binder based on the total weight of the roofing granule. In some embodiments, the roofing granule comprises 7% to 10% by weight of the binder based on the total weight of the roofing granule. In some embodiments, the roofing granule comprises 8% to 10% by weight of the binder based on the total weight of the roofing granule. In some embodiments, the roofing granule comprises 9% to 10% by weight of the binder based on the total weight of the roofing granule.

In some embodiments, the roofing granule comprises 2% to 8% by weight of the binder based on the total weight of the roofing granule. In some embodiments, the roofing granule comprises 2% to 6% by weight of the binder based on the total weight of the roofing granule. In some embodiments, the roofing granule comprises 3% to 6% by weight of the binder based on the total weight of the roofing granule. In some embodiments, the roofing granule comprises 2% to 4% by weight of the binder based on the total weight of the roofing granule.

In some embodiments, the roofing granule comprises at least 5% by weight of the asphalt residue based on the total weight of the roofing granule. In some embodiments, the roofing granule comprises at least 10% by weight of the asphalt residue based on the total weight of the roofing granule. In some embodiments, the roofing granule comprises at least 15% by weight of the asphalt residue based on the total weight of the roofing granule. In some embodiments, the roofing granule comprises at least 20% by weight of the asphalt residue based on the total weight of the roofing granule. In some embodiments, the roofing granule comprises at least 25% by weight of the asphalt residue based on the total weight of the roofing granule.

In some embodiments, the roofing granule comprises 0.1% to 50% by weight of the asphalt residue based on the total weight of the roofing granule. In some embodiments, the roofing granule comprises 0.1% to 45% by weight of the asphalt residue based on the total weight of the roofing granule. In some embodiments, the roofing granule comprises 0.1% to 40% by weight of the asphalt residue based on the total weight of the roofing granule. In some embodiments, the roofing granule comprises 0.1% to 35% by weight of the asphalt residue based on the total weight of the roofing granule. In some embodiments, the roofing granule comprises 0.1% to 30% by weight of the asphalt residue based on the total weight of the roofing granule. In some embodiments, the roofing granule comprises 0.1% to 25% by weight of the asphalt residue based on the total weight of the roofing granule. In some embodiments, the roofing granule comprises 0.1% to 20% by weight of the asphalt residue based on the total weight of the roofing granule. In some embodiments, the roofing granule comprises 0.1% to 15% by weight of the asphalt residue based on the total weight of the roofing granule. In some embodiments, the roofing granule comprises 0.1% to 10% by weight of the asphalt residue based on the total weight of the roofing granule. In some embodiments, the roofing granule comprises 0.1% to 5% by weight of the asphalt residue based on the total weight of the roofing granule. In some embodiments, the roofing granule comprises 0.1% to 1% by weight of the asphalt residue based on the total weight of the roofing granule.

In some embodiments, the roofing granule comprises 1% to 50% by weight of the asphalt residue based on the total weight of the roofing granule. In some embodiments, the roofing granule comprises 5% to 50% by weight of the asphalt residue based on the total weight of the roofing granule. In some embodiments, the roofing granule comprises 10% to 50% by weight of the asphalt residue based on the total weight of the roofing granule. In some embodiments, the roofing granule comprises 15% to 50% by weight of the asphalt residue based on the total weight of the roofing granule. In some embodiments, the roofing granule comprises 20% to 50% by weight of the asphalt residue based on the total weight of the roofing granule. In some embodiments, the roofing granule comprises 25% to 50% by weight of the asphalt residue based on the total weight of the roofing granule. In some embodiments, the roofing granule comprises 30% to 50% by weight of the asphalt residue based on the total weight of the roofing granule. In some embodiments, the roofing granule comprises 35% to 50% by weight of the asphalt residue based on the total weight of the roofing granule. In some embodiments, the roofing granule comprises 40% to 50% by weight of the asphalt residue based on the total weight of the roofing granule. In some embodiments, the roofing granule comprises 45% to 50% by weight of the asphalt residue based on the total weight of the roofing granule.

In some embodiments, the roofing granule comprises 5% to 30% by weight of the asphalt residue based on the total weight of the roofing granule. In some embodiments, the roofing granule comprises 5% to 28% by weight of the asphalt residue based on the total weight of the roofing granule. In some embodiments, the roofing granule comprises 5% to 26% by weight of the asphalt residue based on the total weight of the roofing granule. In some embodiments, the roofing granule comprises 5% to 25% by weight of the asphalt residue based on the total weight of the roofing granule. In some embodiments, the roofing granule comprises 5% to 24% by weight of the asphalt residue based on the total weight of the roofing granule. In some embodiments, the roofing granule comprises 5% to 22% by weight of the asphalt residue based on the total weight of the roofing granule. In some embodiments, the roofing granule comprises 5% to 20% by weight of the asphalt residue based on the total weight of the roofing granule. In some embodiments, the roofing granule comprises 5% to 18% by weight of the asphalt residue based on the total weight of the roofing granule. In some embodiments, the roofing granule comprises 5% to 16% by weight of the asphalt residue based on the total weight of the roofing granule. In some embodiments, the roofing granule comprises 5% to 15% by weight of the asphalt residue based on the total weight of the roofing granule. In some embodiments, the roofing granule comprises 5% to 14% by weight of the asphalt residue based on the total weight of the roofing granule. In some embodiments, the roofing granule comprises 5% to 12% by weight of the asphalt residue based on the total weight of the roofing granule. In some embodiments, the roofing granule comprises 5% to 10% by weight of the asphalt residue based on the total weight of the roofing granule. In some embodiments, the roofing granule comprises 5% to 8% by weight of the asphalt residue based on the total weight of the roofing granule.

In some embodiments, the roofing granule comprises 6% to 30% by weight of the asphalt residue based on the total weight of the roofing granule. In some embodiments, the roofing granule comprises 8% to 30% by weight of the asphalt residue based on the total weight of the roofing granule. In some embodiments, the roofing granule comprises 10% to 30% by weight of the asphalt residue based on the total weight of the roofing granule. In some embodiments, the roofing granule comprises 12% to 30% by weight of the asphalt residue based on the total weight of the roofing granule. In some embodiments, the roofing granule comprises 14% to 30% by weight of the asphalt residue based on the total weight of the roofing granule. In some embodiments, the roofing granule comprises 15% to 30% by weight of the asphalt residue based on the total weight of the roofing granule. In some embodiments, the roofing granule comprises 16% to 30% by weight of the asphalt residue based on the total weight of the roofing granule. In some embodiments, the roofing granule comprises 18% to 30% by weight of the asphalt residue based on the total weight of the roofing granule. In some embodiments, the roofing granule comprises 20% to 30% by weight of the asphalt residue based on the total weight of the roofing granule. In some embodiments, the roofing granule comprises 22% to 30% by weight of the asphalt residue based on the total weight of the roofing granule. In some embodiments, the roofing granule comprises 24% to 30% by weight of the asphalt residue based on the total weight of the roofing granule. In some embodiments, the roofing granule comprises 25% to 30% by weight of the asphalt residue based on the total weight of the roofing granule. In some embodiments, the roofing granule comprises 26% to 30% by weight of the asphalt residue based on the total weight of the roofing granule. In some embodiments, the roofing granule comprises 28% to 30% by weight of the asphalt residue based on the total weight of the roofing granule. In some embodiments, the roofing granule does not comprise the asphalt residue.

In some embodiments, the roofing granule comprises 10% to 90% by weight of the asphalt based on the total weight of the roofing granule. In some embodiments, the roofing granule comprises 10% to 80% by weight of the asphalt based on the total weight of the roofing granule. In some embodiments, the roofing granule comprises 10% to 70% by weight of the asphalt based on the total weight of the roofing granule. In some embodiments, the roofing granule comprises 10% to 60% by weight of the asphalt based on the total weight of the roofing granule. In some embodiments, the roofing granule comprises 10% to 50% by weight of the asphalt based on the total weight of the roofing granule. In some embodiments, the roofing granule comprises 10% to 40% by weight of the asphalt based on the total weight of the roofing granule. In some embodiments, the roofing granule comprises 10% to 30% by weight of the asphalt based on the total weight of the roofing granule. In some embodiments, the roofing granule comprises 10% to 20% by weight of the asphalt based on the total weight of the roofing granule.

In some embodiments, the roofing granule comprises 20% to 90% by weight of the asphalt based on the total weight of the roofing granule. In some embodiments, the roofing granule comprises 30% to 90% by weight of the asphalt based on the total weight of the roofing granule. In some embodiments, the roofing granule comprises 40% to 90% by weight of the asphalt based on the total weight of the roofing granule. In some embodiments, the roofing granule comprises 50% to 90% by weight of the asphalt based on the total weight of the roofing granule. In some embodiments, the roofing granule comprises 60% to 90% by weight of the asphalt based on the total weight of the roofing granule. In some embodiments, the roofing granule comprises 70% to 90% by weight of the asphalt based on the total weight of the roofing granule. In some embodiments, the roofing granule comprises 80% to 90% by weight of the asphalt based on the total weight of the roofing granule.

In some embodiments, the roofing granule comprises 10% to 90% by weight of the at least one filler based on the total weight of the roofing granule. In some embodiments, the roofing granule comprises 10% to 80% by weight of the at least one filler based on the total weight of the roofing granule. In some embodiments, the roofing granule comprises 10% to 70% by weight of the at least one filler based on the total weight of the roofing granule. In some embodiments, the roofing granule comprises 10% to 60% by weight of the at least one filler based on the total weight of the roofing granule. In some embodiments, the roofing granule comprises 10% to 50% by weight of the at least one filler based on the total weight of the roofing granule. In some embodiments, the roofing granule comprises 10% to 40% by weight of the at least one filler based on the total weight of the roofing granule. In some embodiments, the roofing granule comprises 10% to 30% by weight of the at least one filler based on the total weight of the roofing granule. In some embodiments, the roofing granule comprises 10% to 20% by weight of the at least one filler based on the total weight of the roofing granule.

In some embodiments, the roofing granule comprises 20% to 90% by weight of the at least one filler based on the total weight of the roofing granule. In some embodiments, the roofing granule comprises 30% to 90% by weight of the at least one filler based on the total weight of the roofing granule. In some embodiments, the roofing granule comprises 40% to 90% by weight of the at least one filler based on the total weight of the roofing granule. In some embodiments, the roofing granule comprises 50% to 90% by weight of the at least one filler based on the total weight of the roofing granule. In some embodiments, the roofing granule comprises 60% to 90% by weight of the at least one filler based on the total weight of the roofing granule. In some embodiments, the roofing granule comprises 70% to 90% by weight of the at least one filler based on the total weight of the roofing granule. In some embodiments, the roofing granule comprises 80% to 90% by weight of the at least one filler based on the total weight of the roofing granule.

In some embodiments, the roofing granule comprises 1% to 70% by weight of the non-asphalt residue based on the total weight of the roofing granule. In some embodiments, the roofing granule comprises 1% to 60% by weight of the non-asphalt residue based on the total weight of the roofing granule. In some embodiments, the roofing granule comprises 1% to 50% by weight of the non-asphalt residue based on the total weight of the roofing granule. In some embodiments, the roofing granule comprises 1% to 40% by weight of the non-asphalt residue based on the total weight of the roofing granule. In some embodiments, the roofing granule comprises 1% to 30% by weight of the non-asphalt residue based on the total weight of the roofing granule. In some embodiments, the roofing granule comprises 1% to 20% by weight of the non-asphalt residue based on the total weight of the roofing granule. In some embodiments, the roofing granule comprises 1% to 10% by weight of the non-asphalt residue based on the total weight of the roofing granule.

In some embodiments, the roofing granule comprises 10% to 70% by weight of the non-asphalt residue based on the total weight of the roofing granule. In some embodiments, the roofing granule comprises 20% to 70% by weight of the non-asphalt residue based on the total weight of the roofing granule. In some embodiments, the roofing granule comprises 30% to 70% by weight of the non-asphalt residue based on the total weight of the roofing granule. In some embodiments, the roofing granule comprises 40% to 70% by weight of the non-asphalt residue based on the total weight of the roofing granule. In some embodiments, the roofing granule comprises 50% to 70% by weight of the non-asphalt residue based on the total weight of the roofing granule. In some embodiments, the roofing granule comprises 60% to 70% by weight of the non-asphalt residue based on the total weight of the roofing granule. In some embodiments, the roofing granule does not comprise the non-asphalt residue.

In some embodiments, the roofing granule comprises at least 10% by weight of the colored coating based on the total weight of the roofing granule. In some embodiments, the roofing granule comprises at least 15% by weight of the colored coating based on the total weight of the roofing granule. In some embodiments, the roofing granule comprises at least 20% by weight of the colored coating based on the total weight of the roofing granule. In some embodiments, the roofing granule comprises at least 25% by weight of the colored coating based on the total weight of the roofing granule. In some embodiments, the roofing granule comprises at least 30% by weight of the colored coating based on the total weight of the roofing granule. In some embodiments, the roofing granule comprises at least 35% by weight of the colored coating based on the total weight of the roofing granule.

In some embodiments, the roofing granule comprises 1% to 40% by weight of the colored coating based on the total weight of the roofing granule. In some embodiments, the roofing granule comprises 5% to 40% by weight of the colored coating based on the total weight of the roofing granule. In some embodiments, the roofing granule comprises 10% to 40% by weight of the colored coating based on the total weight of the roofing granule. In some embodiments, the roofing granule comprises 15% to 40% by weight of the colored coating based on the total weight of the roofing granule. In some embodiments, the roofing granule comprises 20% to 40% by weight of the colored coating based on the total weight of the roofing granule. In some embodiments, the roofing granule comprises 25% to 40% by weight of the colored coating based on the total weight of the roofing granule. In some embodiments, the roofing granule comprises 30% to 40% by weight of the colored coating based on the total weight of the roofing granule. In some embodiments, the roofing granule comprises 35% to 40% by weight of the colored coating based on the total weight of the roofing granule. In some embodiments, the roofing granule comprises 1% to 35% by weight of the colored coating based on the total weight of the roofing granule. In some embodiments, the roofing granule comprises 1% to 30% by weight of the colored coating based on the total weight of the roofing granule. In some embodiments, the roofing granule comprises 1% to 25% by weight of the colored coating based on the total weight of the roofing granule. In some embodiments, the roofing granule comprises 1% to 20% by weight of the colored coating based on the total weight of the roofing granule. In some embodiments, the roofing granule comprises 1% to 15% by weight of the colored coating based on the total weight of the roofing granule. In some embodiments, the roofing granule comprises 1% to 10% by weight of the colored coating based on the total weight of the roofing granule. In some embodiments, the roofing granule comprises 1% to 5% by weight of the colored coating based on the total weight of the roofing granule.

In some embodiments, the roofing shingle waste core, when tested according to an Organism Growth Testing Method, does not exhibit a green growth at an interface between the roofing shingle waste core and a testing solution (e.g., either a diluted or undiluted growth media) after a duration of one month.

In some embodiments, the roofing shingle waste core, when tested according to an Organism Growth Testing Method, does not exhibit a green growth at an interface between the roofing shingle waste core and a testing solution (e.g., either a diluted or undiluted growth media) after a duration of two weeks.

FIG. 1 is a schematic diagram of a roofing granule 100, according to some embodiments. As shown in FIG. 1, in some embodiments, the roofing granule 100 comprises a roofing shingle waste core 102. In some embodiments, the roofing shingle waste core 102 comprises a base particle 104. In some embodiments, the roofing shingle waste core 102 comprises agglomerated base particles (not shown). In some embodiments, the roofing granule 100 comprises an asphalt residue 106 covering at least a portion of a surface of the roofing shingle waste core 102. In some embodiments, the roofing granule 100 comprises an asphalt residue 106 covering at least a portion of a surface of the base particle 104 or agglomerated base particle 104. In some embodiments, the roofing granule 100 comprises a colored coating 108 covering at least a portion of the asphalt residue. The roofing granule 100 is illustrative and thus it will be appreciated that other configurations may be employed without departing from the scope of this disclosure.

Figure 2:
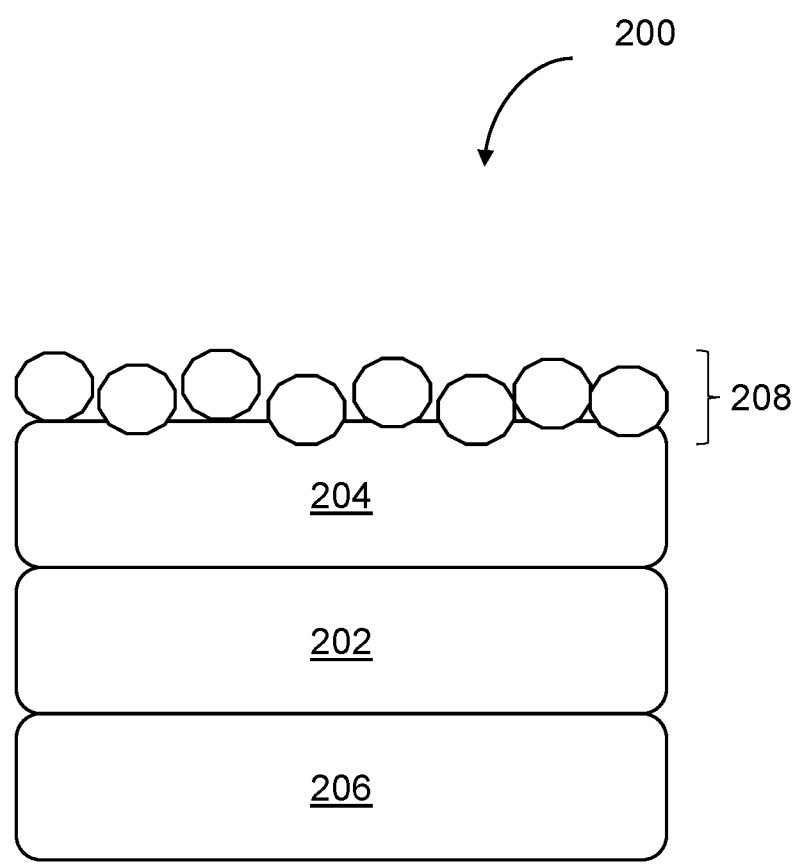
FIG. 2 is a schematic diagram of a cross-section of a roofing shingle, according to some embodiments.

FIG. 2 is a schematic diagram of a roofing shingle 200, according to some embodiments. As shown in FIG. 2, in some embodiments, the roofing shingle 200 comprises a substrate 202. In some embodiments, the substrate comprises at least one of an asphaltic substrate, a plywood substrate, a glass substrate, a cellulosic substrate, a roof shingle, a glass mat, a fiberglass mat, an underlayment, a roofing membrane, a roof deck, a photovoltaic (PV) panel, a modified bitumen (MODBIT) substrate, a roll good, a board (such as but not limited to at least one of a foam board (e.g., a polyisocyanurate (ISO) foam board), a cover board, or any combination thereof), a base sheet, a wax paper, or any combination thereof. In some embodiments, the substrate comprises a sheet having a top surface and a bottom surface. In some embodiments, the substrate comprises a top sheet, and a bottom sheet attached to the top sheet (e.g., in a common bond area). In some embodiments, the top sheet comprises a headlap, and a plurality of tabs extending from a side of the headlap, and the bottom sheet underlies the plurality of tabs such that at least a portion of the bottom sheet is exposed between the plurality of tabs.

In some embodiments, the roofing shingle 200 comprises a coating 204 on a top surface of the substrate 202. In some embodiments, the roofing shingle 200 comprises a coating 206 on a bottom surface of the substrate 202. In some embodiments, the coating 204 comprises an asphalt filled coating. In some embodiments, the coating 206 comprises an asphalt filled coating. In some embodiments, the asphalt filled coating comprises an asphalt, at least one filler, or any combination thereof. Any of the asphalts and fillers disclosed herein may be employed without departing from the scope of this disclosure. In some embodiments, the roofing shingle 200 comprises a plurality of roofing granules 208 on the coating 204. It will be appreciated that any of the roofing granules disclosed herein may be employed without departing from the scope of this disclosure. In some embodiments, the roofing shingle is a strip shingle, such as a 3-tab strip shingle. In some embodiments, the roofing shingle is a laminated roofing shingle.

In some embodiments, the asphalt filled coating comprises 10% to 90% by weight of the asphalt based on the total weight of the asphalt filled coating. In some embodiments, the asphalt filled coating comprises 10% to 80% by weight of the asphalt based on the total weight of the asphalt filled coating. In some embodiments, the asphalt filled coating comprises 10% to 70% by weight of the asphalt based on the total weight of the asphalt filled coating. In some embodiments, the asphalt filled coating comprises 10% to 60% by weight of the asphalt based on the total weight of the asphalt filled coating. In some embodiments, the asphalt filled coating comprises 10% to 50% by weight of the asphalt based on the total weight of the asphalt filled coating. In some embodiments, the asphalt filled coating comprises 10% to 40% by weight of the asphalt based on the total weight of the asphalt filled coating. In some embodiments, the asphalt filled coating comprises 10% to 30% by weight of the asphalt based on the total weight of the asphalt filled coating. In some embodiments, the asphalt filled coating comprises 10% to 20% by weight of the asphalt based on the total weight of the asphalt filled coating.

In some embodiments, the asphalt filled coating comprises 20% to 90% by weight of the asphalt based on the total weight of the asphalt filled coating. In some embodiments, the asphalt filled coating comprises 30% to 90% by weight of the asphalt based on the total weight of the asphalt filled coating. In some embodiments, the asphalt filled coating comprises 40% to 90% by weight of the asphalt based on the total weight of the asphalt filled coating. In some embodiments, the asphalt filled coating comprises 50% to 90% by weight of the asphalt based on the total weight of the asphalt filled coating. In some embodiments, the asphalt filled coating comprises 60% to 90% by weight of the asphalt based on the total weight of the asphalt filled coating. In some embodiments, the asphalt filled coating comprises 70% to 90% by weight of the asphalt based on the total weight of the asphalt filled coating. In some embodiments, the asphalt filled coating comprises 80% to 90% by weight of the asphalt based on the total weight of the asphalt filled coating.

In some embodiments, the asphalt filled coating comprises 10% to 90% by weight of the at least one filler based on the total weight of the asphalt filled coating. In some embodiments, the asphalt filled coating comprises 10% to 80% by weight of the at least one filler based on the total weight of the asphalt filled coating. In some embodiments, the asphalt filled coating comprises 10% to 70% by weight of the at least one filler based on the total weight of the asphalt filled coating. In some embodiments, the asphalt filled coating comprises 10% to 60% by weight of the at least one filler based on the total weight of the asphalt filled coating. In some embodiments, the asphalt filled coating comprises 10% to 50% by weight of the at least one filler based on the total weight of the asphalt filled coating. In some embodiments, the asphalt filled coating comprises 10% to 40% by weight of the at least one filler based on the total weight of the asphalt filled coating. In some embodiments, the asphalt filled coating comprises 10% to 30% by weight of the at least one filler based on the total weight of the asphalt filled coating. In some embodiments, the asphalt filled coating comprises 10% to 20% by weight of the at least one filler based on the total weight of the asphalt filled coating.

In some embodiments, the asphalt filled coating comprises 20% to 90% by weight of the at least one filler based on the total weight of the asphalt filled coating. In some embodiments, the asphalt filled coating comprises 30% to 90% by weight of the at least one filler based on the total weight of the asphalt filled coating. In some embodiments, the asphalt filled coating comprises 40% to 90% by weight of the at least one filler based on the total weight of the asphalt filled coating. In some embodiments, the asphalt filled coating comprises 50% to 90% by weight of the at least one filler based on the total weight of the asphalt filled coating. In some embodiments, the asphalt filled coating comprises 60% to 90% by weight of the at least one filler based on the total weight of the asphalt filled coating. In some embodiments, the asphalt filled coating comprises 70% to 90% by weight of the at least one filler based on the total weight of the asphalt filled coating. In some embodiments, the asphalt filled coating comprises 80% to 90% by weight of the at least one filler based on the total weight of the asphalt filled coating.

Figure 3:
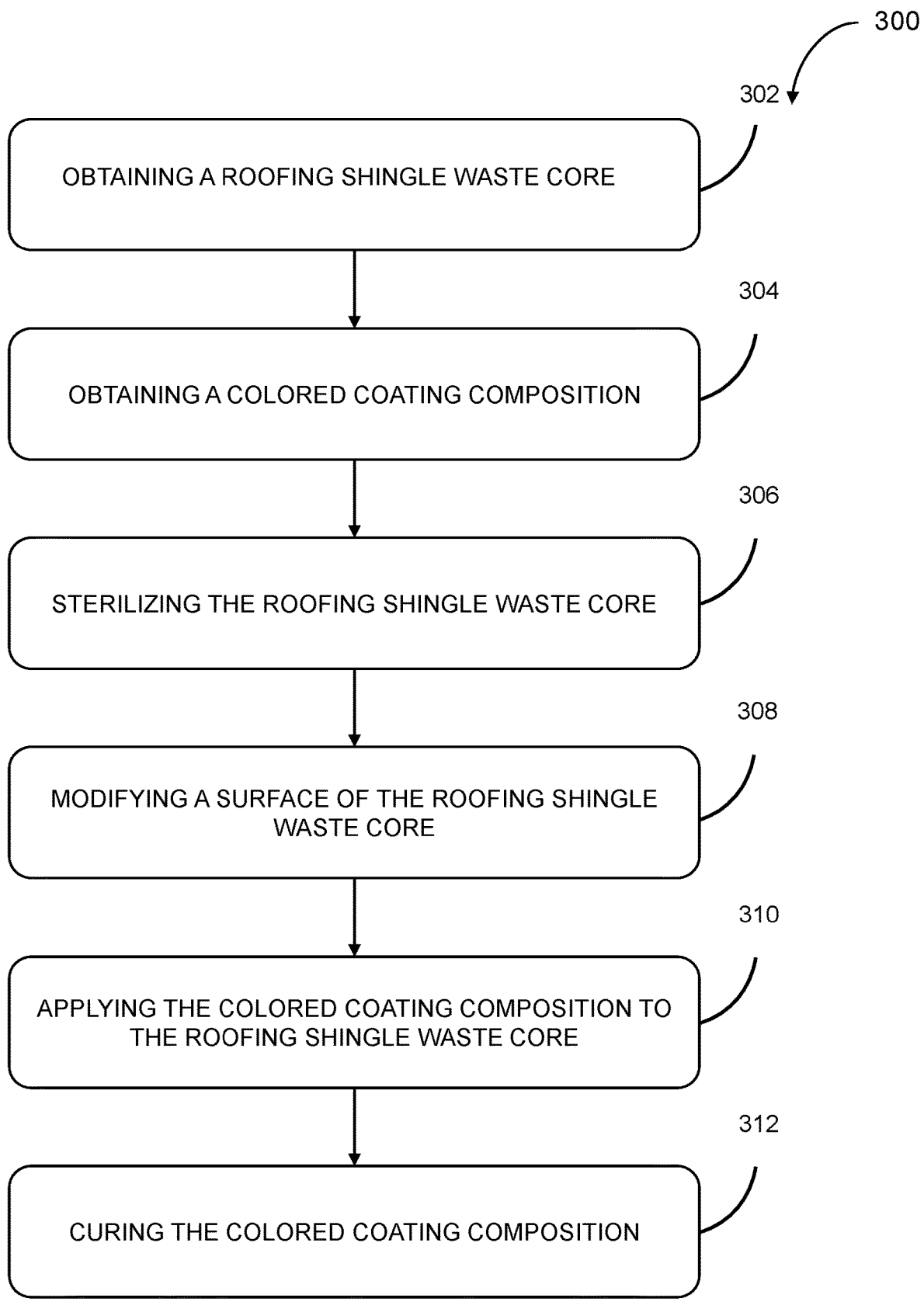
FIG. 3 is a flowchart of a method for forming a roofing granule, according to some embodiments.

FIG. 3 is a flowchart of a method 300 for forming a roofing granule, according to some embodiments. As shown in FIG. 3, in some embodiments, the method 300 for forming a roofing granule comprises one or more of the following steps: a step 302 of obtaining a roofing shingle waste core; a step 304 of obtaining a colored coating composition; a step 306 of sterilizing the roofing shingle waste core; a step 308 of modifying the roofing shingle waste core; a step 310 of applying the colored coating composition to the roofing shingle waste core; and a step 312 of curing the colored coating composition. It will be appreciated that any one or more of the foregoing steps may be performed and/or not performed, without departing from the scope of this disclosure. For example, in some embodiments, the method 300 does not comprise the step 306 and/or the step 308. It will be appreciated that any of the roofing granules or components thereof (e.g., roofing shingle waste core, colored coating composition, colored coating, etc.) may be employed herein without departing from this disclosure. In some embodiments, the method 300 comprises applying the colored coating composition to the roofing shingle waste core.

At step 306, in some embodiments, the method 300 for forming a roofing granule comprises sterilizing the roofing shingle waste core. In some embodiments, the sterilizing is sufficient to destroy, kill, or inhibit the growth of at least one of at least one organism (e.g., at least one of at least on prokaryote, at least one eukaryote, or any combination thereof), at least one spore, or any combination thereof. In some embodiments, the test method used to determine whether the roofing shingle waste core has been sterilized includes, but is not limited to, at least one of a macroscopic examination (e.g., a visual inspection, without a microscope), microscopic examination (e.g., a visual inspection, with a microscope, or any combination thereof. In some embodiments, a microscopic examination involves examining a sample under a microscope to look for spores, eukaryotes organisms (e.g. algae), and/or prokaryotes organisms (e.g. bacteria). If no spores, eukaryotes organisms (e.g. algae), and/or prokaryotes organisms (e.g. bacteria) are visible, then the item is considered to be sterilized. In some embodiments, an examination method comprises a culture method which involves incubating a sample in a growth medium. If spores, eukaryotes organisms (e.g. algae), and/or prokaryotes organisms (e.g. bacteria) are present, they will grow and form colonies. The absence of colonies indicates that the sample is sterilized. In some embodiments, an examination method comprises a biochemical test which involves a number of biochemical tests that can be used to detect the presence of spores, eukaryotes organisms (e.g. algae), and/or prokaryotes organisms (e.g. bacteria). In some embodiments, a biochemical test comprises adding specific chemicals to a sample and then observing for a reaction. If a reaction occurs or is observed, then it indicates that spores, eukaryotes organisms (e.g. algae), and/or prokaryotes organisms (e.g. bacteria) are present. If no reaction occurs or is observed, then it indicates that spores, eukaryotes organisms (e.g. algae), and/or prokaryotes organisms (e.g. bacteria) are not present.

In some embodiments, the sterilizing is determined according to a testing method. In some embodiments, the testing method refers to a testing method in which a subject (e.g., a roofing shingle waste core) is immersed in a growth media (e.g., in a test tube) and the resulting sample is subjected to an environment for a duration and under conditions sufficient for growing at least one organism. In some embodiments, the resulting sample is heated at a sufficient temperature for a sufficient duration, such that the roofing shingle waste core does not exhibit organism growth when tested according to the testing method. For example, in some embodiments, the resulting sample (e.g., test tube) is sealed to reduce or prevent airborne cross-contamination. In some embodiments, the resulting sample and/or surrounding air is heated to a temperature, such as, for example, at or above 80 F°. In some embodiments, the resulting sample is exposed to at least one of natural light (e.g., sunlight), artificial light (e.g., from a lamp), or any combination thereof. In some embodiments, a visual inspection of the resulting sample is then performed (e.g., after being subjected to the environment for a sufficient duration and under conditions sufficient for growing at least one organism) to determine the presence or absence of organism growth. In some embodiments, when the solution in the sample is clear or cloudy, the subject is deemed sterilized. In some embodiments, when the solution is not clear or not cloudy, the subject is deemed not sterilized. In some embodiments, the growth media is diluted. In some embodiments, the growth media is not diluted. In some embodiments, when the solution is clear or cloudy as determined by a visual inspection of the sample, it is determined that the roofing shingle waste core does not exhibit organism growth. When the solution is not clear or not cloudy as determined by a visual inspection of the sample, it is determined that the roofing shingle waste core does exhibit organism growth.

In some embodiments, an Organism Growth Testing Method is performed to determine whether the roofing shingle waste cores exhibit organism growth. In some embodiments, the Organism Growth Testing Method comprises adding roofing shingle waste cores to separate test tubes. In some embodiments, each test tube comprises a growth media and deionized water at a ratio of 1:9. In some embodiments, the test tubes are sealed to reduce or prevent airborne cross-contamination. In some embodiments, the test tubes are placed in a glass chamber and exposed to natural light and/or LED broad-spectrum white light. In some embodiments, the air in the glass chamber and test tubes is heated to 80° F. using heating pads. In some embodiments, the test tubes are visually inspected after 1 month. In some embodiments, when, based on a visual inspection, a green growth is observed at an interface between the roofing shingle waste cores and the growth media solution, the roofing shingle waste cores are deemed to exhibit organism growth. In some embodiments, when, based on a visual inspection, no green growth is observed at an interface between the roofing shingle waste cores and the growth media solution, the roofing shingle waste cores are deemed not to exhibit organism growth.

In some embodiments, an Organism Growth Testing Method is performed to determine whether the roofing shingle waste cores exhibit organism growth. In some embodiments, the Organism Growth Testing Method comprises adding roofing shingle waste cores to separate test tubes. In some embodiments, each test tube comprises a growth media, without dilution (e.g., 100% growth media), to accelerate the rate of organism growth. In some embodiments, the test tubes are sealed to reduce or prevent airborne cross-contamination. In some embodiments, the test tubes are placed in a glass chamber and exposed to natural light and/or LED broad-spectrum white light. In some embodiments, the air in the glass chamber and test tubes is heated to 80° F. using heating pads. In some embodiments, the test tubes are visually inspected after 2 weeks. In some embodiments, when, based on a visual inspection, a green growth is observed at an interface between the roofing shingle waste cores and the growth media solution, the roofing shingle waste cores are deemed to exhibit organism growth. In some embodiments, when, based on a visual inspection, no green growth is observed at an interface between the roofing shingle waste cores and the growth media solution, the roofing shingle waste cores are deemed not to exhibit organism growth.

In some embodiments, "sterilizing" a roofing shingle waste core refers to an X percentage reduction in at least one of spores, eukaryotes organisms (e.g. algae), prokaryotes organisms (e.g. bacteria), or any combination thereof, after sterilizing as disclosed herein. In some embodiments, the sterilizing results in a 99% reduction in at least one of spores, eukaryote organisms, prokaryote organisms, or any combination thereof. In some embodiments, the sterilizing results in a 98% reduction in at least one of spores, eukaryote organisms, prokaryote organisms, or any combination thereof. In some embodiments, the sterilizing results in a 97% reduction in at least one of spores, eukaryote organisms, prokaryote organisms, or any combination thereof. In some embodiments, the sterilizing results in a 96% reduction in at least one of spores, eukaryote organisms, prokaryote organisms, or any combination thereof. In some embodiments, the sterilizing results in a 95% reduction in at least one of spores, eukaryote organisms, prokaryote organisms, or any combination thereof. In some embodiments, the sterilizing results in a 94% reduction in at least one of spores, eukaryote organisms, prokaryote organisms, or any combination thereof. In some embodiments, the sterilizing results in a 93% reduction in at least one of spores, eukaryote organisms, prokaryote organisms, or any combination thereof. In some embodiments, the sterilizing results in a 92% reduction in at least one of spores, eukaryote organisms, prokaryote organisms, or any combination thereof. In some embodiments, the sterilizing results in a 91% reduction in at least one of spores, eukaryote organisms, prokaryote organisms, or any combination thereof. In some embodiments, the sterilizing results in a 90% reduction in at least one of spores, eukaryote organisms, prokaryote organisms, or any combination thereof. In some embodiments, the sterilizing results in a 85% reduction in at least one of spores, eukaryote organisms, prokaryote organisms, or any combination thereof. In some embodiments, the sterilizing results in a 80% reduction in at least one of spores, eukaryote organisms, prokaryote organisms, or any combination thereof. In some embodiments, the sterilizing results in a 75% reduction in at least one of spores, eukaryote organisms, prokaryote organisms, or any combination thereof. In some embodiments, the sterilizing results in a 70% reduction in at least one of spores, eukaryote organisms, prokaryote organisms, or any combination thereof. In some embodiments, the sterilizing results in a 65% reduction in at least one of spores, eukaryote organisms, prokaryote organisms, or any combination thereof. In some embodiments, the sterilizing results in a 60% reduction in at least one of spores, eukaryote organisms, prokaryote organisms, or any combination thereof. In some embodiments, the sterilizing results in a 55% reduction in at least one of spores, eukaryote organisms, prokaryote organisms, or any combination thereof. In some embodiments, the sterilizing results in a 50% reduction in at least one of spores, eukaryote organisms, prokaryote organisms, or any combination thereof. In some embodiments, the sterilizing results in a 45% reduction in at least one of spores, eukaryote organisms, prokaryote organisms, or any combination thereof. In some embodiments, the sterilizing results in a 40% reduction in at least one of spores, eukaryote organisms, prokaryote organisms, or any combination thereof. In some embodiments, the sterilizing results in a 35% reduction in at least one of spores, eukaryote organisms, prokaryote organisms, or any combination thereof. In some embodiments, the sterilizing results in a 30% reduction in at least one of spores, eukaryote organisms, prokaryote organisms, or any combination thereof. In some embodiments, the sterilizing results in a 25% reduction in at least one of spores, eukaryote organisms, prokaryote organisms, or any combination thereof. In some embodiments, the sterilizing results in a 20% reduction in at least one of spores, eukaryote organisms, prokaryote organisms, or any combination thereof. In some embodiments, the sterilizing results in a 15% reduction in at least one of spores, eukaryote organisms, prokaryote organisms, or any combination thereof. In some embodiments, the sterilizing results in a 10% reduction in at least one of spores, eukaryote organisms, prokaryote organisms, or any combination thereof. In some embodiments, the sterilizing destroys or kills the spores in their entirety. In some embodiments, the sterilizing destroys or kills the eukaryote organisms in their entirety. In some embodiments, the sterilizing destroys or kills the prokaryote organisms in their entirety.

In some embodiments, the sterilizing comprises heating the roofing shingle waste core. In some embodiments, the sterilizing comprises heating the roofing shingle waste core at a temperature. In some embodiments, the sterilizing comprises heating the roofing shingle waste core to a temperature. In some embodiments, the sterilizing comprises heating the roofing shingle waste core from a first temperature to a second temperature and holding the roofing shingle waste core at the second temperature for a duration. In some embodiments, the sterilizing comprises contacting the roofing shingle waste core with a sterilizing agent. In some embodiments, the sterilizing comprises drying the roofing shingle waste core (e.g., to remove some or all moisture). In some embodiments, the sterilizing comprises drying the roofing shingle waste core after contacting the roofing shingle waste core with the sterilizing agent.

In some embodiments, the roofing shingle waste core is contacted with the sterilizing agent. In some embodiments, the contacting comprises exposing the roofing shingle waste core to the sterilizing agent. In some embodiments, the contacting comprises spraying the roofing shingle waste core with the sterilizing agent. In some embodiments, the contacting comprises immersing the roofing shingle waste core in the sterilizing agent. In some embodiments, the contacting comprises pouring the sterilizing agent on the roofing shingle waste core. In some embodiments, the contacting comprises dispensing the sterilizing agent onto the roofing shingle waste core. In some embodiments, the contacting comprises applying the sterilizing agent onto the roofing shingle waste core. In some embodiments, the contacting comprises brushing the sterilizing agent onto the roofing shingle waste core. In some embodiments, the contacting comprises rolling the sterilizing agent onto the roofing shingle waste core. In some embodiments, the contacting comprises mixing the roofing shingle waste core with the sterilizing agent. In some embodiments, the sterilizing comprises combining one or more sterilizing agent and either simultaneously (or sequentially) heating the roofing shingle waste core at or to a temperature for a duration sufficient to sterilize the roofing shingle waste core.

In some embodiments, the sterilizing comprises heating the roofing shingle waste core at or to a temperature for a duration sufficient to sterilize the roofing shingle waste core. In some embodiments, the heating is conducted by indirect exposure to a heat source. In some embodiments, the heating is conducted by direct exposure to a heat source. In some embodiments, the heat source is steam. In some embodiments, the heating is conducted in an oven. Non-limiting examples of ovens include, for example and without limitation, at least one of a batch oven, a conveyer oven, a curing oven, a direct gas oven, a microwave oven, a drying oven, an industrial electric oven, an infrared oven, or any combination thereof.

In some embodiments, the sterilizing comprises heating the roofing shingle waste core at or to a temperature of 150° F. to 1000° F. for a duration of 1 second to 24 hours to sterilize the roofing shingle waste core. In some embodiments, the temperature is a temperature of 150° F. to 950° F. In some embodiments, the temperature is a temperature of 150° F. to 900° F. In some embodiments, the temperature is a temperature of 150° F. to 850° F. In some embodiments, the temperature is a temperature of 150° F. to 800° F. In some embodiments, the temperature is a temperature of 150° F. to 750° F. In some embodiments, the temperature is a temperature of 150° F. to 700° F. In some embodiments, the temperature is a temperature of 150° F. to 650° F. In some embodiments, the temperature is a temperature of 150° F. to 600° F. In some embodiments, the temperature is a temperature of 150° F. to 550° F. In some embodiments, the temperature is a temperature of 150° F. to 500° F. In some embodiments, the temperature is a temperature of 150° F. to 450° F. In some embodiments, the temperature is a temperature of 150° F. to 400° F. In some embodiments, the temperature is a temperature of 150° F. to 350° F. In some embodiments, the temperature is a temperature of 150° F. to 300° F. In some embodiments, the temperature is a temperature of 150° F. to 250° F. In some embodiments, the temperature is a temperature of 150° F. to 200° F.

In some embodiments, the temperature is a temperature of 200° F. to 1000° F. In some embodiments, the temperature is a temperature of 250° F. to 1000° F. In some embodiments, the temperature is a temperature of 300° F. to 1000° F. In some embodiments, the temperature is a temperature of 350° F. to 1000° F. In some embodiments, the temperature is a temperature of 400° F. to 1000° F. In some embodiments, the temperature is a temperature of 450° F. to 1000° F. In some embodiments, the temperature is a temperature of 500° F. to 1000° F. In some embodiments, the temperature is a temperature of 550° F. to 1000° F. In some embodiments, the temperature is a temperature of 600° F. to 1000° F. In some embodiments, the temperature is a temperature of 650° F. to 1000° F. In some embodiments, the temperature is a temperature of 700° F. to 1000° F. In some embodiments, the temperature is a temperature of 750° F. to 1000° F. In some embodiments, the temperature is a temperature of 800° F. to 1000° F. In some embodiments, the temperature is a temperature of 850° F. to 1000° F. In some embodiments, the temperature is a temperature of 900° F. to 1000° F. In some embodiments, the temperature is a temperature of 950° F. to 1000° F. In some embodiments, the temperature is a temperature of 200° F. to 600° F. In some embodiments, the temperature is a temperature of 300° F. to 600° F. In some embodiments, the temperature is a temperature of 400° F. to 600° F. In some embodiments, the temperature is a temperature of 500° F. to 600° F. In some embodiments, the temperature is a temperature of 200° F. to 500° F. In some embodiments, the temperature is a temperature of 200° F. to 400° F. In some embodiments, the temperature is a temperature of 200° F. to 300° F. In some embodiments, the temperature is a temperature of 250° F. to 550° F. In some embodiments, the temperature is a temperature of 300° F. to 550° F. In some embodiments, the temperature is a temperature of 350° F. to 550° F. In some embodiments, the temperature is a temperature of 400° F. to 550° F. In some embodiments, the temperature is a temperature of 450° F. to 550° F. In some embodiments, the temperature is a temperature of 500° F. to 550° F. In some embodiments, the temperature is a temperature of 250° F. to 500° F. In some embodiments, the temperature is a temperature of 250° F. to 450° F. In some embodiments, the temperature is a temperature of 250° F. to 400° F. In some embodiments, the temperature is a temperature of 250° F. to 350° F. In some embodiments, the temperature is a temperature of 250° F. to 300° F.

In some embodiments, the sterilizing comprises heating the roofing shingle waste core from a first temperature to a second temperature and holding the roofing shingle waste core at the second temperature for a duration. In some embodiments, the first temperature is a temperature of 25° F. to 1000° F. In some embodiments, the first temperature is a temperature of 25° F. to 950° F. In some embodiments, the first temperature is a temperature of 25° F. to 900° F. In some embodiments, the first temperature is a temperature of 25° F. to 850° F. In some embodiments, the first temperature is a temperature of 25° F. to 800° F. In some embodiments, the first temperature is a temperature of 25° F. to 750° F. In some embodiments, the first temperature is a temperature of 25° F. to 700° F. In some embodiments, the first temperature is a temperature of 25° F. to 650° F. In some embodiments, the first temperature is a temperature of 25° F. to 600° F. In some embodiments, the first temperature is a temperature of 25° F. to 550° F. In some embodiments, the first temperature is a temperature of 25° F. to 500° F. In some embodiments, the first temperature is a temperature of 25° F. to 450° F. In some embodiments, the first temperature is a temperature of 25° F.

to 400° F. In some embodiments, the first temperature is a temperature of 25° F. to 350° F. In some embodiments, the first temperature is a temperature of 25° F. to 300° F. In some embodiments, the first temperature is a temperature of 25° F. to 250° F. In some embodiments, the first temperature is a temperature of 25° F. to 200° F. In some embodiments, the first temperature is a temperature of 25° F. to 150° F. In some embodiments, the first temperature is a temperature of 25° F. to 100° F.

In some embodiments, the first temperature is a temperature of 50° F. to 1000° F. In some embodiments, the first temperature is a temperature of 100° F. to 1000° F. In some embodiments, the first temperature is a temperature of 150° F. to 1000° F. In some embodiments, the first temperature is a temperature of 200° F. to 1000° F. In some embodiments, the first temperature is a temperature of 250° F. to 1000° F. In some embodiments, the first temperature is a temperature of 300° F. to 1000° F. In some embodiments, the first temperature is a temperature of 350° F. to 1000° F. In some embodiments, the first temperature is a temperature of 400° F. to 1000° F. In some embodiments, the first temperature is a temperature of 450° F. to 1000° F. In some embodiments, the first temperature is a temperature of 500° F. to 1000° F. In some embodiments, the first temperature is a temperature of 550° F. to 1000° F. In some embodiments, the first temperature is a temperature of 600° F. to 1000° F. In some embodiments, the first temperature is a temperature of 650° F. to 1000° F. In some embodiments, the first temperature is a temperature of 700° F. to 1000° F. In some embodiments, the first temperature is a temperature of 750° F. to 1000° F. In some embodiments, the first temperature is a temperature of 800° F. to 1000° F. In some embodiments, the first temperature is a temperature of 850° F. to 1000° F. In some embodiments, the first temperature is a temperature of 900° F. to 1000° F. In some embodiments, the first temperature is a temperature of 950° F. to 1000° F.

In some embodiments, the sterilizing comprises heating the roofing shingle waste core from a second temperature to a second temperature and holding the roofing shingle waste core at the second temperature for a duration. In some embodiments, the second temperature is a temperature of 25° F. to 1000° F. In some embodiments, the second temperature is a temperature of 25° F. to 950° F. In some embodiments, the second temperature is a temperature of 25° F. to 900° F. In some embodiments, the second temperature is a temperature of 25° F. to 850° F. In some embodiments, the second temperature is a temperature of 25° F. to 800° F. In some embodiments, the second temperature is a temperature of 25° F. to 750° F. In some embodiments, the second temperature is a temperature of 25° F. to 700° F. In some embodiments, the second temperature is a temperature of 25° F. to 650° F. In some embodiments, the second temperature is a temperature of 25° F. to 600° F. In some embodiments, the second temperature is a temperature of 25° F. to 550° F. In some embodiments, the second temperature is a temperature of 25° F. to 500° F. In some embodiments, the second temperature is a temperature of 25° F. to 450° F. In some embodiments, the second temperature is a temperature of 25° F. to 400° F. In some embodiments, the second temperature is a temperature of 25° F. to 350° F. In some embodiments, the second temperature is a temperature of 25° F. to 300° F. In some embodiments, the second temperature is a temperature of 25° F. to 250° F. In some embodiments, the second temperature is a temperature of 25° F. to 200° F. In some embodiments, the second temperature is a temperature of 25° F. to 150° F. In some embodiments, the second temperature is a temperature of 25° F. to 100° F.

In some embodiments, the second temperature is a temperature of 50° F. to 1000° F. In some embodiments, the second temperature is a temperature of 100° F. to 1000° F. In some embodiments, the second temperature is a temperature of 150° F. to 1000° F. In some embodiments, the second temperature is a temperature of 200° F. to 1000° F. In some embodiments, the second temperature is a temperature of 250° F. to 1000° F. In some embodiments, the second temperature is a temperature of 300° F. to 1000° F. In some embodiments, the second temperature is a temperature of 350° F. to 1000° F. In some embodiments, the second temperature is a temperature of 400° F. to 1000° F. In some embodiments, the second temperature is a temperature of 450° F. to 1000° F. In some embodiments, the second temperature is a temperature of 500° F. to 1000° F. In some embodiments, the second temperature is a temperature of 550° F. to 1000° F. In some embodiments, the second temperature is a temperature of 600° F. to 1000° F. In some embodiments, the second temperature is a temperature of 650° F. to 1000° F. In some embodiments, the second temperature is a temperature of 700° F. to 1000° F. In some embodiments, the second temperature is a temperature of 750° F. to 1000° F. In some embodiments, the second temperature is a temperature of 800° F. to 1000° F. In some embodiments, the second temperature is a temperature of 850° F. to 1000° F. In some embodiments, the second temperature is a temperature of 900° F. to 1000° F. In some embodiments, the second temperature is a temperature of 950° F. to 1000° F. In some embodiments, the second temperature is a temperature of 250° F. to 550° F. In some embodiments, the second temperature is a temperature of 300° F. to 550° F. In some embodiments, the second temperature is a temperature of 350° F. to 550° F. In some embodiments, the second temperature is a temperature of 400° F. to 550° F. In some embodiments, the second temperature is a temperature of 450° F. to 550° F. In some embodiments, the second temperature is a temperature of 500° F. to 550° F. In some embodiments, the second temperature is a temperature of 250° F. to 500° F. In some embodiments, the second temperature is a temperature of 250° F. to 450° F. In some embodiments, the second temperature is a temperature of 250° F. to 400° F. In some embodiments, the second temperature is a temperature of 250° F. to 350° F. In some embodiments, the second temperature is a temperature of 250° F. to 300° F.

In some embodiments, the duration is 1 second to 24 hours. In some embodiments, the duration is 10 seconds to 24 hours. In some embodiments, the duration is 30 seconds to 24 hours. In some embodiments, the duration is 45 seconds to 24 hours. In some embodiments, the duration is 1 minute to 24 hours. In some embodiments, the duration is 15 minutes to 24 hours. In some embodiments, the duration is 30 minutes to 24 hours. In some embodiments, the duration is 45 minutes to 24 hours. In some embodiments, the duration is 1 hour to 24 hours. In some embodiments, the duration is 2 hours to 24 hours. In some embodiments, the duration is 3 hours to 24 hours. In some embodiments, the duration is 4 hours to 24 hours. In some embodiments, the duration is hours to 24 hours. In some embodiments, the duration is 5 hours to 24 hours. In some embodiments, the duration is 6 hours to 24 hours. In some embodiments, the duration is hours to 24 hours. In some embodiments, the duration is 7 hours to 24 hours. In some embodiments, the duration is 8 hours to 24 hours. In some embodiments, the duration is hours to 24 hours. In some embodiments, the duration is 9 hours to 24 hours. In some embodiments, the duration is 10 hours to 24 hours. In some embodiments, the duration is hours to 24 hours. In some embodiments, the duration is 11 hours to 24 hours. In some embodiments, the duration is 12 hours to 24 hours. In some embodiments, the duration is hours to 24 hours. In some embodiments, the duration is 13 hours to 24 hours. In some embodiments, the duration is 14 hours to 24 hours. In some embodiments, the duration is hours to 24 hours. In some embodiments, the duration is 15 hours to 24 hours. In some embodiments, the duration is 16 hours to 24 hours. In some embodiments, the duration is hours to 24 hours. In some embodiments, the duration is 17 hours to 24 hours. In some embodiments, the duration is 18 hours to 24 hours. In some embodiments, the duration is hours to 24 hours. In some embodiments, the duration is 19 hours to 24 hours. In some embodiments, the duration is 20 hours to 24 hours. In some embodiments, the duration is 21 hours to 24 hours. In some embodiments, the duration is 22 hours to 24 hours. In some embodiments, the duration is 23 hours to 24 hours.

In some embodiments, the duration is 1 second to 24 hours. In some embodiments, the duration is 1 second to 23 hours. In some embodiments, the duration is 1 second to 22 hours. In some embodiments, the duration is 1 second to 21 hours. In some embodiments, the duration is 1 second to 20 hours. In some embodiments, the duration is 1 second to 19 hours. In some embodiments, the duration is 1 second to 18 hours. In some embodiments, the duration is 1 second to 17 hours. In some embodiments, the duration is 1 second to 16 hours. In some embodiments, the duration is 1 second to 15 hours. In some embodiments, the duration is 1 second to 14 hours. In some embodiments, the duration is 1 second to 13 hours. In some embodiments, the duration is 1 second to 12 hours. In some embodiments, the duration is 1 second to 11 hours. In some embodiments, the duration is 1 second to 10 hours. In some embodiments, the duration is 1 second to 9 hours. In some embodiments, the duration is 1 second to 8 hours. In some embodiments, the duration is 1 second to 7 hours. In some embodiments, the duration is 1 second to 6 hours. In some embodiments, the duration is 1 second to 5 hours. In some embodiments, the duration is 1 second to 4 hours. In some embodiments, the duration is 1 second to 3 hours. In some embodiments, the duration is 1 second to 2 hours. In some embodiments, the duration is 1 second to 1 hour. In some embodiments, the duration is 1 second to 45 minutes. In some embodiments, the duration is 1 second to 30 minutes. In some embodiments, the duration is 1 second to 15 minutes. In some embodiments, the duration is 1 second to 1 minute. In some embodiments, the duration is 1 second to 30 seconds.

In some embodiments, the sterilizing comprises drying the roofing shingle waste core. In some embodiments, the drying comprises drying at a temperature of 10° F. to 1000° F. In some embodiments, the drying comprises drying at a temperature of 10° F. to 950° F. In some embodiments, the drying comprises drying at a temperature of 10° F. to 900° F. In some embodiments, the drying comprises drying at a temperature of 10° F. to 850° F. In some embodiments, the drying comprises drying at a temperature of 10° F. to 800° F. In some embodiments, the drying comprises drying at a temperature of 10° F. to 750° F. In some embodiments, the drying comprises drying at a temperature of 10° F. to 700° F. In some embodiments, the drying comprises drying at a temperature of 10° F. to 650° F. In some embodiments, the drying comprises drying at a temperature of 10° F. to 600° F. In some embodiments, the drying comprises drying at a temperature of 10° F. to 550° F. In some embodiments, the drying comprises drying at a temperature of 10° F. to 500° F. In some embodiments, the drying comprises drying at a temperature of 10° F. to 450° F. In some embodiments, the drying comprises drying at a temperature of 10° F. to 400° F. In some embodiments, the drying comprises drying at a temperature of 10° F. to 350° F. In some embodiments, the drying comprises drying at a temperature of 10° F. to 300° F. In some embodiments, the drying comprises drying at a temperature of 10° F. to 250° F. In some embodiments, the drying comprises drying at a temperature of 10° F. to 200° F. In some embodiments, the drying comprises drying at a temperature of 10° F. to 150° F. In some embodiments, the drying comprises drying at a temperature of 10° F. to 100° F. In some embodiments, the drying comprises drying at a temperature of 10° F. to 50° F.

In some embodiments, the drying comprises drying at a temperature of 50° F. to 1000° F. In some embodiments, the drying comprises drying at a temperature of 100° F. to 1000° F. In some embodiments, the drying comprises drying at a temperature of 150° F. to 1000° F. In some embodiments, the drying comprises drying at a temperature of 200° F. to 1000° F. In some embodiments, the drying comprises drying at a temperature of 250° F. to 1000° F. In some embodiments, the drying comprises drying at a temperature of 300° F. to 1000° F. In some embodiments, the drying comprises drying at a temperature of 350° F. to 1000° F. In some embodiments, the drying comprises drying at a temperature of 400° F. to 1000° F. In some embodiments, the drying comprises drying at a temperature of 450° F. to 1000° F. In some embodiments, the drying comprises drying at a temperature of 500° F. to 1000° F. In some embodiments, the drying comprises drying at a temperature of 550° F. to 1000° F. In some embodiments, the drying comprises drying at a temperature of 600° F. to 1000° F. In some embodiments, the drying comprises drying at a temperature of 650° F. to 1000° F. In some embodiments, the drying comprises drying at a temperature of 700° F. to 1000° F. In some embodiments, the drying comprises drying at a temperature of 750° F. to 1000° F. In some embodiments, the drying comprises drying at a temperature of 800° F. to 1000° F. In some embodiments, the drying comprises drying at a temperature of 850° F. to 1000° F. In some embodiments, the drying comprises drying at a temperature of 900° F. to 1000° F. In some embodiments, the drying comprises drying at a temperature of 950° F. to 1000° F.

In some embodiments, the drying is performed for a duration. In some embodiments, the duration is 1 second to 24 hours. In some embodiments, the duration is 10 seconds to 24 hours. In some embodiments, the duration is 30 seconds to 24 hours. In some embodiments, the duration is 45 seconds to 24 hours. In some embodiments, the duration is 1 minute to 24 hours. In some embodiments, the duration is 15 minutes to 24 hours. In some embodiments, the duration is 30 minutes to 24 hours. In some embodiments, the duration is 45 minutes to 24 hours. In some embodiments, the duration is 1 hour to 24 hours. In some embodiments, the duration is 2 hours to 24 hours. In some embodiments, the duration is 3 hours to 24 hours. In some embodiments, the duration is 4 hours to 24 hours. In some embodiments, the duration is hours to 24 hours. In some embodiments, the duration is 5 hours to 24 hours. In some embodiments, the duration is 6 hours to 24 hours. In some embodiments, the duration is hours to 24 hours. In some embodiments, the duration is 7 hours to 24 hours. In some embodiments, the duration is 8 hours to 24 hours. In some embodiments, the duration is hours to 24 hours. In some embodiments, the duration is 9 hours to 24 hours. In some embodiments, the duration is 10 hours to 24 hours. In some embodiments, the duration is hours to 24 hours. In some embodiments, the duration is 11 hours to 24 hours. In some embodiments, the duration is 12 hours to 24 hours. In some embodiments, the duration is hours to 24 hours. In some embodiments, the duration is 13 hours to 24 hours. In some embodiments, the duration is 14 hours to 24 hours. In some embodiments, the duration is hours to 24 hours. In some embodiments, the duration is 15 hours to 24 hours. In some embodiments, the duration is 16 hours to 24 hours. In some embodiments, the duration is hours to 24 hours. In some embodiments, the duration is 17 hours to 24 hours. In some embodiments, the duration is 18 hours to 24 hours. In some embodiments, the duration is hours to 24 hours. In some embodiments, the duration is 19 hours to 24 hours. In some embodiments, the duration is 20 hours to 24 hours. In some embodiments, the duration is 21 hours to 24 hours. In some embodiments, the duration is 22 hours to 24 hours. In some embodiments, the duration is 23 hours to 24 hours.

In some embodiments, the duration is 1 second to 24 hours. In some embodiments, the duration is 1 second to 23 hours. In some embodiments, the duration is 1 second to 22 hours. In some embodiments, the duration is 1 second to 21 hours. In some embodiments, the duration is 1 second to 20 hours. In some embodiments, the duration is 1 second to 19 hours. In some embodiments, the duration is 1 second to 18 hours. In some embodiments, the duration is 1 second to 17 hours. In some embodiments, the duration is 1 second to 16 hours. In some embodiments, the duration is 1 second to 15 hours. In some embodiments, the duration is 1 second to 14 hours. In some embodiments, the duration is 1 second to 13 hours. In some embodiments, the duration is 1 second to 12 hours. In some embodiments, the duration is 1 second to 11 hours. In some embodiments, the duration is 1 second to 10 hours. In some embodiments, the duration is 1 second to 9 hours. In some embodiments, the duration is 1 second to 8 hours. In some embodiments, the duration is 1 second to 7 hours. In some embodiments, the duration is 1 second to 6 hours. In some embodiments, the duration is 1 second to 5 hours. In some embodiments, the duration is 1 second to 4 hours. In some embodiments, the duration is 1 second to 3 hours. In some embodiments, the duration is 1 second to 2 hours. In some embodiments, the duration is 1 second to 1 hour. In some embodiments, the duration is 1 second to 45 minutes. In some embodiments, the duration is 1 second to 30 minutes. In some embodiments, the duration is 1 second to 15 minutes. In some embodiments, the duration is 1 second to 1 minute. In some embodiments, the duration is 1 second to 30 seconds.

In some embodiments, the sterilizing agent comprises at least one of an acid, a base, an organic compound, an inorganic compound, or any combination thereof. In some embodiments, the acid comprises at least one of an organic acid, an inorganic acid, or any combination thereof. In some embodiments, the acid comprises at least one of citric acid, acetic acid, propionic acid, oxalic acid, hydrochloric acid, nitric acid, sulfuric acid, phosphoric acid, formic acid, acetic acid, succinic acid, fumaric acid, glycolic acid, lactic acid, malic acid, tartaric acid, ascorbic acid, maleic acid, hydroxymaleic acid, pyruvic acid, benzoic acid, gluconic acid, p-hydroxybenzoic acid, embonic acid, methanesulfonic acid, ethanesulfonic acid, hydroxyethanesulfonic acid, halogenbenzenesulfonic acid, toluenesulfonic acid, naphthalenesulfonic acid, perhydroxic acid, or any combination thereof. In some embodiments, the acid comprises 1M citric acid. In some embodiments, the acid comprises hydrogen peroxide (e.g., 30% to 40% hydrogen peroxide).

In some embodiments, the base comprises at least one of an organic base, an inorganic base, or any combination thereof. In some embodiments, the base comprises at least one of a carbonate, a bicarbonate, or a hydroxide of an ammonium, an alkali metal, or an alkaline earth metal, an alkoxide, an alkyl amide, an aryl amine, an alkyl amine, or any combination thereof. In some embodiments, the base comprises at least one of sodium hydroxide, potassium hydroxide, ammonium hydroxide, potassium carbonate, or any combination thereof. In some embodiments, the base comprises 1M NaOH.

In some embodiments, the sterilizing agent comprises at least one of alcohols, aldehydes, halogenated compounds, phenolic compounds, metallic salts, hypochlorites, or any combination thereof. For example, in some embodiments, the sterilizing agent comprises ethanol (e.g., 70% ethanol). In some embodiments, the sterilizing agent comprises sodium hypochlorite. In some embodiments, the sterilizing agent comprises calcium hypochlorite. In some embodiments, the sterilizing agent comprises mercuric (II) chloride. In some embodiments, the sterilizing agent comprises formaldehyde. In some embodiments, the sterilizing agent comprises ethylene oxide. In some embodiments, the sterilizing agent comprises isopropyl.

At step 308, in some embodiments, the method 300 for forming a roofing granule comprises modifying the roofing shingle waste core. In some embodiments, a surface of the roofing shingle waste core is modified. In some embodiments, the modifying removes, degrades, or renders inert a surface of the roofing shingle waste core. In some embodiments, the modifying comprises applying a plasma treatment to the surface of the roofing shingle waste core. In some embodiments, the plasma treatment results in a hydrophilic surface of the roofing shingle waste core. In some embodiments, the modifying comprises applying a heat treatment to the surface of the roofing shingle waste core. In some embodiments, the modifying comprises mechanically mixing the roofing shingle waste core. In some embodiments, the modifying comprises removing a substance by abrasion. In some embodiments, the abrasion is performed by at least one of mechanical scrubbing, contacting with an abrasive material (e.g., rock fines), or any combination thereof. In some embodiments, the modifying comprises a chemical treatment. In some embodiments, the modifying comprises dissolving a residue using a solvent. In some embodiments, the solvent comprises at least one of n-propyl bromide, toluene, hexane, mineral spirit, or any combination thereof. In some embodiments, the modifying comprises contacting with an imine. In some embodiments, the modifying comprises contacting with at least one of an aqueous detergent, a degreaser, or other cleaner (e.g., trisodium phosphate).

At step 310, in some embodiments, the method 300 for forming a roofing granule comprises applying the colored coating composition to the roofing shingle waste core. In some embodiments, the colored coating composition is applied to a surface of the roofing shingle wastes core. In some embodiments, the applying comprises mixing the colored coating composition with the roofing shingle waste core. In some embodiments, the applying comprises coating the roofing shingle waste core with the colored coating composition. In some embodiments, the applying comprises spraying the roofing shingle waste core with the colored coating composition. In some embodiments, the applying comprises immersing the roofing shingle waste core in the colored coating composition. In some embodiments, the applying comprises contacting the roofing shingle waste core with the colored coating composition. In some embodiments, the applying is performed using a rotary tumbler, a spray coater, a fluidized bed, a rotary drum, a coater, or other similar equipment.

At step 312, in some embodiments, the method 300 for forming a roofing granule comprises curing the colored coating composition, so as to form a colored coating on a roofing granule. In some embodiments, the colored coating composition is cured on a surface of the roofing shingle waste core. In some embodiments, the curing comprises contacting the colored coating composition with a metal salt. In some embodiments, the curing comprises contacting the colored coating composition with an acid. In some embodiments, the curing comprises contacting the colored coating composition with at least one of a Lewis acid, $AlCl_3$, $MgCl_2$, or any combination thereof. In some embodiments, the curing comprises exposing the colored coating composition to carbon dioxide. In some embodiments, the curing comprises exposing the colored coating composition to carbon dioxide in a presence of moisture. In some embodiments, the curing comprises exposing the colored coating composition to atmospheric carbon. In some embodiments, the curing comprises exposing the colored coating composition to an off gas. In some embodiments, the curing comprises exposing the colored coating composition to microwaves. In some embodiments, the curing comprises exposing the colored coating composition to electromagnetic radiation (e.g., ultraviolet light, infrared light, etc.). In some embodiments, the curing comprises exposing the colored coating composition to a temperature of 200° F. or less.

In some embodiments, the colored composition is cured at a temperature of 200° F. or less. In some embodiments, the colored composition is cured at a temperature of 50° F. to 200° F. In some embodiments, the colored composition is cured at a temperature of 60° F. to 200° F. In some embodiments, the colored composition is cured at a temperature of 70° F. to 200° F. In some embodiments, the colored composition is cured at a temperature of 80° F. to 200° F. In some embodiments, the colored composition is cured at a temperature of 90° F. to 200° F. In some embodiments, the colored composition is cured at a temperature of 100° F. to 200° F. In some embodiments, the colored composition is cured at a temperature of 110° F. to 200° F. In some embodiments, the colored composition is cured at a temperature of 120° F. to 200° F. In some embodiments, the colored composition is cured at a temperature of 130° F. to 200° F. In some embodiments, the colored composition is cured at a temperature of 140° F. to 200° F. In some embodiments, the colored composition is cured at a temperature of 150° F. to 200° F. In some embodiments, the colored composition is cured at a temperature of 160° F. to 200° F. In some embodiments, the colored composition is cured at a temperature of 170° F. to 200° F. In some embodiments, the colored composition is cured at a temperature of 180° F. to 200° F. In some embodiments, the colored composition is cured at a temperature of 190° F. to 200° F.

In some embodiments, the colored composition is cured at a temperature of 50° F. to 190° F. In some embodiments, the colored composition is cured at a temperature of 50° F. to 180° F. In some embodiments, the colored composition is cured at a temperature of 50° F. to 170° F. In some embodiments, the colored composition is cured at a temperature of 50° F. to 160° F. In some embodiments, the colored composition is cured at a temperature of 50° F. to 150° F. In some embodiments, the colored composition is cured at a temperature of 50° F. to 140° F. In some embodiments, the colored composition is cured at a temperature of 50° F. to 130° F. In some embodiments, the colored composition is cured at a temperature of 50° F. to 120° F. In some embodiments, the colored composition is cured at a temperature of 50° F. to 110° F. In some embodiments, the colored composition is cured at a temperature of 50° F. to 100° F. In some embodiments, the colored composition is cured at a temperature of 50° F. to 90° F. In some embodiments, the colored composition is cured at a temperature of 50° F. to 80° F. In some embodiments, the colored composition is cured at a temperature of 50° F. to 70° F. In some embodiments, the colored composition is cured at a temperature of 50° F. to 60° F.

In some embodiments, the method 300 for forming a roofing granule does not comprise a sintering step. As used herein, the term "sintering" refers to any process in which a substance is heated to an elevated temperature, such as, for example and without limitation, a temperature of 500° F. or greater. In some embodiments, sintering refers to heating a substance to a temperature of 1000° F. to 3000° F. In some embodiments, the term "sintering" is also referred to or known as "firing" and thus both terms may be used interchangeably herein. In some embodiments, sintering causes the substance being heated to undergo calcination and densification. In some embodiments, sintering causes the resulting substance to have a composition that is different than the composition of the substance prior to being sintered. In some embodiments, the sintering causes the resulting substance to have a density that is different from the density of the substance prior to being sintered.

In some embodiments, the method 300 for forming a roofing granule does not comprise a sintering step. In some embodiments, the method 300 for forming a roofing granule does not comprise a step of sintering the granule core. In some embodiments, the method 300 for forming a roofing granule does not comprise a step of sintering the roofing granule. In some embodiments, the method 300 for forming a roofing granule does not comprise a step of sintering the colored coating composition. In some embodiments, the method 300 for forming a roofing granule does not comprise a step of sintering the colored coating.

Figure 4:
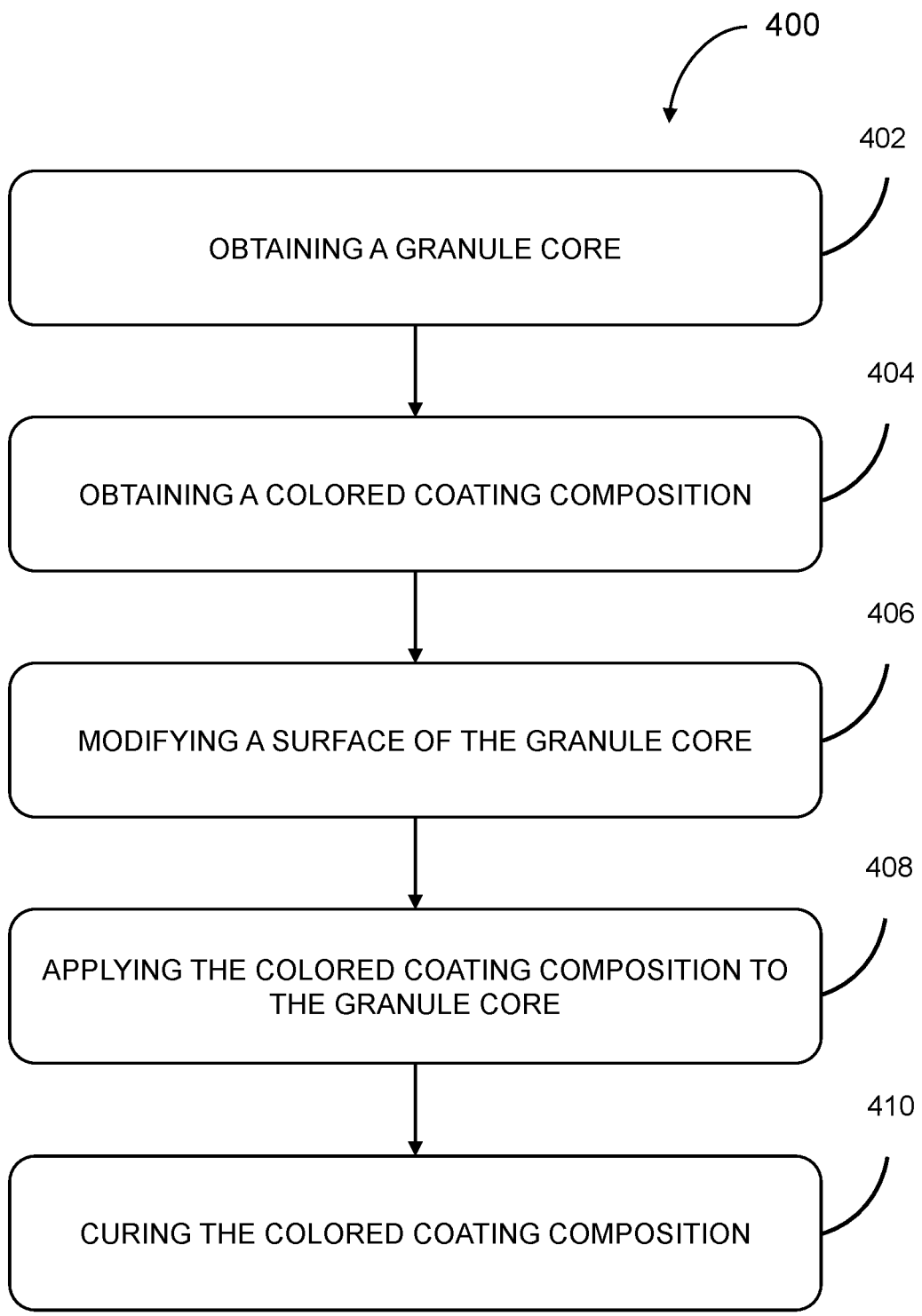
FIG. 4 is a flowchart of a method for forming a roofing granule, according to some embodiments.

FIG. 4 is a flowchart of a method 400 for forming a roofing granule, according to some embodiments. As shown in FIG. 4, in some embodiments, the method 400 for forming a roofing granule comprises one or more of the following steps: a step 402 of obtaining a granule core; a step 404 of obtaining a colored coating composition; a step 406 of modifying a surface of the granule core; a step 408 of applying the colored coating composition to the granule core; and a step 410 of curing the colored coating composition. It will be appreciated that any one or more of the foregoing steps may be performed and/or not performed, without departing from the scope of this disclosure. For example, in some embodiments, the method 400 does not comprise the step 406. It will be appreciated that any of colored coating compositions, colored coatings, and other components disclosed herein may be employed herein without departing from this disclosure.

At step 402, in some embodiments, the method comprises obtaining the granule core. As used herein, the term "granule core" refers to any form of particulate matter that is not reclaimed or recovered from asphalt shingle waste. In some embodiments, the granule core comprises a mineral core. In some embodiments, the granule core comprises an inert mineral core. In some embodiments, the granule core comprises a natural rock. In some embodiments, the granule core comprises crushed minerals. For example, in some embodiments, the granule core is obtained by crushing minerals. In some embodiments, the granule core is obtained by crushing minerals and screening the crushed minerals by size. In some embodiments, the granule core comprises crushed mineral(s). In some embodiments, the granule core comprises crushed mineral aggregate. In some embodiments, the granule core comprises at least one of greenstone, rhyolite, andesite, basalt, metabasalt, nepheline syenite, ceramic grog, talc, slag, silica sand, greystone, trap rock, granite, siliceous sand, porphyry, marble, syenite, diabase, quartz, slate, sandstone, marine shells, or any combination thereof.

In some embodiments, the granule core comprises at least one of a mineral material, an inert material, a synthetic material, a naturally-occurring material, a rock material, an inorganic material, or any combination thereof. In some embodiments, the granule core comprises at least one of a stone dust, a crushed slate, a slate particle, a shale particle, a granule chip, a mica particle, a metal flake, a zeolite particle, a silica particle, a clay particle, or any combination thereof. In some embodiments, the granule core comprises at least one of a stone dust, a slate, a shale, a metal, a mica, a silica, a clay, a calcium hydroxide, an aluminosilicate, an alkali silicate, an alkali aluminosilicate clay, a sodium bicarbonate, a sodium carbonate, a sodium silicate, a feldspar, a nepheline syenite, a cristobalite, a kaolin, a bauxite, a ball clay, a montmorillonite, a talc, a slag, a granite, a silica sand, a sand, a greenstone, a metal oxide, a metal salt, an andesite, a porphyry, a marble, a syenite, a zeolite, a rhyolite, a diabase, a greystone, a quartz, a trap rock, a basalt, a marine shell, a crushed brick, a concrete, a porcelain, a fire clay, or any combination thereof.

In some embodiments, the granule core has an average particle size of 0.1 mm to 7 mm. In some embodiments, the granule core has an average particle size of 0.1 mm to 6.9 mm. In some embodiments, the granule core has an average particle size of 0.1 mm to 6.8 mm. In some embodiments, the granule core has an average particle size of 0.1 mm to 6.7 mm. In some embodiments, the granule core has an average particle size of 0.1 mm to 6.6 mm. In some embodiments, the granule core has an average particle size of 0.1 mm to 6.5 mm. In some embodiments, the granule core has an average particle size of 0.1 mm to 6.4 mm. In some embodiments, the granule core has an average particle size of 0.1 mm to 6.3 mm. In some embodiments, the granule core has an average particle size of 0.1 mm to 6.2 mm. In some embodiments, the granule core has an average particle size of 0.1 mm to 6.1 mm.

In some embodiments, the granule core has an average particle size of 0.1 mm to 6 mm. In some embodiments, the granule core has an average particle size of 0.1 mm to 5.9 mm. In some embodiments, the granule core has an average particle size of 0.1 mm to 5.8 mm. In some embodiments, the granule core has an average particle size of 0.1 mm to 5.7 mm. In some embodiments, the granule core has an average particle size of 0.1 mm to 5.6 mm. In some embodiments, the granule core has an average particle size of 0.1 mm to 5.5 mm. In some embodiments, the granule core has an average particle size of 0.1 mm to 5.4 mm. In some embodiments, the granule core has an average particle size of 0.1 mm to 5.3 mm. In some embodiments, the granule core has an average particle size of 0.1 mm to 5.2 mm. In some embodiments, the granule core has an average particle size of 0.1 mm to 5.1 mm.

In some embodiments, the granule core has an average particle size of 0.1 mm to 5 mm. In some embodiments, the granule core has an average particle size of 0.1 mm to 4.9 mm. In some embodiments, the granule core has an average particle size of 0.1 mm to 4.8 mm. In some embodiments, the granule core has an average particle size of 0.1 mm to 4.7 mm. In some embodiments, the granule core has an average particle size of 0.1 mm to 4.6 mm. In some embodiments, the granule core has an average particle size of 0.1 mm to 4.5 mm. In some embodiments, the granule core has an average particle size of 0.1 mm to 4.4 mm. In some embodiments, the granule core has an average particle size of 0.1 mm to 4.3 mm. In some embodiments, the granule core has an average particle size of 0.1 mm to 4.2 mm. In some embodiments, the granule core has an average particle size of 0.1 mm to 4.1 mm.

In some embodiments, the granule core has an average particle size of 0.1 mm to 4 mm. In some embodiments, the granule core has an average particle size of 0.1 mm to 3.9 mm. In some embodiments, the granule core has an average particle size of 0.1 mm to 3.8 mm. In some embodiments, the granule core has an average particle size of 0.1 mm to 3.7 mm. In some embodiments, the granule core has an average particle size of 0.1 mm to 3.6 mm. In some embodiments, the granule core has an average particle size of 0.1 mm to 3.5 mm. In some embodiments, the granule core has an average particle size of 0.1 mm to 3.4 mm. In some embodiments, the granule core has an average particle size of 0.1 mm to 3.3 mm. In some embodiments, the granule core has an average particle size of 0.1 mm to 3.2 mm. In some embodiments, the granule core has an average particle size of 0.1 mm to 3.1 mm.

In some embodiments, the granule core has an average particle size of 0.1 mm to 3 mm. In some embodiments, the granule core has an average particle size of 0.1 mm to 2.9 mm. In some embodiments, the granule core has an average particle size of 0.1 mm to 2.8 mm. In some embodiments, the granule core has an average particle size of 0.1 mm to 2.7 mm. In some embodiments, the granule core has an average particle size of 0.1 mm to 2.6 mm. In some embodiments, the granule core has an average particle size of 0.1 mm to 2.5 mm. In some embodiments, the granule core has an average particle size of 0.1 mm to 2.4 mm. In some embodiments, the granule core has an average particle size of 0.1 mm to 2.3 mm. In some embodiments, the granule core has an average particle size of 0.1 mm to 2.2 mm. In some embodiments, the granule core has an average particle size of 0.1 mm to 2.1 mm.

In some embodiments, the granule core has an average particle size of 0.1 mm to 2 mm. In some embodiments, the granule core has an average particle size of 0.1 mm to 1.9 mm. In some embodiments, the granule core has an average particle size of 0.1 mm to 1.8 mm. In some embodiments, the granule core has an average particle size of 0.1 mm to 1.7 mm. In some embodiments, the granule core has an average particle size of 0.1 mm to 1.6 mm. In some embodiments, the granule core has an average particle size of 0.1 mm to 1.5 mm. In some embodiments, the granule core has an average particle size of 0.1 mm to 1.4 mm. In some embodiments, the granule core has an average particle size of 0.1 mm to 1.3 mm. In some embodiments, the granule core has an average particle size of 0.1 mm to 1.2 mm. In some embodiments, the granule core has an average particle size of 0.1 mm to 1.1 mm.

In some embodiments, the granule core has an average particle size of 0.1 mm to 1 mm. In some embodiments, the granule core has an average particle size of 0.1 mm to 0.9 mm. In some embodiments, the granule core has an average particle size of 0.1 mm to 0.8 mm. In some embodiments, the granule core has an average particle size of 0.1 mm to 0.7 mm. In some embodiments, the granule core has an average particle size of 0.1 mm to 0.6 mm. In some embodiments, the granule core has an average particle size of 0.1 mm to 0.5 mm. In some embodiments, the granule core has an average particle size of 0.1 mm to 0.4 mm. In some embodiments, the granule core has an average particle size of 0.1 mm to 0.3 mm. In some embodiments, the granule core has an average particle size of 0.1 mm to 0.2 mm. In some embodiments, the granule core has an average particle size of 0.2 mm to 3 mm.

In some embodiments, the granule core has an average particle size of 0.2 mm to 7 mm. In some embodiments, the granule core has an average particle size of 0.3 mm to 7 mm. In some embodiments, the granule core has an average particle size of 0.4 mm to 7 mm. In some embodiments, the granule core has an average particle size of 0.5 mm to 7 mm. In some embodiments, the granule core has an average particle size of 0.6 mm to 7 mm. In some embodiments, the granule core has an average particle size of 0.7 mm to 7 mm. In some embodiments, the granule core has an average particle size of 0.8 mm to 7 mm. In some embodiments, the granule core has an average particle size of 0.9 mm to 7 mm.

In some embodiments, the granule core has an average particle size of 1 mm to 7 mm. In some embodiments, the granule core has an average particle size of 1.1 mm to 7 mm. In some embodiments, the granule core has an average particle size of 1.2 mm to 7 mm. In some embodiments, the granule core has an average particle size of 1.3 mm to 7 mm. In some embodiments, the granule core has an average particle size of 1.4 mm to 7 mm. In some embodiments, the granule core has an average particle size of 1.5 mm to 7 mm. In some embodiments, the granule core has an average particle size of 1.6 mm to 7 mm. In some embodiments, the granule core has an average particle size of 1.7 mm to 7 mm. In some embodiments, the granule core has an average particle size of 1.8 mm to 7 mm. In some embodiments, the granule core has an average particle size of 1.9 mm to 7 mm.

In some embodiments, the granule core has an average particle size of 2 mm to 7 mm. In some embodiments, the granule core has an average particle size of 2.1 mm to 7 mm. In some embodiments, the granule core has an average particle size of 2.2 mm to 7 mm. In some embodiments, the granule core has an average particle size of 2.3 mm to 7 mm. In some embodiments, the granule core has an average particle size of 2.4 mm to 7 mm. In some embodiments, the granule core has an average particle size of 2.5 mm to 7 mm. In some embodiments, the granule core has an average particle size of 2.6 mm to 7 mm. In some embodiments, the granule core has an average particle size of 2.7 mm to 7 mm. In some embodiments, the granule core has an average particle size of 2.8 mm to 7 mm. In some embodiments, the granule core has an average particle size of 2.9 mm to 7 mm.

In some embodiments, the granule core has an average particle size of 3 mm to 7 mm. In some embodiments, the granule core has an average particle size of 3.1 mm to 7 mm. In some embodiments, the granule core has an average particle size of 3.2 mm to 7 mm. In some embodiments, the granule core has an average particle size of 3.3 mm to 7 mm. In some embodiments, the granule core has an average particle size of 3.4 mm to 7 mm. In some embodiments, the granule core has an average particle size of 3.5 mm to 7 mm. In some embodiments, the granule core has an average particle size of 3.6 mm to 7 mm. In some embodiments, the granule core has an average particle size of 3.7 mm to 7 mm. In some embodiments, the granule core has an average particle size of 3.8 mm to 7 mm. In some embodiments, the granule core has an average particle size of 3.9 mm to 7 mm.

In some embodiments, the granule core has an average particle size of 4 mm to 7 mm. In some embodiments, the granule core has an average particle size of 4.1 mm to 7 mm. In some embodiments, the granule core has an average particle size of 4.2 mm to 7 mm. In some embodiments, the granule core has an average particle size of 4.3 mm to 7 mm. In some embodiments, the granule core has an average particle size of 4.4 mm to 7 mm. In some embodiments, the granule core has an average particle size of 4.5 mm to 7 mm. In some embodiments, the granule core has an average particle size of 4.6 mm to 7 mm. In some embodiments, the granule core has an average particle size of 4.7 mm to 7 mm. In some embodiments, the granule core has an average particle size of 4.8 mm to 7 mm. In some embodiments, the granule core has an average particle size of 4.9 mm to 7 mm.

In some embodiments, the granule core has an average particle size of 5 mm to 7 mm. In some embodiments, the granule core has an average particle size of 5.1 mm to 7 mm. In some embodiments, the granule core has an average particle size of 5.2 mm to 7 mm. In some embodiments, the granule core has an average particle size of 5.3 mm to 7 mm. In some embodiments, the granule core has an average particle size of 5.4 mm to 7 mm. In some embodiments, the granule core has an average particle size of 5.5 mm to 7 mm. In some embodiments, the granule core has an average particle size of 5.6 mm to 7 mm. In some embodiments, the granule core has an average particle size of 5.7 mm to 7 mm. In some embodiments, the granule core has an average particle size of 5.8 mm to 7 mm. In some embodiments, the granule core has an average particle size of 5.9 mm to 7 mm.

In some embodiments, the granule core has an average particle size of 6 mm to 7 mm. In some embodiments, the granule core has an average particle size of 6.1 mm to 7 mm. In some embodiments, the granule core has an average particle size of 6.2 mm to 7 mm. In some embodiments, the granule core has an average particle size of 6.3 mm to 7 mm. In some embodiments, the granule core has an average particle size of 6.4 mm to 7 mm. In some embodiments, the granule core has an average particle size of 6.5 mm to 7 mm. In some embodiments, the granule core has an average particle size of 6.6 mm to 7 mm. In some embodiments, the granule core has an average particle size of 6.7 mm to 7 mm. In some embodiments, the granule core has an average particle size of 6.8 mm to 7 mm. In some embodiments, the granule core has an average particle size of 6.9 mm to 7 mm.

In some embodiments, the granule core has an average pore size of 100 nm to 2500 nm. In some embodiments, the granule core has an average pore size of 200 nm to 2500 nm. In some embodiments, the granule core has an average pore size of 300 nm to 2500 nm. In some embodiments, the granule core has an average pore size of 400 nm to 2500 nm. In some embodiments, the granule core has an average pore size of 500 nm to 2500 nm. In some embodiments, the granule core has an average pore size of 600 nm to 2500 nm. In some embodiments, the granule core has an average pore size of 700 nm to 2500 nm. In some embodiments, the granule core has an average pore size of 800 nm to 2500 nm. In some embodiments, the granule core has an average pore size of 900 nm to 2500 nm. In some embodiments, the granule core has an average pore size of 1000 nm to 2500 nm.

In some embodiments, the granule core has an average pore size of 1100 nm to 2500 nm. In some embodiments, the granule core has an average pore size of 1200 nm to 2500 nm. In some embodiments, the granule core has an average pore size of 1300 nm to 2500 nm. In some embodiments, the granule core has an average pore size of 1400 nm to 2500 nm. In some embodiments, the granule core has an average pore size of 1500 nm to 2500 nm. In some embodiments, the granule core has an average pore size of 1600 nm to 2500 nm. In some embodiments, the granule core has an average pore size of 1700 nm to 2500 nm. In some embodiments, the granule core has an average pore size of 1800 nm to 2500 nm. In some embodiments, the granule core has an average pore size of 1900 nm to 2500 nm. In some embodiments, the granule core has an average pore size of 2000 nm to 2500 nm.

In some embodiments, the granule core has an average pore size of 2100 nm to 2500 nm. In some embodiments, the granule core has an average pore size of 2200 nm to 2500 nm. In some embodiments, the granule core has an average pore size of 2300 nm to 2500 nm. In some embodiments, the granule core has an average pore size of 2400 nm to 2500 nm.

In some embodiments, the granule core has an average pore size of 100 nm to 2400 nm. In some embodiments, the granule core has an average pore size of 100 nm to 2300 nm. In some embodiments, the granule core has an average pore size of 100 nm to 2200 nm. In some embodiments, the granule core has an average pore size of 100 nm to 2100 nm. In some embodiments, the granule core has an average pore size of 100 nm to 2000 nm. In some embodiments, the granule core has an average pore size of 100 nm to 1900 nm. In some embodiments, the granule core has an average pore size of 100 nm to 1800 nm. In some embodiments, the granule core has an average pore size of 100 nm to 1700 nm. In some embodiments, the granule core has an average pore size of 100 nm to 1600 nm. In some embodiments, the granule core has an average pore size of 100 nm to 1500 nm. In some embodiments, the granule core has an average pore size of 100 nm to 1400 nm. In some embodiments, the granule core has an average pore size of 100 nm to 1300 nm. In some embodiments, the granule core has an average pore size of 100 nm to 1200 nm. In some embodiments, the granule core has an average pore size of 100 nm to 1100 nm. In some embodiments, the granule core has an average pore size of 100 nm to 1000 nm.

In some embodiments, the granule core has an average pore size of 100 nm to 900 nm. In some embodiments, the granule core has an average pore size of 100 nm to 800 nm. In some embodiments, the granule core has an average pore size of 100 nm to 700 nm. In some embodiments, the granule core has an average pore size of 100 nm to 600 nm. In some embodiments, the granule core has an average pore size of 100 nm to 500 nm. In some embodiments, the granule core has an average pore size of 100 nm to 400 nm. In some embodiments, the granule core has an average pore size of 100 nm to 300 nm. In some embodiments, the granule core has an average pore size of 100 nm to 200 nm.

In some embodiments, the granule core has an average pore volume of 10% to 50% based on a total volume of the granule core. In some embodiments, the granule core has an average pore volume of 15% to 50% based on the total volume of the granule core. In some embodiments, the granule core has an average pore volume of 20% to 50% based on the total volume of the granule core. In some embodiments, the granule core has an average pore volume of 25% to 50% based on the total volume of the granule core. In some embodiments, the granule core has an average pore volume of 30% to 50% based on the total volume of the granule core. In some embodiments, the granule core has an average pore volume of 35% to 50% based on the total volume of the granule core. In some embodiments, the granule core has an average pore volume of 40% to 50% based on the total volume of the granule core. In some embodiments, the granule core has an average pore volume of 45% to 50% based on the total volume of the granule core.

In some embodiments, the granule core has an average pore volume of 10% to 45% based on the total volume of the granule core. In some embodiments, the granule core has an average pore volume of 10% to 40% based on the total volume of the granule core. In some embodiments, the granule core has an average pore volume of 10% to 35% based on the total volume of the granule core. In some embodiments, the granule core has an average pore volume of 10% to 30% based on the total volume of the granule core. In some embodiments, the granule core has an average pore volume of 10% to 25% based on the total volume of the granule core. In some embodiments, the granule core has an average pore volume of 10% to 20% based on the total volume of the granule core. In some embodiments, the granule core has an average pore volume of 10% to 15% based on the total volume of the granule core.

In some embodiments, the granule core has an average pore volume of no more than 10% based on the total volume of the granule core. In some embodiments, the granule core has an average pore volume of no more than 9% based on the total volume of the granule core. In some embodiments, the granule core has an average pore volume of no more than 8% based on the total volume of the granule core. In some embodiments, the granule core has an average pore volume of no more than 7% based on the total volume of the granule core. In some embodiments, the granule core has an average pore volume of no more than 6% based on the total volume of the granule core. In some embodiments, the granule core has an average pore volume of no more than 5% based on the total volume of the granule core. In some embodiments, the granule core has an average pore volume of no more than 4% based on the total volume of the granule core. In some embodiments, the granule core has an average pore volume of no more than 3% based on the total volume of the granule core. In some embodiments, the granule core has an average pore volume of no more than 2% based on the total volume of the granule core. In some embodiments, the granule core has an average pore volume of no more than 1% based on the total volume of the granule core.

In some embodiments, the granule core comprises a base particle.

In some embodiments, the base particle has a surface. In some embodiments, the surface is an outer surface.

In some embodiments, the base particle comprises at least one of a mineral material, an inert material, a synthetic material, a naturally-occurring material, a rock material, an inorganic material, or any combination thereof. In some embodiments, the base particle comprises at least one of a stone dust, a crushed slate, a slate particle, a shale particle, a granule chip, a mica particle, a metal flake, a zeolite particle, a silica particle, a clay particle, or any combination thereof. In some embodiments, the base particle comprises at least one of a stone dust, a slate, a shale, a metal, a mica, a silica, a clay, a calcium hydroxide, an aluminosilicate, an alkali silicate, an alkali aluminosilicate clay, a sodium bicarbonate, a sodium carbonate, a sodium silicate, a feldspar, a nepheline syenite, a cristobalite, a kaolin, a bauxite, a ball clay, a montmorillonite, a talc, a slag, a granite, a silica sand, a sand, a greenstone, a metal oxide, a metal salt, an andesite, a porphyry, a marble, a syenite, a zeolite, a rhyolite, a diabase, a greystone, a quartz, a trap rock, a basalt, a marine shell, a crushed brick, a concrete, a porcelain, a fire clay, or any combination thereof.

In some embodiments, the base particle has an average particle size of 0.001 mm to 7 mm. In some embodiments, the base particle has an average particle size of 0.1 mm to 7 mm. In some embodiments, the base particle has an average particle size of 0.1 mm to 6.9 mm. In some embodiments, the base particle has an average particle size of 0.1 mm to 6.8 mm. In some embodiments, the base particle has an average particle size of 0.1 mm to 6.7 mm. In some embodiments, the base particle has an average particle size of 0.1 mm to 6.6 mm. In some embodiments, the base particle has an average particle size of 0.1 mm to 6.5 mm. In some embodiments, the base particle has an average particle size of 0.1 mm to 6.4 mm. In some embodiments, the base particle has an average particle size of 0.1 mm to 6.3 mm. In some embodiments, the base particle has an average particle size of 0.1 mm to 6.2 mm. In some embodiments, the base particle has an average particle size of 0.1 mm to 6.1 mm.

In some embodiments, the base particle has an average particle size of 0.1 mm to 6 mm. In some embodiments, the base particle has an average particle size of 0.1 mm to 5.9 mm. In some embodiments, the base particle has an average particle size of 0.1 mm to 5.8 mm. In some embodiments, the base particle has an average particle size of 0.1 mm to 5.7 mm. In some embodiments, the base particle has an average particle size of 0.1 mm to 5.6 mm. In some embodiments, the base particle has an average particle size of 0.1 mm to 5.5 mm. In some embodiments, the base particle has an average particle size of 0.1 mm to 5.4 mm. In some embodiments, the base particle has an average particle size of 0.1 mm to 5.3 mm. In some embodiments, the base particle has an average particle size of 0.1 mm to 5.2 mm. In some embodiments, the base particle has an average particle size of 0.1 mm to 5.1 mm.

In some embodiments, the base particle has an average particle size of 0.1 mm to 5 mm. In some embodiments, the base particle has an average particle size of 0.1 mm to 4.9 mm. In some embodiments, the base particle has an average particle size of 0.1 mm to 4.8 mm. In some embodiments, the base particle has an average particle size of 0.1 mm to 4.7 mm. In some embodiments, the base particle has an average particle size of 0.1 mm to 4.6 mm. In some embodiments, the base particle has an average particle size of 0.1 mm to 4.5 mm. In some embodiments, the base particle has an average particle size of 0.1 mm to 4.4 mm. In some embodiments, the base particle has an average particle size of 0.1 mm to 4.3 mm. In some embodiments, the base particle has an average particle size of 0.1 mm to 4.2 mm. In some embodiments, the base particle has an average particle size of 0.1 mm to 4.1 mm.

In some embodiments, the base particle has an average particle size of 0.1 mm to 4 mm. In some embodiments, the base particle has an average particle size of 0.1 mm to 3.9 mm. In some embodiments, the base particle has an average particle size of 0.1 mm to 3.8 mm. In some embodiments, the base particle has an average particle size of 0.1 mm to 3.7 mm. In some embodiments, the base particle has an average particle size of 0.1 mm to 3.6 mm. In some embodiments, the base particle has an average particle size of 0.1 mm to 3.5 mm. In some embodiments, the base particle has an average particle size of 0.1 mm to 3.4 mm. In some embodiments, the base particle has an average particle size of 0.1 mm to 3.3 mm. In some embodiments, the base particle has an average particle size of 0.1 mm to 3.2 mm. In some embodiments, the base particle has an average particle size of 0.1 mm to 3.1 mm.

In some embodiments, the base particle has an average particle size of 0.1 mm to 3 mm. In some embodiments, the base particle has an average particle size of 0.1 mm to 2.9 mm. In some embodiments, the base particle has an average particle size of 0.1 mm to 2.8 mm. In some embodiments, the base particle has an average particle size of 0.1 mm to 2.7 mm. In some embodiments, the base particle has an average particle size of 0.1 mm to 2.6 mm. In some embodiments, the base particle has an average particle size of 0.1 mm to 2.5 mm. In some embodiments, the base particle has an average particle size of 0.1 mm to 2.4 mm. In some embodiments, the base particle has an average particle size of 0.1 mm to 2.3 mm. In some embodiments, the base particle has an average particle size of 0.1 mm to 2.2 mm. In some embodiments, the base particle has an average particle size of 0.1 mm to 2.1 mm.

In some embodiments, the base particle has an average particle size of 0.1 mm to 2 mm. In some embodiments, the base particle has an average particle size of 0.1 mm to 1.9 mm. In some embodiments, the base particle has an average particle size of 0.1 mm to 1.8 mm. In some embodiments, the base particle has an average particle size of 0.1 mm to 1.7 mm. In some embodiments, the base particle has an average particle size of 0.1 mm to 1.6 mm. In some embodiments, the base particle has an average particle size of 0.1 mm to 1.5 mm. In some embodiments, the base particle has an average particle size of 0.1 mm to 1.4 mm. In some embodiments, the base particle has an average particle size of 0.1 mm to 1.3 mm. In some embodiments, the base particle has an average particle size of 0.1 mm to 1.2 mm. In some embodiments, the base particle has an average particle size of 0.1 mm to 1.1 mm.

In some embodiments, the base particle has an average particle size of 0.1 mm to 1 mm. In some embodiments, the base particle has an average particle size of 0.1 mm to 0.9 mm. In some embodiments, the base particle has an average particle size of 0.1 mm to 0.8 mm. In some embodiments, the base particle has an average particle size of 0.1 mm to 0.7 mm. In some embodiments, the base particle has an average particle size of 0.1 mm to 0.6 mm. In some embodiments, the base particle has an average particle size of 0.1 mm to 0.5 mm. In some embodiments, the base particle has an average particle size of 0.1 mm to 0.4 mm. In some embodiments, the base particle has an average particle size of 0.1 mm to 0.3 mm. In some embodiments, the base particle has an average particle size of 0.1 mm to 0.2 mm.

In some embodiments, the base particle has an average particle size of 0.2 mm to 7 mm. In some embodiments, the base particle has an average particle size of 0.3 mm to 7 mm. In some embodiments, the base particle has an average particle size of 0.4 mm to 7 mm. In some embodiments, the base particle has an average particle size of 0.5 mm to 7 mm. In some embodiments, the base particle has an average particle size of 0.6 mm to 7 mm. In some embodiments, the base particle has an average particle size of 0.7 mm to 7 mm. In some embodiments, the base particle has an average particle size of 0.8 mm to 7 mm. In some embodiments, the base particle has an average particle size of 0.9 mm to 7 mm.

In some embodiments, the base particle has an average particle size of 1 mm to 7 mm. In some embodiments, the base particle has an average particle size of 1.1 mm to 7 mm. In some embodiments, the base particle has an average particle size of 1.2 mm to 7 mm. In some embodiments, the base particle has an average particle size of 1.3 mm to 7 mm. In some embodiments, the base particle has an average particle size of 1.4 mm to 7 mm. In some embodiments, the base particle has an average particle size of 1.5 mm to 7 mm. In some embodiments, the base particle has an average particle size of 1.6 mm to 7 mm. In some embodiments, the base particle has an average particle size of 1.7 mm to 7 mm. In some embodiments, the base particle has an average particle size of 1.8 mm to 7 mm. In some embodiments, the base particle has an average particle size of 1.9 mm to 7 mm.

In some embodiments, the base particle has an average particle size of 2 mm to 7 mm. In some embodiments, the base particle has an average particle size of 2.1 mm to 7 mm. In some embodiments, the base particle has an average particle size of 2.2 mm to 7 mm. In some embodiments, the base particle has an average particle size of 2.3 mm to 7 mm. In some embodiments, the base particle has an average particle size of 2.4 mm to 7 mm. In some embodiments, the base particle has an average particle size of 2.5 mm to 7 mm. In some embodiments, the base particle has an average particle size of 2.6 mm to 7 mm. In some embodiments, the base particle has an average particle size of 2.7 mm to 7 mm. In some embodiments, the base particle has an average particle size of 2.8 mm to 7 mm. In some embodiments, the base particle has an average particle size of 2.9 mm to 7 mm.

In some embodiments, the base particle has an average particle size of 3 mm to 7 mm. In some embodiments, the base particle has an average particle size of 3.1 mm to 7 mm. In some embodiments, the base particle has an average particle size of 3.2 mm to 7 mm. In some embodiments, the base particle has an average particle size of 3.3 mm to 7 mm. In some embodiments, the base particle has an average particle size of 3.4 mm to 7 mm. In some embodiments, the base particle has an average particle size of 3.5 mm to 7 mm. In some embodiments, the base particle has an average particle size of 3.6 mm to 7 mm. In some embodiments, the base particle has an average particle size of 3.7 mm to 7 mm. In some embodiments, the base particle has an average particle size of 3.8 mm to 7 mm. In some embodiments, the base particle has an average particle size of 3.9 mm to 7 mm.

In some embodiments, the base particle has an average particle size of 4 mm to 7 mm. In some embodiments, the base particle has an average particle size of 4.1 mm to 7 mm. In some embodiments, the base particle has an average particle size of 4.2 mm to 7 mm. In some embodiments, the base particle has an average particle size of 4.3 mm to 7 mm. In some embodiments, the base particle has an average particle size of 4.4 mm to 7 mm. In some embodiments, the base particle has an average particle size of 4.5 mm to 7 mm. In some embodiments, the base particle has an average particle size of 4.6 mm to 7 mm. In some embodiments, the base particle has an average particle size of 4.7 mm to 7 mm. In some embodiments, the base particle has an average particle size of 4.8 mm to 7 mm. In some embodiments, the base particle has an average particle size of 4.9 mm to 7 mm.

In some embodiments, the base particle has an average particle size of 5 mm to 7 mm. In some embodiments, the base particle has an average particle size of 5.1 mm to 7 mm. In some embodiments, the base particle has an average particle size of 5.2 mm to 7 mm. In some embodiments, the base particle has an average particle size of 5.3 mm to 7 mm. In some embodiments, the base particle has an average particle size of 5.4 mm to 7 mm. In some embodiments, the base particle has an average particle size of 5.5 mm to 7 mm. In some embodiments, the base particle has an average particle size of 5.6 mm to 7 mm. In some embodiments, the base particle has an average particle size of 5.7 mm to 7 mm. In some embodiments, the base particle has an average particle size of 5.8 mm to 7 mm. In some embodiments, the base particle has an average particle size of 5.9 mm to 7 mm.

In some embodiments, the base particle has an average particle size of 6 mm to 7 mm. In some embodiments, the base particle has an average particle size of 6.1 mm to 7 mm. In some embodiments, the base particle has an average particle size of 6.2 mm to 7 mm. In some embodiments, the base particle has an average particle size of 6.3 mm to 7 mm. In some embodiments, the base particle has an average particle size of 6.4 mm to 7 mm. In some embodiments, the base particle has an average particle size of 6.5 mm to 7 mm. In some embodiments, the base particle has an average particle size of 6.6 mm to 7 mm. In some embodiments, the base particle has an average particle size of 6.7 mm to 7 mm. In some embodiments, the base particle has an average particle size of 6.8 mm to 7 mm. In some embodiments, the base particle has an average particle size of 6.9 mm to 7 mm.

In some embodiments, the base particle has an average particle size of less than 0.1 mm. In some embodiments, the base particle has an average particle size of less than 0.09 mm. In some embodiments, the base particle has an average particle size of less than 0.08 mm. In some embodiments, the base particle has an average particle size of less than 0.07 mm. In some embodiments, the base particle has an average particle size of less than 0.06 mm. In some embodiments, the base particle has an average particle size of less than 0.05 mm. In some embodiments, the base particle has an average particle size of less than 0.04 mm. In some embodiments, the base particle has an average particle size of less than 0.03 mm. In some embodiments, the base particle has an average particle size of less than 0.02 mm. In some embodiments, the base particle has an average particle size of less than 0.01 mm. In some embodiments, the base particle has an average particle size of less than 0.1 mm. In some embodiments, the base particle has an average particle size of less than 0.09 mm. In some embodiments, the base particle has an average particle size of less than 0.08 mm. In some embodiments, the base particle has an average particle size of less than 0.07 mm. In some embodiments, the base particle has an average particle size of less than 0.06 mm. In some embodiments, the base particle has an average particle size of less than 0.05 mm. In some embodiments, the base particle has an average particle size of less than 0.04 mm. In some embodiments, the base particle has an average particle size of less than 0.03 mm. In some embodiments, the base particle has an average particle size of less than 0.02 mm. In some embodiments, the base particle has an average particle size of less than 0.01 mm. In some embodiments, the base particle has an average particle size of less than 0.009 mm. In some embodiments, the base particle has an average particle size of less than 0.008 mm. In some embodiments, the base particle has an average particle size of less than 0.007 mm. In some embodiments, the base particle has an average particle size of less than 0.006 mm. In some embodiments, the base particle has an average particle size of less than 0.005 mm. In some embodiments, the base particle has an average particle size of less than 0.004 mm. In some embodiments, the base particle has an average particle size of less than 0.003 mm. In some embodiments, the base particle has an average particle size of less than 0.002 mm.

In some embodiments, the base particle has an average particle size of less than 0.001 mm to 0.1 mm. In some embodiments, the base particle has an average particle size of 0.001 mm to 0.09 mm. In some embodiments, the base particle has an average particle size of 0.001 mm to 0.08 mm. In some embodiments, the base particle has an average particle size of 0.001 mm to 0.07 mm. In some embodiments, the base particle has an average particle size of 0.001 mm to 0.06 mm. In some embodiments, the base particle has an average particle size of 0.001 mm to 0.05 mm. In some embodiments, the base particle has an average particle size of 0.001 mm to 0.04 mm. In some embodiments, the base particle has an average particle size of 0.001 mm to 0.03 mm. In some embodiments, the base particle has an average particle size of 0.001 mm to 0.02 mm. In some embodiments, the base particle has an average particle size of 0.001 mm to 0.01 mm. In some embodiments, the base particle has an average particle size of 0.001 mm to 0.009 mm. In some embodiments, the base particle has an average particle size of 0.001 mm to 0.008 mm. In some embodiments, the base particle has an average particle size of 0.001 mm to 0.007 mm. In some embodiments, the base particle has an average particle size of 0.001 mm to 0.006 mm. In some embodiments, the base particle has an average particle size of 0.001 mm to 0.005 mm. In some embodiments, the base particle has an average particle size of 0.001 mm to 0.004 mm. In some embodiments, the base particle has an average particle size of 0.001 mm to 0.003 mm. In some embodiments, the base particle has an average particle size of 0.001 mm to 0.002 mm.

In some embodiments, the base particle has an average particle size of 0.002 mm to 0.1 mm. In some embodiments, the base particle has an average particle size of 0.003 mm to 0.1 mm. In some embodiments, the base particle has an average particle size of 0.004 mm to 0.1 mm. In some embodiments, the base particle has an average particle size of 0.005 mm to 0.1 mm. In some embodiments, the base particle has an average particle size of 0.006 mm to 0.1 mm. In some embodiments, the base particle has an average particle size of 0.007 mm to 0.1 mm. In some embodiments, the base particle has an average particle size of 0.008 mm to 0.1 mm. In some embodiments, the base particle has an average particle size of 0.009 mm to 0.1 mm. In some embodiments, the base particle has an average particle size of 0.01 mm to 0.1 mm. In some embodiments, the base particle has an average particle size of 0.02 mm to 0.1 mm. In some embodiments, the base particle has an average particle size of 0.03 mm to 0.1 mm. In some embodiments, the base particle has an average particle size of 0.04 mm to 0.1 mm. In some embodiments, the base particle has an average particle size of 0.05 mm to 0.1 mm. In some embodiments, the base particle has an average particle size of 0.06 mm to 0.1 mm. In some embodiments, the base particle has an average particle size of 0.07 mm to 0.1 mm. In some embodiments, the base particle has an average particle size of 0.08 mm to 0.1 mm. In some embodiments, the base particle has an average particle size of 0.09 mm to 0.1 mm.

In some embodiments, the base particle has an average pore size of 50 nm to 2500 nm. In some embodiments, the base particle has an average pore size of 100 nm to 2500 nm. In some embodiments, the base particle has an average pore size of 200 nm to 2500 nm. In some embodiments, the base particle has an average pore size of 300 nm to 2500 nm. In some embodiments, the base particle has an average pore size of 400 nm to 2500 nm. In some embodiments, the base particle has an average pore size of 500 nm to 2500 nm. In some embodiments, the base particle has an average pore size of 600 nm to 2500 nm. In some embodiments, the base particle has an average pore size of 700 nm to 2500 nm. In some embodiments, the base particle has an average pore size of 800 nm to 2500 nm. In some embodiments, the base particle has an average pore size of 900 nm to 2500 nm. In some embodiments, the base particle has an average pore size of 1000 nm to 2500 nm.

In some embodiments, the base particle has an average pore size of 1100 nm to 2500 nm. In some embodiments, the base particle has an average pore size of 1200 nm to 2500 nm. In some embodiments, the base particle has an average pore size of 1300 nm to 2500 nm. In some embodiments, the base particle has an average pore size of 1400 nm to 2500 nm. In some embodiments, the base particle has an average pore size of 1500 nm to 2500 nm. In some embodiments, the base particle has an average pore size of 1600 nm to 2500 nm. In some embodiments, the base particle has an average pore size of 1700 nm to 2500 nm. In some embodiments, the base particle has an average pore size of 1800 nm to 2500 nm. In some embodiments, the base particle has an average pore size of 1900 nm to 2500 nm. In some embodiments, the base particle has an average pore size of 2000 nm to 2500 nm.

In some embodiments, the base particle has an average pore size of 2100 nm to 2500 nm. In some embodiments, the base particle has an average pore size of 2200 nm to 2500 nm. In some embodiments, the base particle has an average pore size of 2300 nm to 2500 nm. In some embodiments, the base particle has an average pore size of 2400 nm to 2500 nm.

In some embodiments, the base particle has an average pore size of 100 nm to 2400 nm. In some embodiments, the base particle has an average pore size of 100 nm to 2300 nm. In some embodiments, the base particle has an average pore size of 100 nm to 2200 nm. In some embodiments, the base particle has an average pore size of 100 nm to 2100 nm. In some embodiments, the base particle has an average pore size of 100 nm to 2000 nm. In some embodiments, the base particle has an average pore size of 100 nm to 1900 nm. In some embodiments, the base particle has an average pore size of 100 nm to 1800 nm. In some embodiments, the base particle has an average pore size of 100 nm to 1700 nm. In some embodiments, the base particle has an average pore size of 100 nm to 1600 nm. In some embodiments, the base particle has an average pore size of 100 nm to 1500 nm. In some embodiments, the base particle has an average pore size of 100 nm to 1400 nm. In some embodiments, the base particle has an average pore size of 100 nm to 1300 nm. In some embodiments, the base particle has an average pore size of 100 nm to 1200 nm. In some embodiments, the base particle has an average pore size of 100 nm to 1100 nm. In some embodiments, the base particle has an average pore size of 100 nm to 1000 nm.

In some embodiments, the base particle has an average pore size of 100 nm to 900 nm. In some embodiments, the base particle has an average pore size of 100 nm to 800 nm. In some embodiments, the base particle has an average pore size of 100 nm to 700 nm. In some embodiments, the base particle has an average pore size of 100 nm to 600 nm. In some embodiments, the base particle has an average pore size of 100 nm to 500 nm. In some embodiments, the base particle has an average pore size of 100 nm to 400 nm. In some embodiments, the base particle has an average pore size of 100 nm to 300 nm. In some embodiments, the base particle has an average pore size of 100 nm to 200 nm.

In some embodiments, the base particle has an average pore size of 50 nm to 2400 nm. In some embodiments, the base particle has an average pore size of 50 nm to 2300 nm. In some embodiments, the base particle has an average pore size of 50 nm to 2200 nm. In some embodiments, the base particle has an average pore size of 50 nm to 2100 nm. In some embodiments, the base particle has an average pore size of 50 nm to 2000 nm. In some embodiments, the base particle has an average pore size of 50 nm to 1900 nm. In some embodiments, the base particle has an average pore size of 50 nm to 1800 nm. In some embodiments, the base particle has an average pore size of 50 nm to 1700 nm. In some embodiments, the base particle has an average pore size of 50 nm to 1600 nm. In some embodiments, the base particle has an average pore size of 50 nm to 1500 nm. In some embodiments, the base particle has an average pore size of 50 nm to 1400 nm. In some embodiments, the base particle has an average pore size of 50 nm to 1300 nm. In some embodiments, the base particle has an average pore size of 50 nm to 1200 nm. In some embodiments, the base particle has an average pore size of 50 nm to 1100 nm. In some embodiments, the base particle has an average pore size of 50 nm to 1000 nm.

In some embodiments, the base particle has an average pore size of 50 nm to 900 nm. In some embodiments, the base particle has an average pore size of 50 nm to 800 nm. In some embodiments, the base particle has an average pore size of 50 nm to 700 nm. In some embodiments, the base particle has an average pore size of 50 nm to 600 nm. In some embodiments, the base particle has an average pore size of 50 nm to 500 nm. In some embodiments, the base particle has an average pore size of 50 nm to 400 nm. In some embodiments, the base particle has an average pore size of 50 nm to 300 nm. In some embodiments, the base particle has an average pore size of 50 nm to 200 nm.

In some embodiments, the base particle has an average pore volume of 10% to 50% based on a total volume of the base particle. In some embodiments, the base particle has an average pore volume of 15% to 50% based on the total volume of the base particle. In some embodiments, the base particle has an average pore volume of 20% to 50% based on the total volume of the base particle. In some embodiments, the base particle has an average pore volume of 25% to 50% based on the total volume of the base particle. In some embodiments, the base particle has an average pore volume of 30% to 50% based on the total volume of the base particle. In some embodiments, the base particle has an average pore volume of 35% to 50% based on the total volume of the base particle. In some embodiments, the base particle has an average pore volume of 40% to 50% based on the total volume of the base particle. In some embodiments, the base particle has an average pore volume of 45% to 50% based on the total volume of the base particle.

In some embodiments, the base particle has an average pore volume of 10% to 45% based on the total volume of the base particle. In some embodiments, the base particle has an average pore volume of 10% to 40% based on the total volume of the base particle. In some embodiments, the base particle has an average pore volume of 10% to 35% based on the total volume of the base particle. In some embodiments, the base particle has an average pore volume of 10% to 30% based on the total volume of the base particle. In some embodiments, the base particle has an average pore volume of 10% to 25% based on the total volume of the base particle. In some embodiments, the base particle has an average pore volume of 10% to 20% based on the total volume of the base particle. In some embodiments, the base particle has an average pore volume of 10% to 15% based on the total volume of the base particle.

In some embodiments, the granule core comprises a binder.

In some embodiments, the binder agglomerates a plurality of base particles, so as to obtain an agglomerate of base particles. In some embodiments, the binder is mixed with at least one base particle. In some embodiments, the binder is mixed with the plurality of base particles. In some embodiments, the granule core comprises a mixture of a binder and a plurality of base particles, wherein the binder agglomerates the plurality of base particles so as to obtain an agglomerate of base particles. In some embodiments, the agglomerate of base particles has a surface. In some embodiments, the surface is an outer surface.

In some embodiments, the binder comprises at least one of a metal silicate binder, a cementitious binder, an organic binder, a polymeric binder (e.g., an acrylic polymer, an acrylic copolymer, or any combination thereof), an inorganic binder, or any combination thereof. In some embodiments, the binder comprises at least one of sodium silicate, gypsum, or any combination thereof. In some embodiments, the granule core does not comprise the binder.

In some embodiments, the granule core has a spherical shape. In some embodiments, the granule core has a cylindrical shape. In some embodiments, the granule core has an elliptical shape. In some embodiments, the granule core has a flat shape (e.g., a plate shape). In some embodiments, the granule core has a flake shape. In some embodiments, the shape of the granule core and resulting roofing granule is dependent upon the method employed for granulation or crushing.

At step 406, in some embodiments, the method 400 for forming a roofing granule comprises modifying a surface of the granule core. In some embodiments, the modifying removes, degrades, or renders inert a surface of the granule core. In some embodiments, the modifying comprises applying a plasma treatment to the surface of the granule core. In some embodiments, the plasma treatment results in a hydrophilic surface of the granule core. In some embodiments, the modifying comprises applying a heat treatment to the surface of the granule core. In some embodiments, the modifying comprises mechanically mixing the granule core. In some embodiments, the modifying comprises removing a substance by abrasion. In some embodiments, the abrasion is performed by at least one of mechanical scrubbing, contacting with an abrasive material (e.g., rock fines), or any combination thereof. In some embodiments, the modifying comprises a chemical treatment. In some embodiments, the modifying comprises dissolving a residue using a solvent. In some embodiments, the solvent comprises at least one of n-propyl bromide, toluene, hexane, mineral spirit, or any combination thereof. In some embodiments, the modifying comprises contacting with an imine. In some embodiments, the modifying comprises contacting with at least one of an aqueous detergent, a degreaser, or other cleaner (e.g., trisodium phosphate).

At step 408, in some embodiments, the method 400 for forming a roofing granule comprises applying the colored coating composition to the granule core. In some embodiments, the colored coating composition is applied to a surface of the granule core. In some embodiments, the applying comprises mixing the colored coating composition with the granule core. In some embodiments, the applying comprises coating the granule core with the colored coating composition. In some embodiments, the applying comprises spraying the granule core with the colored coating composition. In some embodiments, the applying comprises immersing the granule core in the colored coating composition. In some embodiments, the applying comprises contacting the granule core with the colored coating composition. In some embodiments, the applying is performed using a rotary tumbler, a spray coater, a fluidized bed, a rotary drum, a coater, or other similar equipment.

At step 410, in some embodiments, the method 400 for forming a roofing granule comprises curing the colored coating composition, so as to form a colored coating on a roofing granule. In some embodiments, the colored coating composition is cured on the surface of the granule core. In some embodiments, the curing comprises contacting the colored coating composition with a metal salt. In some embodiments, the curing comprises contacting the colored coating composition with an acid. In some embodiments, the curing comprises contacting the colored coating composition with at least one of a Lewis acid, $AlCl_3$, $MgCl_2$, or any combination thereof. In some embodiments, the curing comprises exposing the colored coating composition to carbon dioxide. In some embodiments, the curing comprises exposing the colored coating composition to carbon dioxide in a presence of moisture (e.g., water vapor, liquid water, etc.). In some embodiments, the curing comprises exposing the colored coating composition to atmospheric carbon. In some embodiments, the curing comprises exposing the colored coating composition to an off gas. In some embodiments, the curing comprises exposing the colored coating composition to microwaves. In some embodiments, the curing comprises exposing the colored coating composition to electromagnetic radiation (e.g., ultraviolet light, infrared light, etc.). In some embodiments, the curing comprises exposing the colored coating composition to a temperature of 200° F. or less.

In some embodiments, the colored composition is cured at a temperature of 200° F. or less. In some embodiments, the colored composition is cured at a temperature of 50° F. to 200° F. In some embodiments, the colored composition is cured at a temperature of 60° F. to 200° F. In some embodiments, the colored composition is cured at a temperature of 70° F. to 200° F. In some embodiments, the colored composition is cured at a temperature of 80° F. to 200° F. In some embodiments, the colored composition is cured at a temperature of 90° F. to 200° F. In some embodiments, the colored composition is cured at a temperature of 100° F. to 200° F. In some embodiments, the colored composition is cured at a temperature of 110° F. to 200° F. In some embodiments, the colored composition is cured at a temperature of 120° F. to 200° F. In some embodiments, the colored composition is cured at a temperature of 130° F. to 200° F. In some embodiments, the colored composition is cured at a temperature of 140° F. to 200° F. In some embodiments, the colored composition is cured at a temperature of 150° F. to 200° F. In some embodiments, the colored composition is cured at a temperature of 160° F. to 200° F. In some embodiments, the colored composition is cured at a temperature of 170° F. to 200° F. In some embodiments, the colored composition is cured at a temperature of 180° F. to 200° F. In some embodiments, the colored composition is cured at a temperature of 190° F. to 200° F.

In some embodiments, the colored composition is cured at a temperature of 50° F. to 190° F. In some embodiments, the colored composition is cured at a temperature of 50° F. to 180° F. In some embodiments, the colored composition is cured at a temperature of 50° F. to 170° F. In some embodiments, the colored composition is cured at a temperature of 50° F. to 160° F. In some embodiments, the colored composition is cured at a temperature of 50° F. to 150° F. In some embodiments, the colored composition is cured at a temperature of 50° F. to 140° F. In some embodiments, the colored composition is cured at a temperature of 50° F. to 130° F. In some embodiments, the colored composition is cured at a temperature of 50° F. to 120° F. In some embodiments, the colored composition is cured at a temperature of 50° F. to 110° F. In some embodiments, the colored composition is cured at a temperature of 50° F. to 100° F. In some embodiments, the colored composition is cured at a temperature of 50° F. to 90° F. In some embodiments, the colored composition is cured at a temperature of 50° F. to 80° F. In some embodiments, the colored composition is cured at a temperature of 50° F. to 70° F. In some embodiments, the colored composition is cured at a temperature of 50° F. to 60° F.

In some embodiments, the method 400 for forming a roofing granule does not comprise a sintering step (as defined herein). In some embodiments, the method 400 for forming a roofing granule does not comprise a step of sintering the granule core. In some embodiments, the method 400 for forming a roofing granule does not comprise a step of sintering the roofing granule. In some embodiments, the method 400 for forming a roofing granule does not comprise a step of sintering the colored coating composition. In some embodiments, the method 400 for forming a roofing granule does not comprise a step of sintering the colored coating.

Some embodiments relate to a roofing granule. In some embodiments, the roofing granule comprises a roofing shingle waste core. In some embodiments, the roofing shingle waste core has a surface. In some embodiments, the roofing shingle waste core comprises a base particle. In some embodiments, the roofing shingle waste core comprises an asphalt residue. In some embodiments, the asphalt residue has a surface. In some embodiments, the asphalt residue covers at least a portion of the surface of the roofing shingle waste core. In some embodiments, the roofing granule comprises a colored coating. In some embodiments, the colored coating covers at least a portion of the surface of the asphalt residue.

In some embodiments, the roofing granule comprises at least 5% by weight of the asphalt residue based on a total weight of the roofing granule.

In some embodiments, the roofing granule comprises 5% to 30% by weight of the asphalt residue based on a total weight of the roofing granule.

In some embodiments, the roofing granule comprises at least 70% by weight of the base particle based on a total weight of the roofing granule.

In some embodiments, the roofing granule comprises 70% to 95% by weight of the base particle based on a total weight of the roofing granule.

In some embodiments, the roofing granule comprises at least 10% by weight of the colored coating based on a total weight of the roofing granule.

In some embodiments, the roofing granule comprises 10% to 40% by weight of the colored coating based on a total weight of the roofing granule.

In some embodiments, the asphalt residue covers at least 1% of a surface area of the roofing shingle waste core.

In some embodiments, the asphalt residue covers 1% to 99% of a surface area of the roofing shingle waste core.

In some embodiments, the asphalt residue directly contacts the surface of the roofing shingle waste core.

In some embodiments, the colored coating covers at least 10% of a surface area of the roofing shingle waste core.

In some embodiments, the colored coating covers 10% to 99% of a surface area of the roofing shingle waste core.

In some embodiments, the colored coating directly contacts the surface of the roofing shingle waste core.

In some embodiments, the colored coating covers at least 1% of a surface area of the asphalt residue.

In some embodiments, the colored coating covers 1% to 99% of a surface area of the asphalt residue.

In some embodiments, the colored coating directly contacts the surface of the asphalt residue.

In some embodiments, the colored coating comprises at least one of a pigment, a dye, or any combination thereof.

Some embodiments relate to a roofing shingle. In some embodiments, the roofing shingle comprises a substrate. In some embodiments, the roofing shingle comprises a coating on the substrate. In some embodiments, the roofing shingle comprises a plurality of roofing granules on the coating. In some embodiments, each of the plurality of roofing granules comprises a roofing shingle waste core. In some embodiments, the roofing shingle waste core has a surface. In some embodiments, the roofing shingle waste core comprises a base particle. In some embodiments, the roofing shingle waste core comprises an asphalt residue. In some embodiments, the asphalt residue has a surface. In some embodiments, the asphalt residue covers at least a portion of the surface of the roofing shingle waste core. In some embodiments, each of the plurality of roofing granules comprises a colored coating. In some embodiments, the colored coating covers at least a portion of the surface of the asphalt residue.

In some embodiments, the substrate comprises a sheet having a top surface and a bottom surface. In some embodiments, the coating on the top surface of the sheet. In some embodiments, the coating on the bottom surface of the sheet.

In some embodiments, the substrate comprises a top sheet. In some embodiments, the substrate comprises a bottom sheet attached to the top sheet. In some embodiments, the coating on at least one of the top sheet, the bottom sheet, or any combination thereof.

In some embodiments, the substrate comprises a fiberglass mat.

In some embodiments, the coating comprises 10% to 90% by weight of an asphalt based on a total weight of the coating.

In some embodiments, the coating comprises 10% to 90% by weight of at least one filler based on the total weight of the coating.

In some embodiments, the asphalt comprises at least one of a virgin asphalt, an oxidized asphalt, an unoxidized asphalt, a waste asphalt, a polymer-modified asphalt, a thermoplastic polymer, or any combination thereof.

Some embodiments relate to a method. In some embodiments, the method comprises obtaining a roofing shingle waste core. In some embodiments, the roofing shingle waste core has a surface. In some embodiments, the roofing shingle waste core comprises a base particle. In some embodiments, the roofing shingle waste core comprises an asphalt residue. In some embodiments, the asphalt residue has a surface. In some embodiments, the asphalt residue covers at least a portion of the surface of the roofing shingle waste core. In some embodiments, the method comprises obtaining a colored coating composition. In some embodiments, the method comprises sterilizing the roofing shingle waste core. In some embodiments, the method comprises applying the colored coating composition to the surface of the roofing shingle waste core. In some embodiments, the method comprises curing the colored coating composition on the surface of the roofing shingle waste core, so as to form a colored coating on a roofing granule. In some embodiments, the colored coating covers at least a portion of the asphalt residue.

In some embodiments, the colored coating composition is cured at a temperature of 200° F. or less.

In some embodiments, the method further comprises modifying the surface of the roofing shingle waste core.

In some embodiments, the modifying comprises contacting the surface of the roofing shingle waste core with a solvent.

In some embodiments, the modifying comprises applying a plasma treatment to the surface of the roofing shingle waste core.

In some embodiments, the modifying comprises applying a heat treatment to the surface of the roofing shingle waste core.

In some embodiments, the modifying comprises mechanically mixing the roofing shingle waste core.

In some embodiments, the curing comprises contacting the colored coating composition with at least one of a metal salt, an acid, or any combination thereof.

In some embodiments, the curing comprises exposing the colored coating composition to carbon dioxide.

In some embodiments, the colored coating composition is exposed to the carbon dioxide in a presence of water vapor.

In some embodiments, the curing comprises exposing the colored coating composition to atmospheric carbon.

In some embodiments, the curing comprises exposing the colored coating composition to an off gas.

In some embodiments, the curing comprises exposing the colored coating composition to microwaves.

In some embodiments, the curing comprises exposing the colored coating composition to at least one of ultraviolet light, infrared light, or any combination thereof.

In some embodiments, the sterilizing comprises heating the roofing shingle waste core at a temperature of 150° F. to 1000° F. for a duration of 1 second to 24 hours.

In some embodiments, the sterilizing comprises heating the roofing shingle waste core at a temperature of 250° F. to 550° F. for a duration of 30 seconds to 3 hours.

In some embodiments, the sterilizing comprises contacting the roofing shingle waste core with a sterilizing agent; and drying the roofing shingle waste core.

In some embodiments, the sterilizing agent comprises an acid. In some embodiments, the acid comprises at least one of citric acid, acetic acid, propionic acid, oxalic acid, hydrochloric acid, nitric acid, sulfuric acid, phosphoric acid, formic acid, acetic acid, succinic acid, fumaric acid, glycolic acid, lactic acid, malic acid, tartaric acid, ascorbic acid, maleic acid, hydroxymaleic acid, pyruvic acid, benzoic acid, gluconic acid, p-hydroxybenzoic acid, embonic acid, methanesulfonic acid, ethanesulfonic acid, hydroxyethanesulfonic acid, halogenbenzenesulfonic acid, toluenesulfonic acid, naphthalenesulfonic acid, hydrogen peroxide, or any combination thereof.

In some embodiments, the sterilizing agent comprises a base. In some embodiments, the base comprises at least one of sodium hydroxide, potassium hydroxide, ammonium hydroxide, potassium carbonate, or any combination thereof.

In some embodiments, the sterilizing agent comprises at least one of an alcohol, an aldehyde, a halogenated compound, a phenolic compound, a metallic salt, a hypochlorite, or any combination thereof.

Some embodiments relate to a method. In some embodiments, the method comprises obtaining a granule core. In some embodiments, the granule core has a surface. In some embodiments, the method comprises obtaining a colored coating composition. In some embodiments, the method comprises applying the colored coating composition to the surface of the granule core. In some embodiments, the method comprises curing the colored coating composition on the surface of the granule core, so as to form a colored coating on a roofing granule. In some embodiments, the colored coating composition is cured at a temperature of 200° F. or less.

In some embodiments, the granule core comprises a mineral core.

In some embodiments, the granule core comprises at least one of greenstone, rhyolite, andesite, basalt, metabasalt, nepheline syenite, ceramic grog, talc, slag, silica sand, greystone, trap rock, granite, siliceous sand, porphyry, marble, syenite, diabase, quartz, slate, sandstone, marine shells, or any combination thereof.

In some embodiments, the granule core has an average particle size of 0.2 mm to 3 mm.

In some embodiments, the method does not comprise heating the granule core to a temperature of 1400° F. or greater.

In some embodiments, the method does not comprise heating the colored coating composition to a temperature of 1400° F. or greater.

In some embodiments, the curing comprises contacting the colored coating composition with at least one of a metal salt, an acid, or any combination thereof.

In some embodiments, the curing comprises exposing the colored coating composition to carbon dioxide.

In some embodiments, the colored coating composition is exposed to the carbon dioxide in a presence of water vapor.

In some embodiments, the curing comprises exposing the colored coating composition to atmospheric carbon.

In some embodiments, the curing comprises exposing the colored coating composition to an off gas.

In some embodiments, the curing comprises exposing the colored coating composition to microwaves.

In some embodiments, the curing comprises exposing the colored coating composition to at least one of ultraviolet light, infrared light, or any combination thereof.

EXAMPLE

Roofing shingle waste cores from post-consumer waste were obtained. It was determined that the roofing shingle waste cores contained both cyanobacteria and asphalt residue. To evaluate the effectiveness of various sterilization processes, a trial was conducted with three controls and nine samples. The controls were not subjected to any sterilization process. Control 1 included roofing shingle waste cores from a first post-consumer waste source, while Controls 2 and 3 included roofing shingle waste cores from another post-consumer waste source. Samples 1 to 9 included roofing shingle waste cores that were subjected to various sterilization processes, as summarized in Table 1 below.

After subjecting the samples to the sterilization processes, an Organism Growth Testing Method was performed to determine whether the roofing shingle waste cores exhibit organism growth. The Organism Growth Testing Method involved adding roofing shingle waste cores to separate test tubes, each of which contained growth media (BG-11, available from UTEX Culture Collection of Algae) and deionized water at a ratio of 1:9. Each test tube was sealed to reduce or prevent airborne cross-contamination. The test tubes were placed in a glass chamber and exposed to natural light and LED broad-spectrum white light. The air in the glass chamber and test tubes was then heated to 80° F. using heating pads. The test tubes were visually inspected after 1 month. When, based on a visual inspection, a green growth was observed at an interface between the roofing shingle waste cores and the growth media solution, it was determined that the roofing shingle waste cores exhibited organism growth. When, based on a visual inspection, no green growth was observed at an interface between the roofing shingle waste cores and the growth media solution, it was determined that the roofing shingle waste cores did not exhibit organism growth. When, based on a visual inspection of the sample over a duration of a month, visible green growth was observed at an interface between the solution and the granule, it was determined that the roofing shingle waste core did exhibit organism growth. As summarized below in Table 1, no organism growth was observed for any of the Samples 1-9.

TABLE 1

| | Method of Sterilization | Growth Observed |
|---|---|---|
| Control 1 | Not sterilized | Yes |
| Control 2 | Not sterilized | Yes |
| Control 3 | Not sterilized | Yes |
| Sample 1 | Heated to 300° F. in an oven for 1 hour and then held at 300° F. for 1 minute | No |
| Sample 2 | Heated to 500° F. in an oven for 1 hour and then held at 500° F. for 1 minute | No |
| Sample 3 | Heated to 400° F. in an oven for 1 hour and then held at 400° F. for 1 minute | No |
| Sample 4 | Heated to 500° F. in an oven for 1 hour and then held at 500° F. for 1 hour | No |
| Sample 5 | Exposed to 1M citric acid for 1 hour and then dried at 165° F. for 20 hours to remove moisture | No |
| Sample 6 | Exposed to 70% ethanol for 1 hour and then dried at 165° F. for 20 hours to remove moisture | No |
| Sample 7 | Exposed to 1M NaOH for 1 hour and then dried at 165° F. for 20 hours to remove moisture | No |
| Sample 8 | Exposed to 30-40% $H_2O_2$ for 1 hour and then dried at 165° F. for 20 hours to remove moisture | No |
| Sample 9 | Exposed to steam generated from a beaker of boiling water for 20 minutes | No |

As summarized above in Table 1, the roofing shingle waste cores exhibited organism growth for all of the Controls 1-3. In addition, the roofing shingle waste cores did not exhibit organism growth for any of the Samples 1-9. Accordingly, the sterilization methods were deemed to have been performed under conditions sufficient (e.g., at a sufficient temperature and for a sufficient duration) to sterilize the roofing shingle waste cores obtained from post-consumer waste. It was also determined that the sterilization methods did not impact the asphalt residue on the roofing shingle waste cores.

What is claimed is:

1. A roofing granule comprising:
   a sterilized roofing shingle waste core,
     wherein the sterilized roofing shingle waste core comprises:
       a sterilized base particle; and
       at least 0.5% by weight of a sterilized asphalt residue based on a total weight of the sterilized roofing shingle waste core;
     wherein the sterilized roofing shingle waste core, when tested according to an organism growth testing method, does not exhibit a green growth at an interface between the sterilized roofing shingle waste core and a testing solution after a duration of one month; and
   a colored coating,
     wherein the sterilized asphalt residue is located between the sterilized base particle and the colored coating;
     wherein the colored coating covers at least a portion of the sterilized asphalt residue.

2. The roofing granule of claim 1, wherein the sterilized asphalt residue covers 1% to 99% of the sterilized base particle.

3. The roofing granule of claim 1, wherein the colored coating covers 1% to 99% of the sterilized asphalt residue.

4. The roofing granule of claim 1, wherein the colored coating covers 1% to 99% of the sterilized roofing shingle waste core.

5. The roofing granule of claim 1, wherein the sterilized asphalt residue contacts the sterilized base particle.

6. The roofing granule of claim 1, wherein the colored coating contacts the sterilized asphalt residue.

7. The roofing granule of claim 1, wherein the colored coating contacts the sterilized roofing shingle waste core.

8. The roofing granule of claim 1, wherein the sterilized roofing shingle waste core comprises 0.5% to 50% by weight of the sterilized asphalt residue based on the total weight of the sterilized roofing shingle waste core.

9. The roofing granule of claim 1, wherein the sterilized roofing shingle waste core comprises 5% to 50% by weight of the sterilized asphalt residue based on the total weight of the sterilized roofing shingle waste core.

10. The roofing granule of claim 1, wherein the roofing granule comprises 0.1% to 50% by weight of the sterilized asphalt residue based on a total weight of the roofing granule.

11. A method comprising:
obtaining a sterilized roofing shingle waste core,
wherein the sterilized roofing shingle waste core comprises:
a sterilized base particle; and
at least 0.5% by weight of a sterilized asphalt residue based on a total weight of the sterilized roofing shingle waste core;
wherein the sterilized roofing shingle waste core, when tested according to an organism growth testing method, does not exhibit a green growth at an interface between the sterilized roofing shingle waste core and a testing solution after a duration of one month;
obtaining a colored coating composition;
applying the colored coating composition to the sterilized roofing shingle waste core; and
curing the colored coating composition, so as to form a colored coating on a roofing granule;
wherein the sterilized asphalt residue is located between the sterilized base particle and the colored coating;
wherein the colored coating covers at least a portion of the sterilized asphalt residue.

12. The method of claim 11, wherein the sterilized asphalt residue covers 1% to 99% of the sterilized base particle.

13. The method of claim 11, wherein the colored coating covers 1% to 99% of the sterilized asphalt residue.

14. The method of claim 11, wherein the colored coating covers 1% to 99% of the sterilized roofing shingle waste core.

15. The method of claim 11, wherein the sterilized asphalt residue contacts the sterilized base particle.

16. The method of claim 11, wherein the colored coating contacts the sterilized asphalt residue.

17. The method of claim 11, wherein the colored coating contacts the sterilized roofing shingle waste core.

18. The method of claim 11, wherein the sterilized roofing shingle waste core comprises 0.5% to 50% by weight of the sterilized asphalt residue based on the total weight of the sterilized roofing shingle waste core.

19. The method of claim 11, wherein the sterilized roofing shingle waste core comprises 5% to 50% by weight of the sterilized asphalt residue based on the total weight of the sterilized roofing shingle waste core.

\* \* \* \* \*